US012561933B2

(12) United States Patent
Lee et al.

(10) Patent No.: US 12,561,933 B2
(45) Date of Patent: Feb. 24, 2026

(54) WEARABLE DEVICE FOR IDENTIFYING AREA FOR DISPLAYING IMAGE AND METHOD THEREOF

(71) Applicant: Samsung Electronics Co., Ltd., Suwon-si (KR)

(72) Inventors: Eunbin Lee, Suwon-si (KR); Myoungwoo Nam, Suwon-si (KR); Eunyoung Park, Suwon-si (KR); Dongil Son, Suwon-si (KR); Stephanie Ahn, Suwon-si (KR); Bona Lee, Suwon-si (KR); Miyeoung Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/921,147

(22) Filed: Oct. 21, 2024

(65) Prior Publication Data

US 2025/0046028 A1 Feb. 6, 2025

Related U.S. Application Data

(63) Continuation of application No. 18/918,687, filed on Oct. 17, 2024, which is a continuation of application No. PCT/KR2024/095460, filed on Feb. 26, 2024.

(30) Foreign Application Priority Data

Mar. 21, 2023 (KR) ........................ 10-2023-0036804
Apr. 28, 2023 (KR) ........................ 10-2023-0056620

(Continued)

(51) Int. Cl.
*G06T 19/20* (2011.01)
*G06F 3/01* (2006.01)
(Continued)

(52) U.S. Cl.
CPC .............. *G06T 19/20* (2013.01); *G06F 3/011* (2013.01); *G06F 3/02* (2013.01); *G06F 3/0362* (2013.01);
(Continued)

(58) Field of Classification Search
CPC .. G02B 27/01; G02B 27/017; G02B 27/0172; G02B 2027/0138; G02B 2027/014;
(Continued)

(56) References Cited

U.S. PATENT DOCUMENTS 9,016,857 B2 4/2015 Benko et al.
9,766,462 B1 9/2017 Worley et al.
(Continued)

FOREIGN PATENT DOCUMENTS

CN 111465887 7/2020
JP 2009192905 A 8/2009
(Continued)

OTHER PUBLICATIONS

Extended Search Report dated Jan. 7, 2025 in European Patent Application No. 24706661.6.
(Continued)

*Primary Examiner* — Nelson M Rosario
(74) *Attorney, Agent, or Firm* — Nixon & Vanderhye, P.C.

(57) ABSTRACT

According to an embodiment, a processor of a wearable device displays a virtual object superimposed on a virtual space by using a display. The processor receives an input for rotating a dial in a first direction while the superimposed virtual object is displayed in the virtual space. While the input is maintained, the processor reduces a first area in which the virtual space is displayed. While the input is maintained, the processor maintains a size of the virtual object that is superimposed on the virtual space and is
(Continued)

displayed inside of the first area reduced while the input is maintained. While the input is maintained, the processor expands a second area including the image that is further displayed on the display in response to the input.

20 Claims, 49 Drawing Sheets

(30) Foreign Application Priority Data

Nov. 10, 2023 (KR) ........................ 10-2023-0155791
Dec. 13, 2023 (KR) ........................ 10-2023-0181295

(51) Int. Cl.

| | |
|---|---|
| *G06F 3/02* | (2006.01) |
| *G06F 3/0362* | (2013.01) |
| *G06T 7/20* | (2017.01) |
| *G06T 19/00* | (2011.01) |
| *G06V 20/20* | (2022.01) |

(52) U.S. Cl.
CPC .............. *G06T 7/20* (2013.01); *G06T 19/006* (2013.01); *G06V 20/20* (2022.01); *G06T 2200/24* (2013.01); *G06T 2210/62* (2013.01); *G06T 2219/2016* (2013.01)

(58) Field of Classification Search
CPC . G02B 2027/0178; G06F 1/163; G06F 1/169; G06F 1/1692; G06F 3/011; G06F 3/013; G06F 3/02; G06F 3/0362; G06F 3/04815; G06F 3/0482; G06F 3/0484; G06F 3/04842; G06F 3/04845; G06F 3/0485; G06F 3/04883; G06F 2200/1636; G06F 2203/04804; G06F 2203/04806; G06F 2203/04808; G06T 19/006; G06T 19/20; G06T 7/20; G06T 2200/24; G06T 2210/62; G06T 2219/2016; G06V 20/20
See application file for complete search history.

(56) References Cited

U.S. PATENT DOCUMENTS

| | | | |
|---|---|---|---|
| 9,946,393 | B2 | 4/2018 | Kim et al. |
| 10,248,192 | B2 | 4/2019 | Lehman et al. |
| 10,412,379 | B2 | 9/2019 | Shin |
| 11,537,198 | B1 | 12/2022 | Cross et al. |
| 2014/0195953 | A1 | 7/2014 | Sakai et al. |
| 2015/0103021 | A1 | 4/2015 | Lim et al. |
| 2015/0186033 | A1 | 7/2015 | Min et al. |
| 2015/0358614 | A1 | 12/2015 | Jin |
| 2016/0011420 | A1 | 1/2016 | Jang et al. |
| 2018/0239144 | A1* | 8/2018 | Woods ................... A63F 13/213 |
| 2019/0025909 | A1 | 1/2019 | Mittal et al. |
| 2020/0051336 | A1* | 2/2020 | Ichikawa .............. G06T 19/006 |
| 2021/0097768 | A1* | 4/2021 | Malia ................... G06F 3/04845 |
| 2022/0254120 | A1 | 8/2022 | Berliner et al. |
| 2022/0334648 | A1 | 10/2022 | Okamoto |
| 2023/0005224 | A1 | 1/2023 | Cudak et al. |
| 2023/0237192 | A1 | 7/2023 | Kahan et al. |
| 2024/0061514 | A1 | 2/2024 | Reisman et al. |
| 2025/0013051 | A1 | 1/2025 | Edwin et al. |

FOREIGN PATENT DOCUMENTS

| | | |
|---|---|---|
| JP | 2023005093 A | 1/2023 |
| KR | 101558233 B1 | 10/2015 |
| KR | 20150116871 A | 10/2015 |
| KR | 20150140043 A | 12/2015 |
| KR | 20160006053 A | 1/2016 |
| KR | 20170090490 | 8/2017 |
| KR | 102227836 B1 | 3/2021 |

OTHER PUBLICATIONS

International Search Report for PCT/KR2024/095460 mailed Jun. 12, 2024, 5 pages.
Written Opinion of the ISA for PCT/KR2024/095460 mailed Jun. 12, 2024, 4 pages.
Lee et al., U.S. Appl. No. 18/918,687, filed Oct. 17, 2024.
Office Action dated Aug. 6, 2025 in U.S. Appl. No. 18/918,687.

* cited by examiner

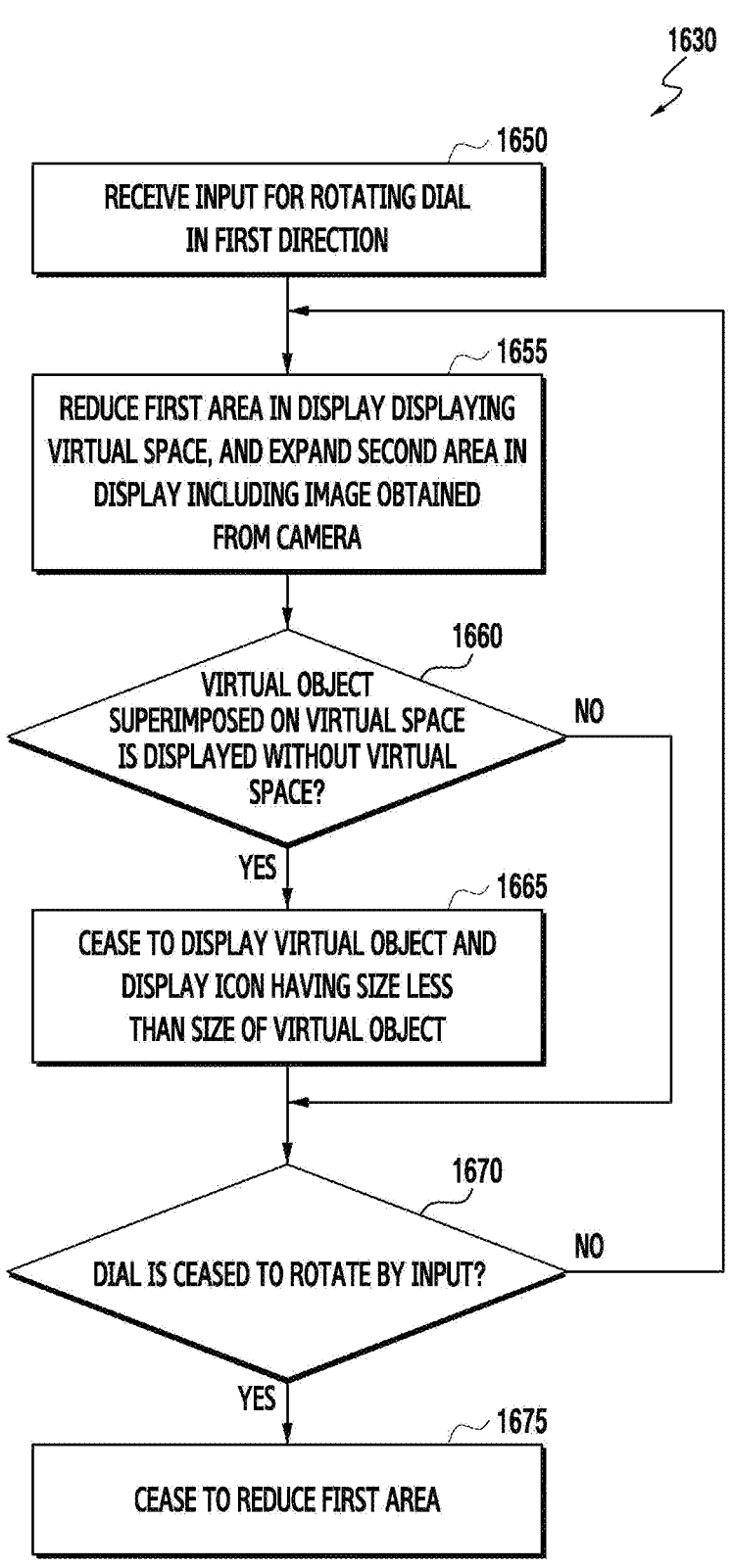

1630

RECEIVE INPUT FOR ROTATING DIAL
IN FIRST DIRECTION

~ 1650

REDUCE FIRST AREA IN DISPLAY DISPLAYING
VIRTUAL SPACE, AND EXPAND SECOND AREA IN
DISPLAY INCLUDING IMAGE OBTAINED
FROM CAMERA

~ 1655

VIRTUAL OBJECT
SUPERIMPOSED ON VIRTUAL SPACE
IS DISPLAYED WITHOUT VIRTUAL
SPACE?

1660

NO

YES

CEASE TO DISPLAY VIRTUAL OBJECT AND
DISPLAY ICON HAVING SIZE LESS
THAN SIZE OF VIRTUAL OBJECT

~ 1665

DIAL IS CEASED TO ROTATE BY INPUT?

1670

NO

YES

CEASE TO REDUCE FIRST AREA

WEARABLE DEVICE FOR IDENTIFYING AREA FOR DISPLAYING IMAGE AND METHOD THEREOF

CROSS-REFERENCE TO RELATED APPLICATIONS

This application is a continuation of U.S. application Ser. No. 18/918,687, filed Oct. 17, 2024, which is a continuation of International Application No. PCT/KR2024/095460 designating the United States, filed on Feb. 26, 2024, in the Korean Intellectual Property Receiving Office and claiming priority to Korean Patent Application Nos. 10-2023-0155791, filed on Nov. 10, 2023, and 10-2023-0181295, filed on Dec. 13, 2023, and 10-2023-0056620, filed on Apr. 28, 2023, and 10-2023-0036804, filed on Mar. 21, 2023 in the Korean Intellectual Property Office, the disclosures of each of which are incorporated by reference herein in their entireties.

BACKGROUND

Field

The present disclosure relates to a wearable device for identifying an area for displaying an image and a method thereof.

Description of Related Art

In order to provide an enhanced user experience, an electronic device providing an augmented reality (AR) service, which displays information generated by computer in association with an external object within the real-world, are being developed. The electronic device may be a wearable device that may be worn by a user. For example, the electronic device may be an AR glasses and/or a head-mounted device (HMD).

SUMMARY

According to an embodiment, a wearable device may comprise a housing, a dial on the housing, a display forming at least portion of the housing to be arranged in front of eyes of a user wearing the wearable device, one or more cameras exposed outside through at least portion of the housing to obtain an image with respect to at least portion of environment adjacent to the wearable device, memory storing instructions, and a processor. The instructions may cause, when executed by the processor, the wearable device to display a virtual object superimposed on a virtual space by using the display. The instructions may cause, when executed by the processor, the wearable device to receive an input to rotate the dial in a first direction, while the virtual object superimposed on the virtual space is displayed. The instructions may cause, when executed by the processor, the wearable device to reduce a first area where the virtual space is displayed, while the input is maintained. The instructions may cause, when executed by the processor, the wearable device to maintain a size of the virtual object that is superimposed on the virtual space and is displayed inside of the first area reduced while the input is maintained, while the input is maintained. The instructions may cause, when executed by the processor, the wearable device to expand a second area including the image that is further displayed on the display in response to the input, while the input is maintained.

According to an embodiment, a method of a wearable device including a housing, a dial on the housing, one or more cameras exposed outside through at least portion of the housing to obtain an image with respect to at least portion of environment adjacent to the wearable device is provided. The method may comprise displaying a virtual object superimposed on a virtual space, by using a display forming at least portion of the housing to be arranged in front of eyes of a user wearing the wearable device. The method may comprise receiving an input to rotate the dial in a first direction, while the virtual object superimposed on the virtual space is displayed. The method may comprise reducing a first area where the virtual space is displayed, while the input is maintained. The method may comprise maintaining a size of the virtual object that is superimposed on the virtual space and is displayed inside of the first area reduced while the input is maintained. The method may comprise expanding a second area including the image that is further displayed on the display in response to the input.

According to an embodiment, a non-transitory computer readable storage medium for storing instructions is provided. The instructions may cause, when executed by a processor of a wearable device including a housing, a dial on the housing, one or more cameras exposed outside through at least portion of the housing to obtain an image with respect to at least portion of environment adjacent to the wearable device, the wearable device to display a virtual object superimposed on a virtual space, by using a display forming at least portion of the housing to be arranged in front of eyes of a user wearing the wearable device. The instructions may cause, when executed by the processor, the wearable device to receive an input to rotate the dial in a first direction, while the virtual object superimposed on the virtual space is displayed. The instructions may cause, when executed by the processor, the wearable device to reduce a first area where the virtual space is displayed, while the input is maintained. The instructions may cause, when executed by the processor, the wearable device to maintain a size of the virtual object that is superimposed on the virtual space and is displayed inside of the first area reduced while the input is maintained. The instructions may cause, when executed by the processor, the wearable device to expand a second area including the image that is further displayed on the display in response to the input.

According to an embodiment, a wearable device may comprise a housing, a display disposed on a first surface of the housing, a touch sensor, a camera disposed based on a direction of a second surface of the housing that is opposite to the first surface, and a processor. The processor may identify a touch input on the second surface using the touch sensor, while providing a virtual space through the display. The processor may identify an area for displaying an image within a screen of the display on which the virtual space is displayed, by using a path of a contact point of the touch input, based on identifying the touch input. The processor may display a portion segmented (or cropped) based on the path, in the image obtained through the camera on the area of the screen.

According to an embodiment, a method of a wearable device may comprise identifying a touch input on a second surface opposite to a first surface by using a touch sensor, while providing a virtual space through a display disposed on the first surface of a housing. The processor may identify an area for displaying an image within a screen of the display on which the virtual space is displayed, by using a path of a contact point of the touch input, based on identifying the touch input. The processor may displaying a portion segmented (or cropped) based on the path, in the image obtained through a camera disposed based on a direction of the second surface, on the area of the screen.

According to an embodiment, a non-transitory computer readable storage medium storing one or more programs, the one or more programs may cause, when executed by a processor of a wearable device, the processor of the wearable device to identify a touch input on a second surface opposite to a first surface by using a touch sensor, while providing a virtual space through a display disposed on the first surface of a housing. The one or more programs may cause, when executed by the processor of the wearable device, the processor of the wearable device to identify an area for displaying an image within a screen of the display on which the virtual space is displayed, by using a path of a contact point of the touch input, based on identifying the touch input. The one or more programs may cause, when executed by the processor of the wearable device, the processor of the wearable device to display a portion segmented (or cropped) based on the path, in the image obtained through a camera disposed based on a direction of the second surface, on the area of the screen.

BRIEF DESCRIPTION OF THE DRAWINGS

FIGS. 16A and 16B illustrate an exemplary flowchart of an operation of a wearable device, according to an embodiment.

DETAILED DESCRIPTION

Figure 1:
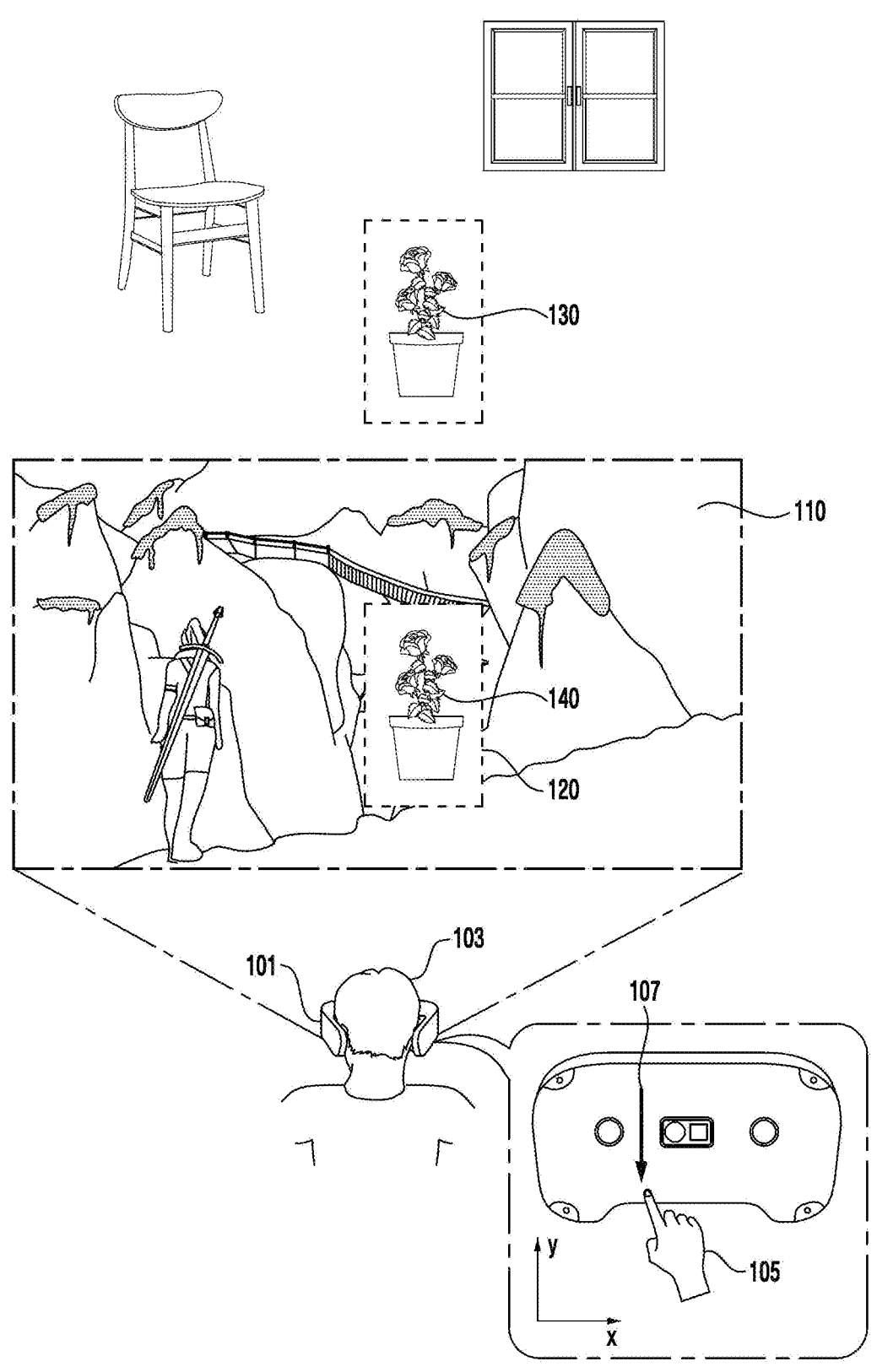
FIG. 1 illustrates an example of a use state of a wearable device, according to an embodiment.

Hereinafter, various embodiments of the present document will be described with reference to the accompanying drawings.

It should be appreciated that various embodiments of the present disclosure and the terms used therein are not intended to limit the technology set forth herein to particular embodiments and include various changes, equivalents, and/or replacements for a corresponding embodiment. With regard to the description of the drawings, similar reference numerals may be used to refer to similar elements. It is to be understood that a singular expression may include a plural expression unless the context clearly indicates otherwise. As used herein, such phrases as "A or B," "at least one of A and/or B," "A, B, or C," and "at least one of A, B, and/or C," may include all possible combinations of the items enumerated together. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly, or via another element (e.g., a third element).

As used in the disclosure, the term "module" may include a unit configured in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be configured with an application-specific integrated circuit (ASIC).

FIG. 1 illustrates an example of a use state of a wearable device. Referring to FIG. 1, according to an embodiment, a wearable device 101 includes a head-mounted display (HMD) wearable on a head of a user 103. Although an appearance of the wearable device 101 in a form of glasses is illustrated, the embodiment is not limited thereto. An example of a structure of the wearable device 101 wearable on the head of the user 103 is described with reference to FIGS. 10A to 10B and/or 11A to 11B. One or more hardware included in the wearable device 101 are exemplarily described with reference to FIG. 2.

According to an embodiment, the wearable device 101 executes a function associated with an augmented reality (AR), and/or a mixed reality (MR). Referring to FIG. 1, in a state in which a user wears the wearable device 101, the wearable device 101 may include at least one lens disposed adjacent to (e.g., proximate to, in front of, aligned with) the user's eye. The wearable device 101 may combine (e.g. synthesize, mix etc.) light emitted from a display of the wearable device 101 with an ambient light (e.g. light from an environment in which the wearable device 101 is located, such as light from the environment in front of the user) passing through the lens. A display area of the display may be formed within a lens through which the ambient light passes. Since the wearable device 101 combines the ambient light with the light emitted from the display, an image in which a real object recognized by the ambient light and a virtual object formed by the light emitted from the display are mixed may be visible to the user 103.

The wearable device 101 may execute a function associated with a video see-through (VST) and/or a virtual reality (VR). Referring to FIG. 1, in a state in which the user wears the wearable device 101, the wearable device 101 may include a housing covering eye of the user 103. The wearable device 101 may include a display (e.g., a first display 1050-1 and/or a second display 1050-2 of FIG. 11A) disposed on a first surface (e.g., a first surface 1110 of FIG. 11A) toward (e.g. facing, or in front of) the eye within the state. The wearable device 101 may include a camera or a plurality of cameras (e.g., one or more of cameras 1140-5, 1140-6, 1140-7, 1140-8, 1140-9, and 1140-10 of FIG. 11B) disposed on a second surface opposite to the first surface or otherwise positioned on the wearable device 101 such that light incoming (or incident) from a direction in front of the user is received by the camera (e.g. to be detected/sensed by the camera). The wearable device 101 may obtain frames including ambient light, by using the camera. The wearable device 101 may output the frames in a display disposed on the first surface so that the user may recognize the ambient light through the display. A display area of the display disposed on the first surface may be formed by one or more pixels included in the display. The wearable device 101 may synthesize a virtual object in frames outputted through the display so that the user may recognize the virtual object together with a real object recognized by the ambient light. In an example where the display comprises a first display and a second display (e.g. a first display 1050-1 and/or a second display 1050-2 of FIG. 11A), the first display may be disposed in front of one eye of the user and the second display may be disposed in front of the other eye of the user.

Referring to FIG. 1, the wearable device 101 may provide a virtual space 110 through a display. For example, the wearable device 101 providing the virtual space 110 operates in a VR mode. The virtual space 110 may be formed based on a 3D virtual coordinate system. The virtual space 110 may be provided by an application, which is transmitted from an external electronic device (e.g., a server) or is included in a memory of the wearable device 101. For example, the application may include a software application. In an example, the virtual space 110 is a displayable space generated by the wearable device 101 in which 2D or 3D objects may be displayed by the wearable device 101, optionally in combination with an image or object captured by the camera or visible through the display.

According to an embodiment, the wearable device 101 receives a drag input 107 (e.g., a swipe input) on the second surface opposite to the display disposed on the first surface while providing the virtual space 110. The drag input 107 may be detected based on a body part such as a hand 105 of the user 103, and/or the drag input 107 may be identified based on an external object (e.g., a stylus pen) detectable by a touch sensor. The drag input 107 may be identified by an input of the user 103 maintained from a start point to an end point. Descriptions of various examples of the drag input 107 will be described later in FIGS. 3A, 3B, 3C, 3D, 3E, and/or 3F.

The wearable device 101 may identify a path of a contact point of the drag input 107 based on receiving the drag input 107 of the user 103. The path of the contact point of the drag input 107 may be identified by using a 2D virtual coordinate system formed based on the x axis and the y axis. The wearable device 101 may identify a direction of the path. For example, the wearable device 101 identifies a first path inputted in a first direction corresponding to the x axis direction, and/or a second path inputted in a second direction corresponding to the y axis direction. The path may, in general, be considered a touch input or a gesture.

For example, the wearable device 101 identifies an area 120 for displaying an image within a screen on which the virtual space 110 is displayed, based on a path of the contact point. The wearable device 101 may identify the area 120 based on at least one of the first direction and the second direction. An example of the wearable device 101 identifying a path corresponding to the −y direction in FIG. 1 will be described. The wearable device 101 may identify the area 120 for displaying an image on a screen displaying the virtual space 110, based on detecting a path in the −y direction. For example, the wearable device 101 identifies an area 120 having a height of a length corresponding to the path from an upper edge of the screen; e.g., the height of the area 120 is based on the length of the path in the −y direction, or the distance travelled by the drag input 107 in the −y direction. For example, the length corresponding to the path may be associated with the sensitivity of a touch sensor for detecting the drag input 107. The wearable device 101 may segment (e.g., divide, separate, split, obtain a part of etc.) an image obtained through a camera based on identifying the area 120 (e.g. based on the area 120), in response to the drag input 107. The wearable device 101 may segment the image based on the path. The wearable device 101 may display a segmented portion 140 within the area 120, based on segmenting the image by using the path. The embodiment is not limited thereto, and the wearable device 101 may display the portion 140 as superimposed on the virtual space 110.

In an embodiment, the portion 140 displayed by the wearable device 101 in the screen on which the virtual space 110 is displayed is included in an image obtained in real time through a camera of the wearable device 101. In a state of displaying the portion 140 of the first image obtained through the camera in the area 120, the wearable device 101 may obtain a second image after the first image through the camera. The wearable device 101 obtaining the second image may display a portion of the second image having a position and/or a size corresponding to the portion 140, in the area 120. The wearable device 101 may repeatedly perform the above-described operation on a plurality of images sequentially obtained by the camera.

As described above, the wearable device 101 may receive the drag input 107 while providing the virtual space 110. The wearable device 101 may identify a path of the contact point of the drag input 107 based on receiving the drag input 107. The wearable device 101 may identify an area 120 for displaying an image based on the path of the contact point. The wearable device 101 may display a segmented portion 140 (e.g., a portion 140 corresponding to an external object 130) of the image based on the path, in the area 120. The wearable device 101 may change at least a portion of the screen to a VST mode in response to the drag input 107. For example, the wearable device 101 may change a mode with a simplified input, by changing at least part of the screen to the VST mode. For example, the user 103 may recognize an external object 130, through the wearable device 101 quickly changed to the VST mode. The wearable device 101 may provide a user of the wearable device 101 with convenience for mode switching by switching the mode with a simplified input. The wearable device 101 may enhance the user experience of the wearable device 101 by providing convenience for mode switching.

Figure 2:
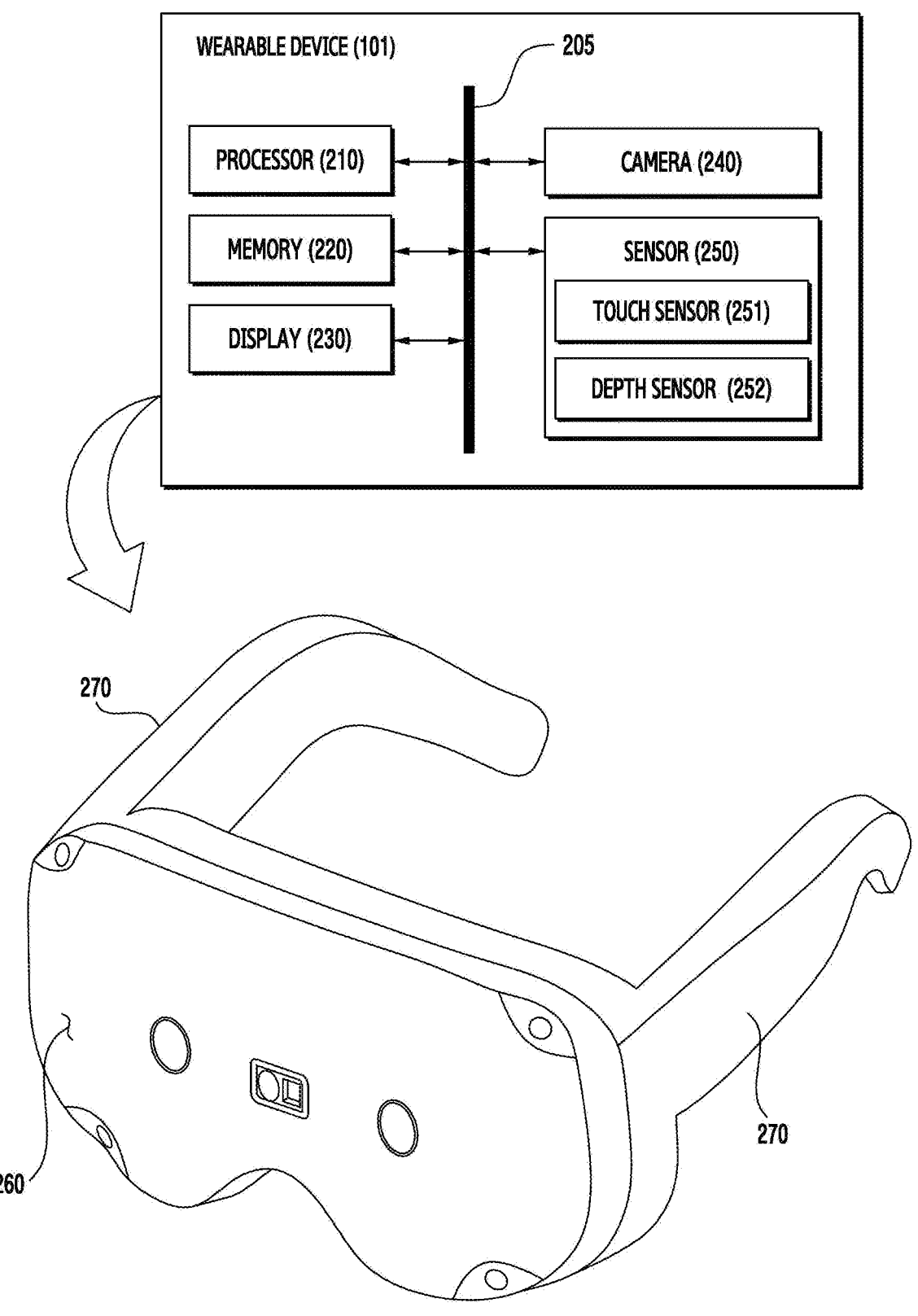
FIG. 2 illustrates an example of a block diagram of a wearable device, according to an embodiment.

FIG. 2 illustrates an example of a block diagram of a wearable device, according to an embodiment. A wearable device 101 of FIG. 2 may include the wearable device 101 of FIG. 1.

Referring to FIG. 2, the wearable device 101 may include at least one of a processor 210, a memory 220, a display 230, a camera 240, or a sensor 250. The processor 210, the memory 220, the display 230, the camera 240, and the sensor 250 may be electrically and/or operably coupled with each other by an electronical component (or an electric component) such as a communication bus 205. Hereinafter, operational coupling of hardware may mean that a direct or indirect connection between hardware is established by wire or wirelessly, so that a second hardware is controlled by a first hardware among the hardware. Although illustrated through different blocks, embodiments are not limited thereto. A portion of the hardware of FIG. 2 may be included in a single integrated circuit such as a system on a chip (SoC). The type and/or number of hardware included in the wearable device 101 is not limited to those illustrated in FIG. 2. For example, the wearable device 101 may include only a portion of the hardware illustrated in FIG. 2.

The wearable device 101 may include hardware for processing data based on one or more instructions. The hardware for processing data may include the processor 210. For example, the hardware for processing data may include an arithmetic and logical unit (ALU), a floating point unit (FPU), a field programmable gate array (FPGA), a central processing unit (CPU), and/or an application processor (AP). The processor 210 may have a structure of a single-core processor, or a structure of a multi-core processor such as a dual core, a quad core, a hexa core, or an octa core.

The memory 220 of the wearable device 101 may include a hardware component for storing data and/or instructions inputted to the processor 210 and/or outputted from the processor 210 of the wearable device 101. The memory 220 may include a volatile memory such as a random-access memory (RAM) and/or a non-volatile memory such as a read-only memory (ROM). For example, the volatile memory may include at least one of a dynamic RAM (DRAM), a static RAM (SRAM), a Cache RAM, and a pseudo SRAM (PSRAM). For example, the non-volatile memory may include at least one of a programmable ROM (PROM), an erasable PROM (EPROM), an electrically erasable PROM (EEPROM), a flash memory, a hard disk, a compact disk, a solid state drive (SSD), and an embedded multimedia card (eMMC).

For example, the wearable device 101 may provide a virtual space based on an execution of an application stored in the memory 220. For example, the wearable device 101 may identify a user input while providing the virtual space.

The display 230 of the wearable device 101 may output visualized information to a user, for example the virtual space and/or the image as described herein. The display 230 may visualize information generated by the processor 210 including a circuit such as a graphic processing unit (GPU). The display 230 may include a flat panel display (FPD), a flexible display, and/or an electronic paper. The FPD may include a liquid crystal display (LCD), a plasma display panel (PDP), and/or a plurality of light emitting diodes (LEDs). The LED may include an organic LED (OLED). The display 230 may be disposed on a first surface of a housing of the wearable device 101. The first surface may face the user, in a state that the user wears the wearable device 101.

The camera 240 of the wearable device 101 may include a lens assembly, a flash, or an image sensor. The lens assembly may collect light emitted from a subject that is a target of image capturing. The lens assembly may include one or more lenses. According to an embodiment, the camera 240 may include a plurality of lens assemblies. For example, some of the plurality of lens assemblies may have the same lens properties (e.g., angle of view, focal length, autofocus, f number, or optical zoom), or at least one lens assembly may have one or more lens properties different from lens properties of another lens assembly. The lens assembly may include a wide-angle lens or a telephoto lens. For example, the flash of the camera 240 may emit light used to enhance light emitted or reflected from a subject. According to an embodiment, the flash may include one or more light emitting diodes (e.g., a red-green-blue (RGB) LED, a white LED, an infrared LED, or an ultraviolet LED), or a xenon lamp. For example, an image sensor may obtain an image corresponding to the subject, by converting light emitted or reflected from the subject and transmitted through the lens assembly, into an electrical signal. According to an embodiment, for example, from among image sensors with different properties, such as an RGB sensor, a black and white (BW) sensor, an IR sensor, or a UV sensor, an image sensor may include a single selected image sensor a plurality of image sensors with the same properties, or a plurality of image sensors with different properties. Each image sensor included in the image sensor may be implemented by using, for example, a charged coupled device (CCD) sensor or a complementary metal oxide semiconductor (CMOS) sensor. According to an embodiment, the wearable device 101 may include a plurality of cameras 240 having different properties or functions. For example, at least one of the plurality of cameras 240 may be a wide-angle camera, and another may be a telephoto camera. For example, the camera 240 may be disposed along a direction of a second surface 260 opposite to a first surface on which a display is disposed. The camera 240 may obtain a surrounding environment of the wearable device 101. The wearable device 101 may obtain an image including a part of the surrounding environment of the wearable device 101 by using the camera 240.

The wearable device 101 may include the sensor 250. For example, the sensor 250 of the wearable device 101 includes a touch sensor 251 and/or a depth sensor 252. For example, the touch sensor 251 of the wearable device 101 includes a capacitive touch sensor, a resistive touch sensor, and/or an impact sensing touch sensor. However, it is not limited thereto. According to an embodiment, the processor 210 of the wearable device 101 identifies a gesture generated by an external object in contact with a housing of the wearable device 101, by using data of the touch sensor 251. The gesture may be referred to as a touch input. The touch sensor 251 may be referred to as a touch sensor panel (TSP). In response to detecting the touch input, the processor 210 may execute a function in association with a specific visual object selected by the touch input, from among visual objects being displayed in the display 230.

For example, the wearable device 101 detects an external object in a direction in which the second surface 260 faces, by using the depth sensor 252. The depth sensor 252 may include a time-of-flight (ToF) sensor and/or a light detection and ranging (LiDAR) sensor. The wearable device 101 may identify a gesture based on an external object by using the depth sensor 252. The wearable device 101 may execute a function corresponding to the gesture, based on identifying the gesture by using the depth sensor 252.

For example, the wearable device 101 receives an input on the second surface 260, based on detecting an external object (e.g., a user's finger) in contact with a bezel (e.g., edge of the housing) of the housing. For example, the wearable device 101 receives a drag input (such as drag input 107 of FIG. 1), based on identifying an external object moving from a first edge (e.g., the upper edge) of the bezel to a second edge (e.g., the lower edge) facing the first edge. For example, the wearable device 101 detects a gesture generated by an external object in contact with the second surface 260 of the housing. The gesture may include a touch input such as a drag, long press, and/or pinch-to-zoom.

The touch sensor 251 of the wearable device 101 may detect a contact generated on at least a portion of the housing of the wearable device 101. For example, the touch sensing area formed by the touch sensor 251 is formed on at least a portion of the second surface 260 of the wearable device 101. The embodiments are not limited thereto, and the touch sensing area may be formed in at least a portion of the temples 270 of glasses, within the wearable device 101 having a form of the glasses. The touch sensing area may be formed on an edge of the second surface 260, such as on a boundary line of the second surface 260 referred to as a bezel. In an example in which the touch sensing area is formed along an edge and/or a boundary line of the second surface 260, the wearable device 101 receives a drag input, based on that an external object contacted to a first point of the edge of the second surface 260 is moved to a second point of the edge of the second surface 260.

The wearable device 101 may include temples 270 configured to be fixed to (e.g. releasably attached to, or received by/on) a portion of the wearer's car. For example, the wearable device 101 includes a touch sensor 251 for identifying an external object on the temples 270. The wearable device 101 may detect a gesture by an external object on the temples 270 by using the touch sensor 251. The wearable device 101 may execute a function corresponding to the gesture, based on detecting the gesture on the temples 270. An example of the wearable device 101 detecting a gesture based on the temples 270 will be described later in FIG. 9A.

According to an embodiment, the wearable device 101 provides a virtual space through the display 230. While providing the virtual space, the wearable device 101 may receive a gesture on the second surface 260 by using the touch sensor 251. The gesture may include a drag input. The wearable device 101 may identify a path of a contact point of the drag input, based on detecting the drag input. The wearable device 101 may determine an area for displaying an image by using the path of the contact point of the drag input, within a screen on which the virtual space is displayed. The wearable device 101 may obtain an image through the camera 240. The wearable device 101 may segment an image obtained through the camera 240 based on the path. The wearable device 101 may display a segmented portion based on the path in an area for displaying the image.

As described above, according to an embodiment, based on a gesture on the second surface 260, the wearable device 101 executes a function corresponding to the gesture. For example, the function corresponding to the gesture includes segmenting at least a portion of a virtual space and displaying a portion of an image obtained through a camera in the segmented portion. The wearable device 101 may help a user view a surrounding environment in a state of wearing the wearable device 101, by displaying the portion of the image obtained through the camera within an area for displaying an image in the virtual space. The wearable device 101 may therefore enhance the user experience of the wearable device 101, by displaying the portion of the image obtained through the camera.

Hereinafter, an example of the wearable device 101 receiving a drag input on the second surface 260 using the sensor 250 will be described.

Figure 3A:
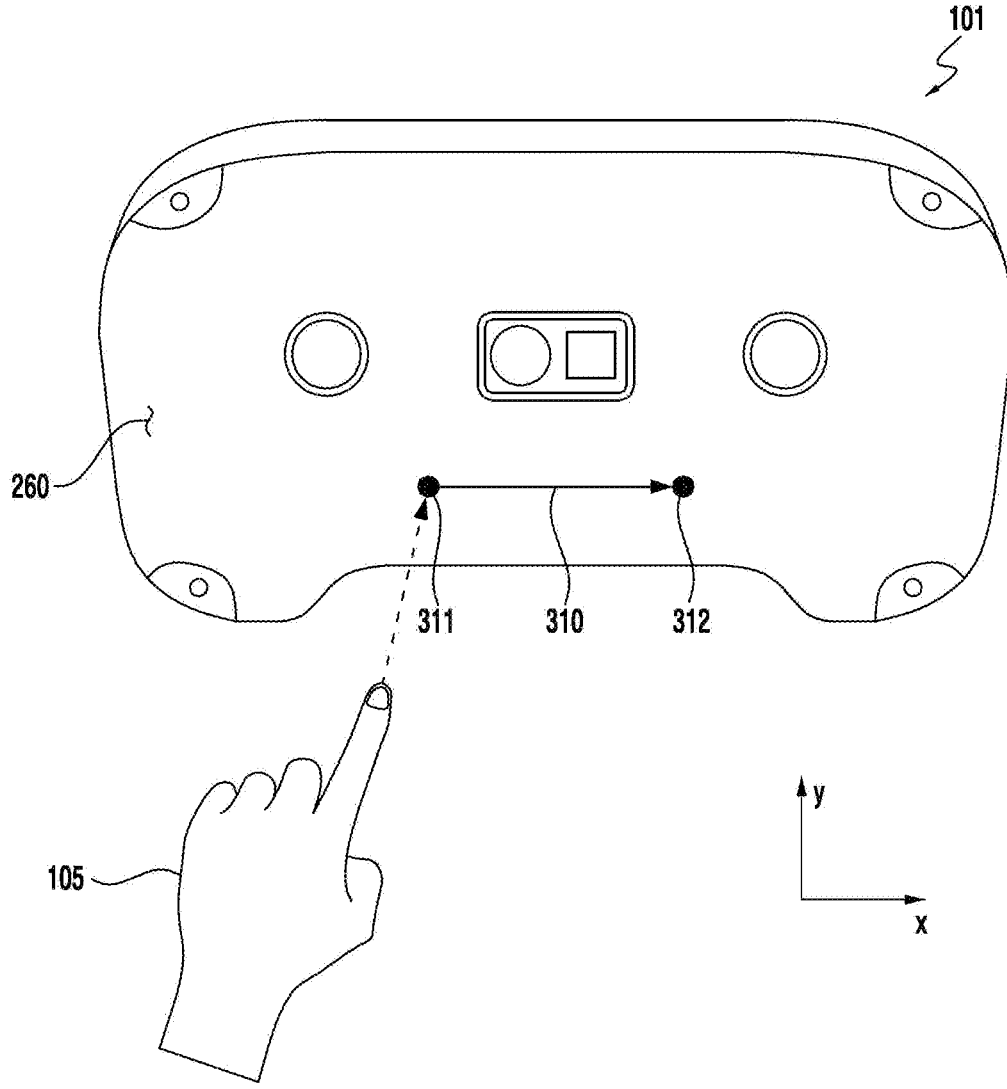
FIG. 3A illustrates an example associated with an input with respect to a surface of a wearable device, according to an embodiment.
Figure 3B:
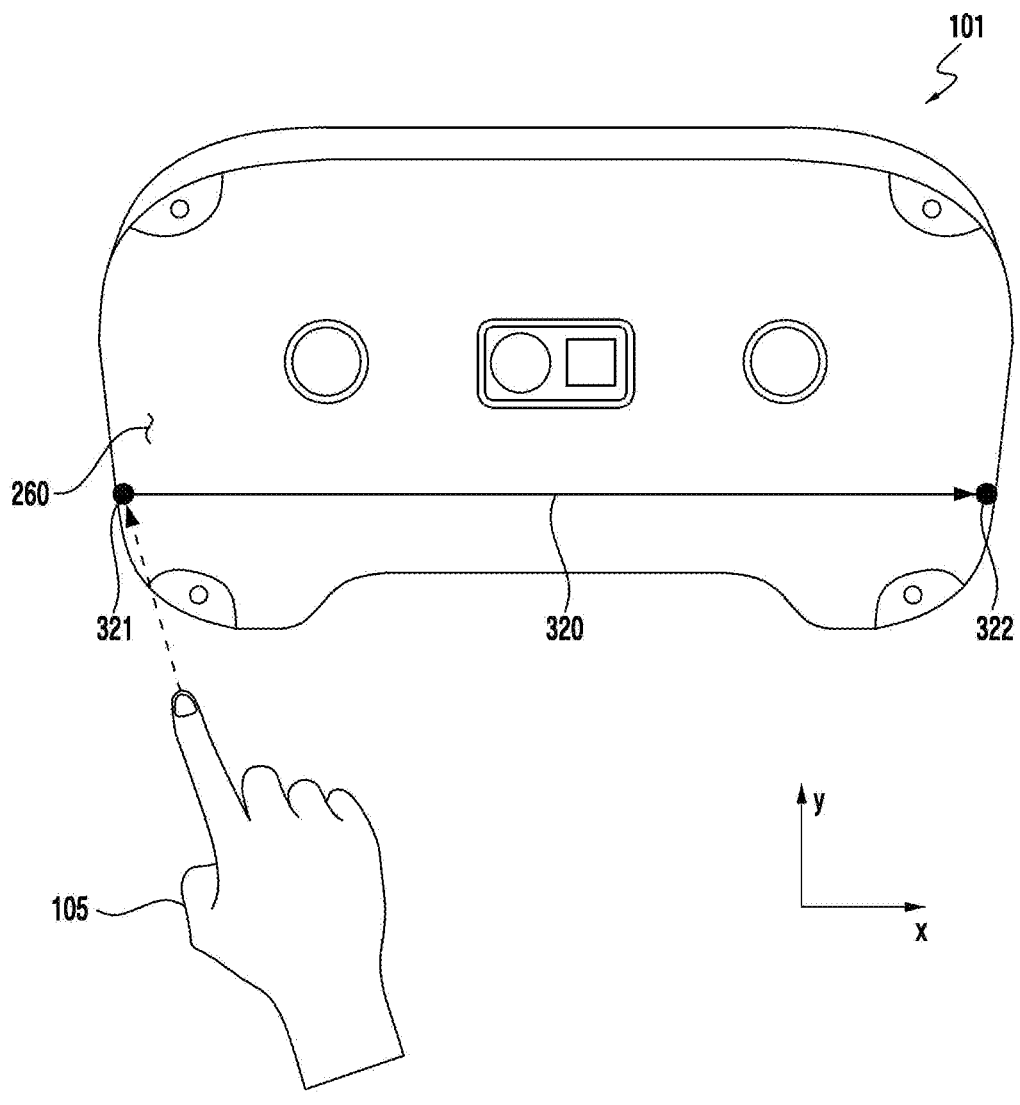
FIG. 3B illustrates an example associated with an input with respect to a surface of a wearable device, according to an embodiment.
Figure 3C:
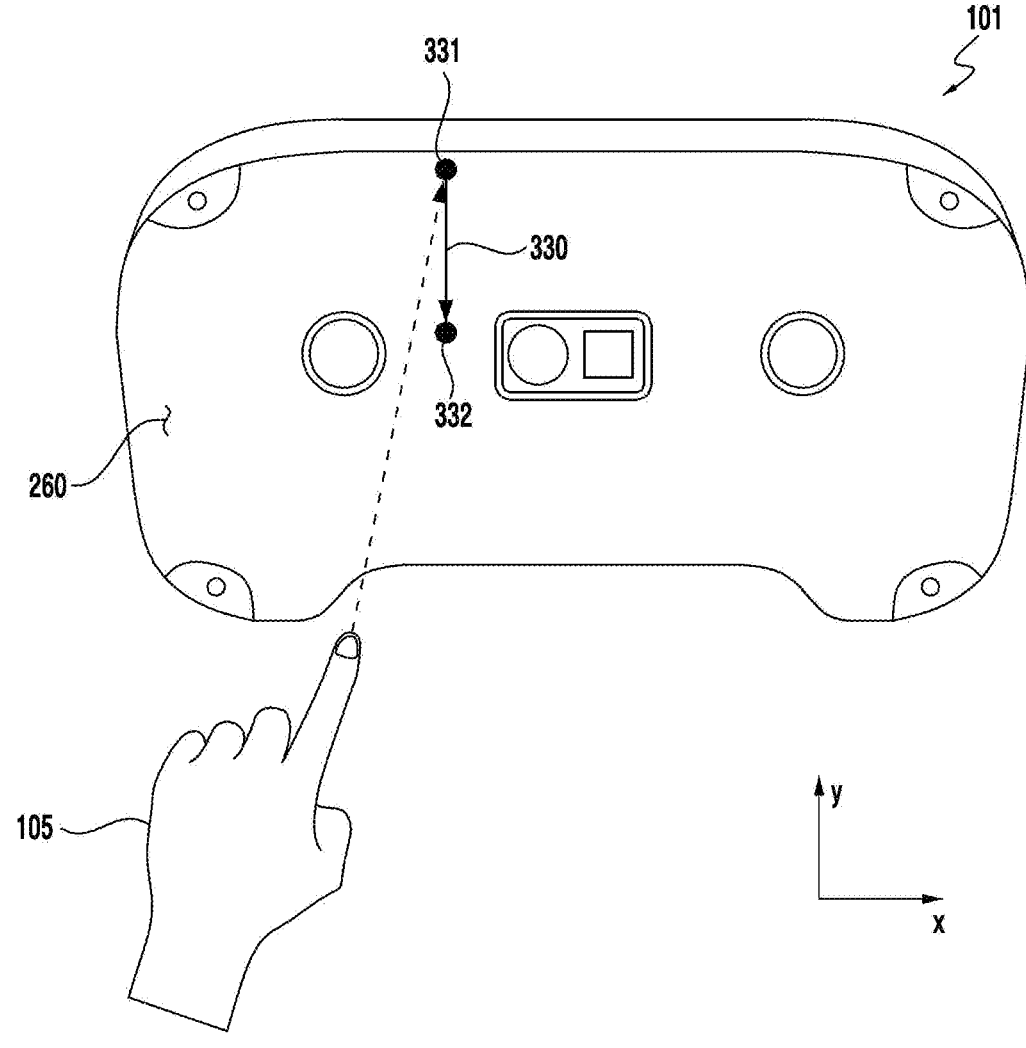
FIG. 3C illustrates an example associated with an input with respect to a surface of a wearable device, according to an embodiment.
Figure 3D:
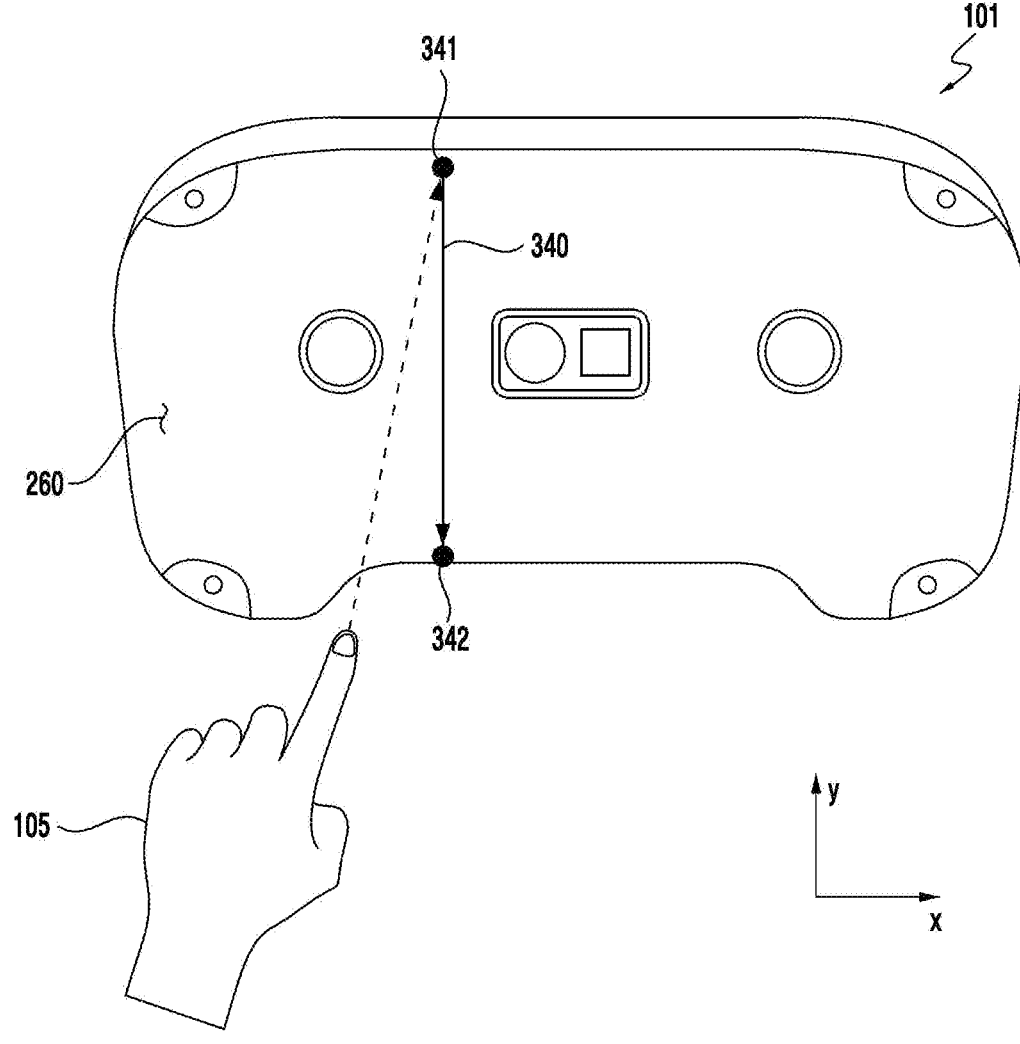
FIG. 3D illustrates an example associated with an input with respect to a surface of a wearable device, according to an embodiment.
Figure 3E:
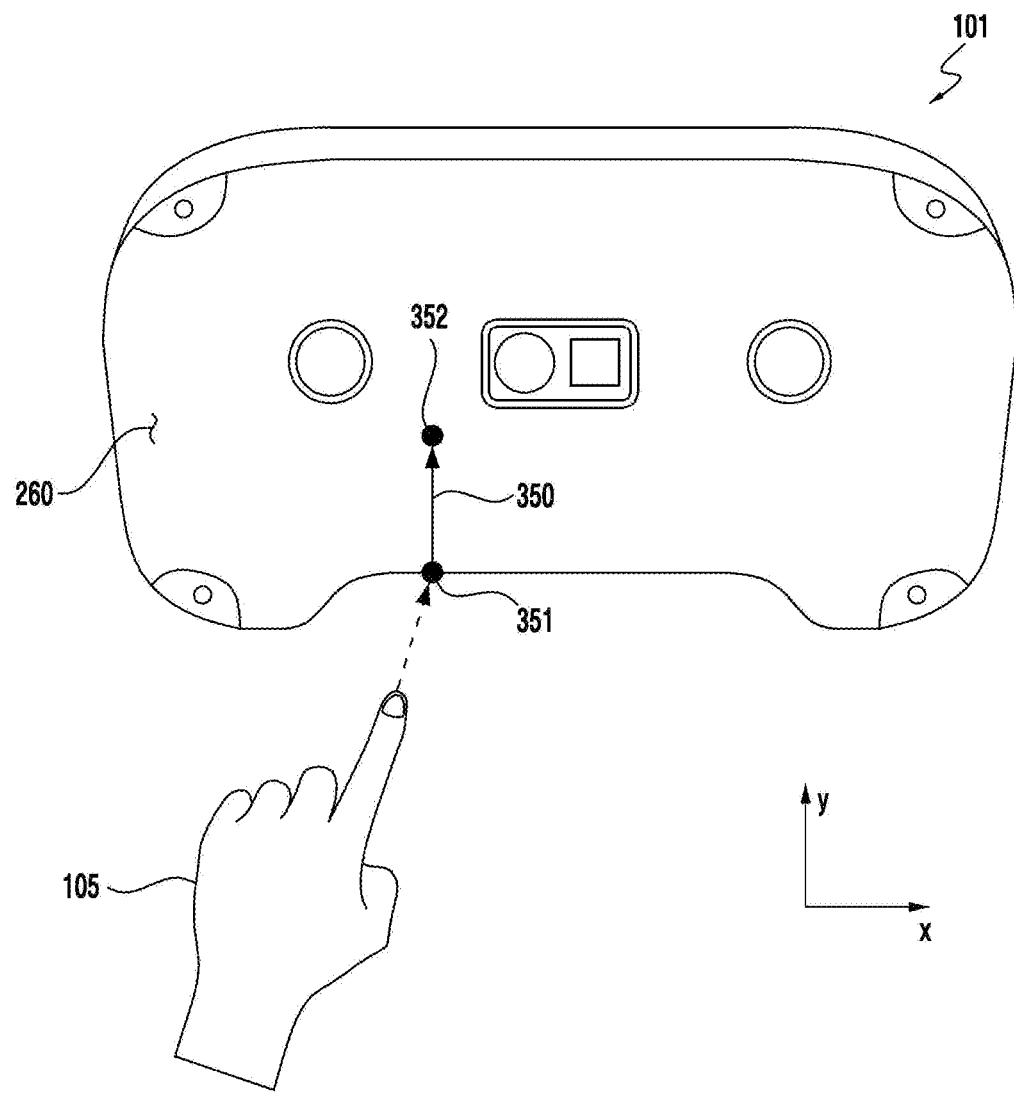
FIG. 3E illustrates an example associated with an input with respect to a surface of a wearable device, according to an embodiment.
Figure 3F:
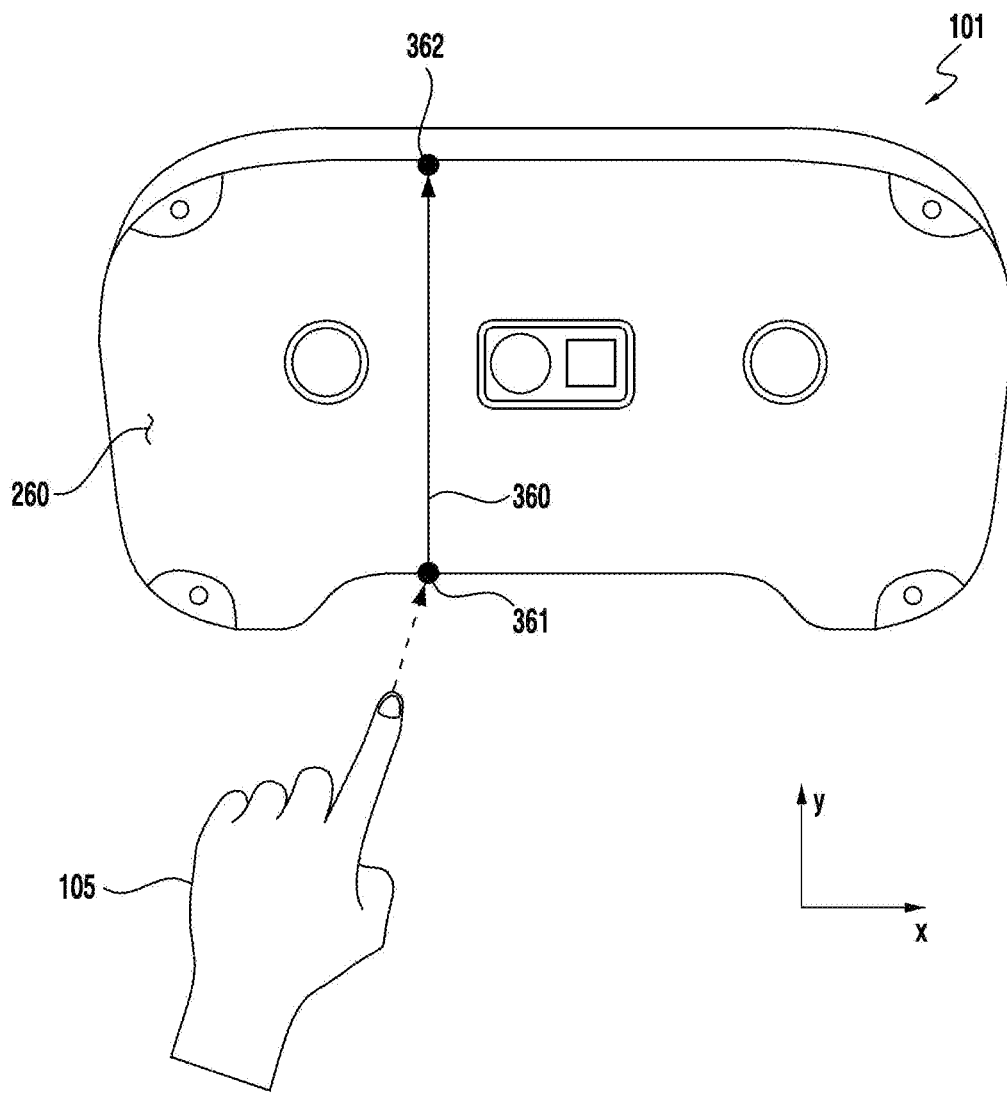
FIG. 3F illustrates an example associated with an input with respect to a surface of a wearable device, according to an embodiment.

FIG. 3A illustrates an example associated with an input with respect to a surface of a wearable device. FIG. 3B illustrates an example associated with an input with respect to a surface of a wearable device. FIG. 3C illustrates an example associated with an input with respect to a surface of a wearable device. FIG. 3D illustrates an example associated with an input with respect to a surface of a wearable device. FIG. 3E illustrates an example associated with an input with respect to a surface of a wearable device. FIG. 3F illustrates an example associated with an input with respect to a surface of a wearable device. A wearable device 101 of FIG. 3A, FIG. 3B, FIG. 3C, FIG. 3D, FIG. 3E, and/or FIG. 3F may include the wearable device 101 of FIG. 1 and/or FIG. 2. Operations of FIGS. 3A, 3B, 3C, 3D, 3E, and/or 3F may be performed by the processor 210 of FIG. 2.

Referring to FIGS. 3A, 3B, 3C, 3D, 3E, and/or 3F, the wearable device 101 may detect an external object in contact with a second surface 260, which is opposite to a first surface of a housing in which a display (e.g., the display 230 of FIG. 2) is disposed. For example, the wearable device 101 identifies the external object by using a touch sensor (e.g., the touch sensor 251 of FIG. 2). For example, the wearable device 101 identifies a user's hand 105 contacted on the second surface 260. The wearable device 101 may receive a drag input based on the user's hand 105 contacted on the second surface 260. Hereinafter, an example of a drag input by a user will be described. However, it is not limited thereto, and other methods of providing a drag input and other types of external object are included within the present disclosure.

Referring to FIG. 3A, according to an embodiment, the wearable device 101 detects a first drag input 310 on the second surface 260. For example, the wearable device 101 identifies contact points of the first drag input 310. The wearable device 101 may identify the first contact point 311 and a second contact point 312. The first contact point 311 may include a contact point at which the first drag input 310 is initiated. The second contact point 312 may include a contact point at which the first drag input 310 is terminated. The second contact point 312 may include a point at which the contact of the user's hand 105 is released. The wearable device 101 may identify initiation of the first drag input 310 based on detecting or identifying that the user's hand 105 is contacted with the first contact point 311; e.g. based on identifying that the user's hand 105 has made contact with a point on the second surface 260. An example of FIG. 3A includes receiving a first drag input 310 identified in the x axis direction illustrated in FIG. 3A. The wearable device 101 may identify a path of the first drag input 310. The path may be identified based on an external object moved from the first contact point 311 to the second contact point 312. The x axis direction may include a direction indicating or along a width of the wearable device 101. The wearable device 101 may execute a function corresponding to the first drag input 310, based on the first drag input 310 identified in the +x axis direction. For example, the wearable device 101 identifies an area for displaying an image within a virtual space, based on receiving the first drag input 310 in an area not including an edge on the second surface 260. The wearable device 101 may display a portion in which an obtained image is segmented (or cropped) through a camera, in an area for displaying the image.

Referring to FIG. 3B, the wearable device 101 may receive a second drag input 320 on the second surface 260. For example, the wearable device 101 detects contact points of the second drag input 320, such as detecting a third contact point 321 and a fourth contact point 322. The third contact point 321 may include a contact point at which the second drag input 320 is initiated, and the fourth contact point 322 may include a contact point at which the second drag input 320 is terminated. For example, the fourth contact point 322 includes a point at which the contact of the user's hand 105 is released. The wearable device 101 may identify initiation of the second drag input 320 after the user's hand 105 contacts the third contact point 321. An example of FIG. 3B includes detecting the second drag input 320 identified in the x axis direction. The wearable device 101 may identify a path of the second drag input 320. The path may be identified based on detecting an external object moved from the third contact point 321 to the fourth contact point 322. For example, the wearable device 101 executes a function corresponding to the second drag input 320 based on the second drag input 320 identified in the +x axis direction. For example, the wearable device 101 may identify the third contact point 321 in an area including a first edge and identify the fourth contact point 322 at a second edge facing the first edge. The first edge may include a right edge (e.g., an end of the −x axis) of the wearable device 101. The second edge may include a left edge (e.g., an end of the +x axis) of the wearable device 101. The wearable device 101 may identify an area for displaying an image in a virtual space, based on receiving the second drag input 320 in an area including an edge on the second surface 260. The wearable device 101 may display a segmented portion of an image obtained through a camera, in the area for displaying the image (e.g. segmenting of the image is performed based on the second drag input 320 or the path thereof). An area for displaying an image identified in FIG. 3B may be larger than an area for displaying an image identified in FIG. 3A. In various examples, a condition for segmenting the image based on the second drag input 320 includes identifying one of the third contact point 321 and the fourth contact point 322 to include, or correspond to, an edge of the wearable device 101.

In FIGS. 3A to 3B, drag inputs 310 and 320 inputted from right to left on the second surface 260 of the wearable device 101 have been described, but it is not limited thereto.

Referring to FIG. 3C, the wearable device 101 may receive a third drag input 330 on the second surface 260. For example, the wearable device 101 identifies contact points of the third drag input 330. The wearable device 101 may identify a fifth contact point 331 and a sixth contact point 332. The fifth contact point 331 may include a contact point at which the third drag input 330 is initiated, and the sixth contact point 332 may include a contact point at which the third drag input 330 is terminated. The sixth contact point 332 may include a point at which the contact of the user's hand 105 is released. The wearable device 101 may identify initiation of the third drag input 330, based on the user's hand 105 contacting the fifth contact point 331. An example of FIG. 3C includes receiving the third drag input 330 identified in the −y axis direction.

For example, the wearable device 101 identifies a path of the third drag input 330. For example, the path is identified based on the sixth contact point 332 from the fifth contact point 331. The −y axis direction may include a direction from the top to the bottom of the wearable device 101. The wearable device 101 may execute a function corresponding to the third drag input 330, based on the third drag input 330 identified in the −y axis direction. For example, the wearable device 101 detects the fifth contact point 331 in an area including a third edge on the second surface 260 and detects the sixth contact point 332 in an area not including a fourth edge. For example, the third edge includes an upper (e.g., an end of +y axis end) edge of the wearable device 101. For example, the fourth edge includes a lower (e.g., an end of the −y axis) edge of the wearable device 101. The wearable device 101 may receive the third drag input 330 based on the fifth contact point 331 and the sixth contact point 332. The wearable device 101 may identify an area for displaying an image in a virtual space, based on the third drag input 330 (e.g. segmenting of the image is performed based on the third drag input 330 or the path thereof). The wearable device 101 may display a segmented portion of an image obtained through a camera, in the area for displaying the image.

Referring to FIG. 3D, the wearable device 101 may receive a fourth drag input 340 on the second surface 260. For example, the wearable device 101 detects contact points of the fourth drag input 340. The wearable device 101 may detect a seventh contact point 341 and an eighth contact point 342. The seventh contact point 341 may include a contact point at which the fourth drag input 340 is initiated, and the eighth contact point 342 may include a contact point at which the fourth drag input 340 is terminated. The eighth contact point 342 may include a point at which the contact of the user's hand 105 is released. The wearable device 101 may identify initiation of the fourth drag input 340, based on the user's hand 105 contacting the seventh contact point 341. An example of FIG. 3C may include receiving the fourth drag input 340 identified in the −y axis direction.

For example, the wearable device 101 identifies a path of the fourth drag input 340. The path may be identified based on the eighth contact point 342 from the seventh contact point 341. The −y axis direction may include a direction from the top to the bottom of the wearable device 101. For example, the wearable device 101 executes a function corresponding to the fourth drag input 340, based on the fourth drag input 340 identified in the −y axis direction. The wearable device 101 may detect the seventh contact point 341 in an area including the third edge on the second surface 260 and detect the eighth contact point 342 in an area including the fourth edge facing the third edge. The wearable device 101 may receive the fourth drag input 340 based on the seventh contact point 341 and the eighth contact point 342. The wearable device 101 may identify an area for displaying an image in a virtual space, based on the fourth drag input 340. The wearable device 101 may display a segmented portion of an image obtained through a camera, in the area for displaying the image (e.g. segmenting of the image is performed based on the fourth drag input 340 or the path thereof). An area for displaying an image identified in FIG. 3D may be larger than an area for displaying an image identified in FIG. 3C.

Referring to FIG. 3E, the wearable device 101 may receive a fifth drag input 350 on the second surface 260. For example, the wearable device 101 identifies contact points of the fifth drag input 350. The wearable device 101 may detect a ninth contact point 351 and a tenth contact point 352. The ninth contact point 351 may include a contact point at which the fifth drag input 350 is initiated, and the tenth contact point 352 may include a contact point at which the fifth drag input 350 is terminated. The tenth contact point 352 may include a point at which the contact of the user's hand 105 is released. The wearable device 101 may identify initiation of the fifth drag input 350, based on the user's hand 105 contacting the ninth contact point 351. An example of FIG. 3E includes receiving the fifth drag input 350 identified in the +y axis direction.

For example, the wearable device 101 identifies a path of the fifth drag input 350. The path may be identified based on the tenth contact point 352 from the ninth contact point 351. The +y axis direction may include a direction from the bottom to the top of the wearable device 101. For example, the wearable device 101 executes a function corresponding to the fifth drag input 350, based on the fifth drag input 350 identified in the +y axis direction. The wearable device 101 may detect the ninth contact point 351 in an area including the fourth edge on the second surface 260 and detect the tenth contact point 352 in an area not including the third edge facing the fourth edge. The wearable device 101 may receive the fifth drag input 350 based on the ninth contact point 351 and the tenth contact point 352. The wearable device 101 may identify an area for displaying an image in a virtual space, based on the fifth drag input 350. The wearable device 101 may display a segmented portion of an image obtained through a camera, in the area for displaying the image (e.g. segmenting of the image is performed based on the fifth drag input 350 or the path thereof).

Referring to FIG. 3F, the wearable device 101 may receive a sixth drag input 360 on the second surface 260. For example, the wearable device 101 may identify contact points of the sixth drag input 360. The wearable device 101 may detect an eleventh contact point 361 and a twelfth contact point 362. The eleventh contact point 361 may include a contact point at which the sixth drag input 360 is initiated, and the twelfth contact point 362 may include a contact point at which the sixth drag input 360 is terminated. The twelfth contact point 362 may include a point at which the contact of the user's hand 105 is released. The wearable device 101 may identify initiation of the sixth drag input 360, based on the user's hand 105 contacting the eleventh contact point 361. An example of FIG. 3F includes receiving the sixth drag input 360 identified in the +y axis direction.

For example, the wearable device 101 identifies a path of the sixth drag input 360. The path may be identified based on the twelfth contact point 362 from the eleventh contact point 361. The +y axis direction may include a direction from the bottom to the top of the wearable device 101. For example, the wearable device 101 executes a function corresponding to the sixth drag input 360, based on the sixth drag input 360 identified in the +y axis direction. The wearable device 101 may detect the eleventh contact point 361 in an area including the fourth edge on the second surface 260 and detect the twelfth contact point 362 in an area including the third edge facing the fourth edge. The wearable device 101 may receive the sixth drag input 360 based on the eleventh contact point 361 and the twelfth contact point 362. The wearable device 101 may identify an area for displaying an image in a virtual space, based on the sixth drag input 360. The wearable device 101 may display a segmented portion of an image obtained through a camera, in the area for displaying the image (e.g. segmenting of the image is performed based on the sixth drag input 360 or the path thereof). An area for displaying an image identified in FIG. 3F may be larger than an area for displaying an image identified in FIG. 3E.

FIGS. 3A, 3B, 3C, 3D, 3E, and/or 3F illustrate an example in which one finger of the user's hand 105 is identified, but it is not limited thereto. For example, the wearable device 101 may additionally or alternatively receive a drag input based on a plurality of fingers. The wearable device 101 may obtain a coordinate value corresponding to the first contact point 311 to the twelfth contact point 362. For example, the wearable device 101 may receive a drag input, based on the coordinate values of the first contact point 311 to the twelfth contact point 362. That is, the wearable device 101 may receive a drag input based on the coordinate values of a plurality of contact points corresponding to the number of fingers used to perform the drag input. In an example, if three fingers are used to provide the drag input, a total of six contact points are detected or identified, where, for each finger, there is a corresponding contact point at which the drag input is initiated by that finger and a corresponding contact point at which the drag input is terminated by that finger. The wearable device 101 may identify a path of the drag input based on the coordinate value. The wearable device 101 may identify an area for displaying an image in a virtual space, by using the path of the drag input. Hereinafter, an area for displaying an image in a virtual space will be described later. It will be appreciated that the use of the terms "first drag input", "second drag input", "third drag input", "fourth drag input", "fifth drag input" and "sixth drag input" across FIGS. 3A to 3F is to distinguish the drag input described in relation to each figure from the drag inputs described in the other figures, and does not require that a number of other drag input are received in addition to the drag input disclosed in relation to each figure. For example, reference to a "fifth drag input" in relation to FIG. 3E should not be seen to require that first to fourth drag inputs are also received. Similar applies to the numbered "contact point" features described across FIGS. 3A to 3F; for example, reference to a "tenth contact point" in relation to FIG. 3E should not be seen to require the existence of first to ninth contact points also. Of course, in a case where a plurality of fingers (or external objects) are used to perform the drag input, the wearable device 101 may detect a number of inputs, e.g. from among the first drag input 310 to the sixth drag input 360, being received together, where these inputs form the drag input.

Figure 3G:
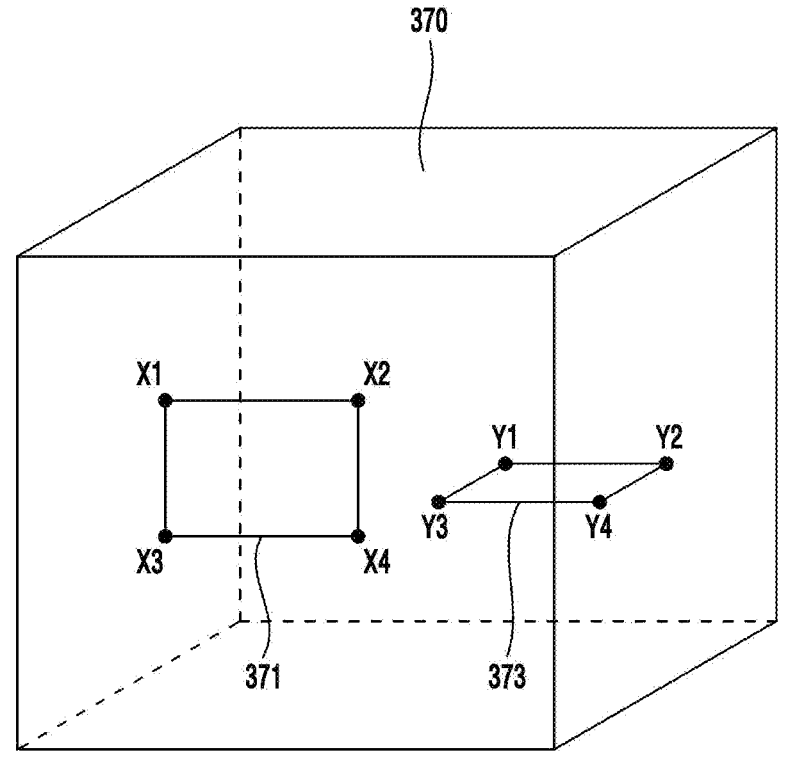
FIG. 3G illustrates an example associated with an area for displaying an image, according to an embodiment.
Figure 3G:
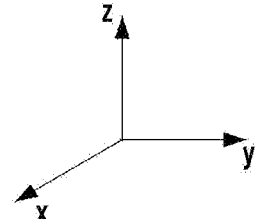

FIG. 3G illustrates an example associated with an area for displaying an image. A wearable device 101 of FIG. 3G may include the wearable device 101 of FIG. 1, FIG. 2, FIG. 3A, FIG. 3B, FIG. 3C, FIG. 3D, FIG. 3E, and/or FIG. 3F. Operations of FIG. 3G may be performed by the processor 210 of FIG. 2.

Referring to FIG. 3G, the wearable device 101 may represent (e.g. generate, create, form, provide etc.) a virtual space 370, based on an application and/or an external electronic device. Although the virtual space 370 is illustrated as a hexahedron in FIG. 3G, a shape of the virtual space 370 is not limited to a hexahedron. For example, the virtual space 370 may be provided in a sphere shape.

The wearable device 101 may identify the drag input (e.g., one or more of the first drag input 310, the second drag input 320, the third drag input 330, the fourth drag input 240, the fifth drag input 350, or the sixth drag input 360 as illustrated in FIGS. 3A, 3B, 3C, 3D, 3E, and/or 3F). The wearable device 101 may identify a path of a contact point of the drag input, based on receiving the drag input. The wearable device 101 may identify an area (e.g., a first area 371 and a second area 373) for displaying an image in the virtual space 370, based on the path. The area may be fixed in the virtual space 370. For example, the area is moved together with a screen displayed according to a user's gaze. That is, as the user changes their gaze while wearing the wearable device 101, a screen displayed by the wearable device 101 is changed to reflect the change in gaze (e.g. by showing a different part of the virtual space 370), and the position of the area in the screen may also be changed accordingly as well. For example, if the user shifts their gaze to the right, the area may be moved to the left in the screen displayed by the wearable device 101, thereby reflecting the area being fixed in the virtual space.

As mentioned, the wearable device 101 may identify the area for displaying an image based on the path of a drag input, in the virtual space 370. For example, the wearable device 101 identifies, based on the path, a surface for displaying an image in the virtual space 370 based on a 3D virtual coordinate system. The surface may be formed based on at least three coordinate values. The first area 371 and/or the second area 373 formed based on four coordinate values is illustrated in FIG. 3G, but it is not limited thereto.

For example, the first area 371 is formed based on a first coordinate value X1, a second coordinate value X2, a third coordinate value X3, and a fourth coordinate value X4. Each of the first coordinate value X1 to the fourth coordinate value X4 may have (e.g. be represented by) coordinates such as (x, y, z). In an example, the first area 371 is perpendicular to a surface having or facing the z axis direction as shown in FIG. 3G (i.e. the first area 371 may be in the y-z plane). However, it is not limited thereto. The second area 373 may be formed based on a fifth coordinate value Y1, a sixth coordinate value Y2, a seventh coordinate value Y3, and an eighth coordinate value Y4. Each of the fifth coordinate values Y1 to the eighth coordinate values Y4 may have coordinates such as (x, y, z). In an example, as illustrated in FIG. 3G, the second area 373 is parallel to a surface having or facing the z axis direction (i.e. the second area 372 may be in the x-y plane), but the present disclosure is not limited thereto.

FIG. 3G illustrates the first area 371 and the second area 373 in a rectangular shape, but a shape of an area is not limited. For instance, in FIG. 3G the first area 371 and the second area 373 are illustrated as planes, but the first area 371 and the second area 373 may also or instead include a curved surface (e.g. a surface which passes through several planes).

The wearable device 101 may display a portion of an image in the first area 371 and/or the second area 373, based on identifying the first area 371 and/or the second area 373, based on the drag input (e.g. where the first area 371 and/or the second area 373 are identified based on the drag input, the image may be of a surrounding environment of the wearable device 101, as obtained through a camera. The wearable device 101 may segment the image based on a path of the drag input. The wearable device 101 may display a portion of the segmented image on the first area 371 and/or the second area 373.

As described above, according to an embodiment, the wearable device 101 identifies an area (e.g., the first area 371 and the second area 373) for displaying an image in the virtual space 370, based on a drag input. The wearable device 101 may display a portion of the segmented image based on a path of the drag input in the area. The wearable device 101 may provide a surrounding environment by a user of the wearable device 101, by displaying a portion of an image in the area based on a drag input. The wearable device 101 may therefore enhance the user experience by providing the surrounding environment based on the drag input.

Figure 4A:
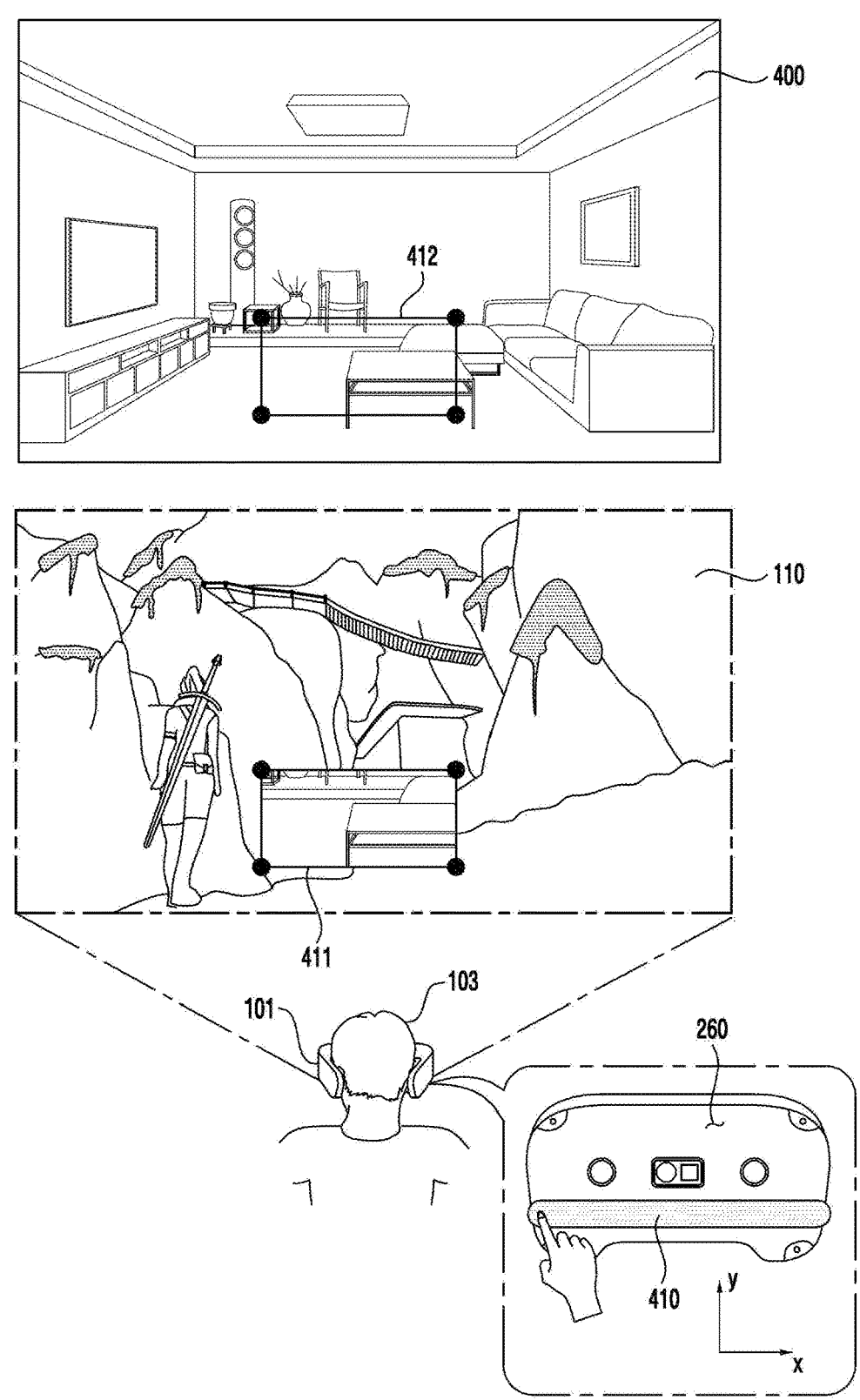
FIG. 4A illustrates an example associated with a use state of a wearable device, according to an embodiment.
Figure 4B:
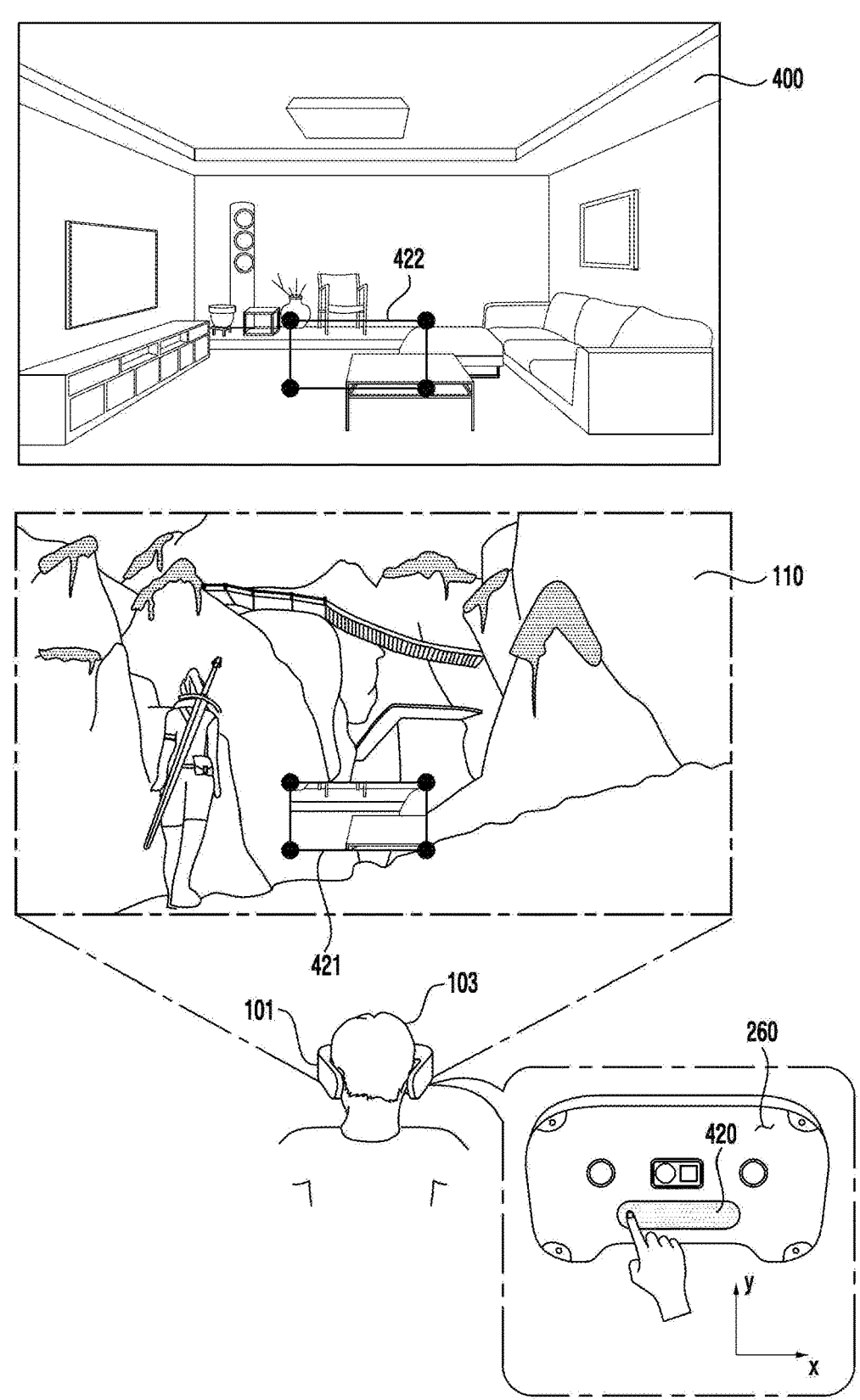
FIG. 4B illustrates an example associated with a use state of a wearable device, according to an embodiment.
Figure 4C:
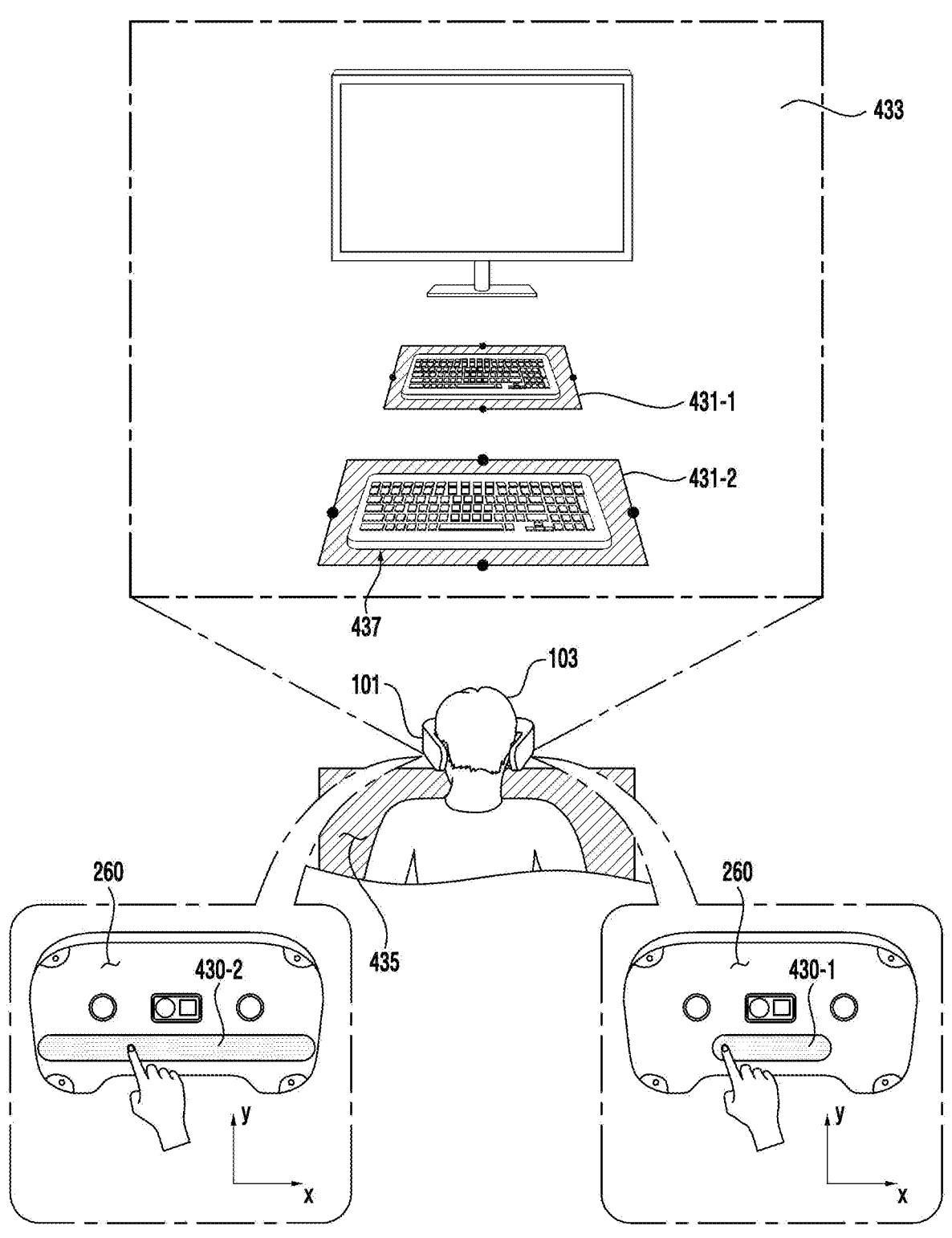
FIG. 4C illustrates an example associated with a use state of a wearable device, according to an embodiment.

FIG. 4A illustrates an example associated with a use state of a wearable device. FIG. 4B illustrates an example associated with a use state of a wearable device. FIG. 4C illustrates an example associated with a use state of a wearable device. A wearable device 101 of FIGS. 4A, 4B, and/or 4C may include the wearable device 101 of FIGS. 1, 2, 3A, 3B, 3C, 3D, 3E, 3F, and/or 3G. Operations of FIGS. 4A, 4B, and/or 4C may be performed by the processor 210 of FIG. 2.

Referring to FIG. 4A, the wearable device 101 may provide a virtual space 110. The wearable device 101 may identify an external object (e.g. a finger) on a second surface (e.g., the second surface 260 of FIG. 2) opposite to a first surface on which a display (e.g., the display 230 of FIG. 2) is disposed, while providing the virtual space 110. The wearable device 101 may receive a drag input 410 by the external object. For example, in an example of FIG. 4A, the wearable device 101 may receive the drag input 410 in the x axis direction. For example, the drag input 410 of FIG. 4A may be referred to as the second drag input 320 of FIG. 3B.

The wearable device 101 may identify a path of the drag input based on receiving the drag input 410. For example, based on contact points of the drag input (e.g. including a contact point where the drag input is initiated and a contact point where the drag input is terminated), the wearable device 101 identifies a path of the drag input. The wearable device 101 may identify an area 411, for displaying an image in a screen of the display on which the virtual space is displayed, by using the path. The area 411 for displaying an image may be identified by an operation of identifying the first area 371 and/or the second area 373 in FIG. 3G.

The wearable device 101 may segment an image 400 obtained using a camera (e.g., the camera 240 of FIG. 2), based on identifying the area 411. For example, the wearable device 101 segments the image 400 along the path. The wearable device 101 may segment the image 400 based on a first length of the path. The wearable device 101 may display a segmented portion 412 of the image 400 in the area 411. The wearable device 101 may mix the virtual space 110 and the portion 412, on a boundary line between the virtual space 110 and the portion 412 of the image 400, based on a visual effect such as blur. For example, the portion 412 of the image 400 and another portion of the screen on which the virtual space 110 is displayed are mixed on/along a boundary line of the area 411 where the portion 412 is displayed, based on a visual effect such as blur. The embodiment is not limited thereto, in another example the wearable device 101 gradually increases transparency of the portion 412 of the image 400 from a boundary line of the area 411, along a direction away from the area 411. Since the transparency gradually increases, a user 103 of the wearable device 101 may recognize a continuous transition between the portion 412 of the image 400 for the external space and the virtual space 110 on the boundary line of the area 411. The embodiment is not limited thereto, and in another example the wearable device 101 displays the portion 412 of the image 400, superimposed on the area 411 of the virtual space 110.

Further, the wearable device 101 may change color, brightness and/or contrast of the portion 412 of the image 400 displayed through the area 411, based on a color difference, brightness difference and/or a contrast difference between the virtual space 110 displayed through another area of the display different from the area 411 and the portion 412 of the image 400 displayed through the area 411. For example, when brightness of the virtual space 110 displayed through the other area is darker than brightness of the portion 412 displayed through the area 411 by a designated threshold or more, the wearable device 101 gradually increases the brightness of the virtual space 110 displayed through the other area over time, from a second brightness less than a first brightness of the portion 412 identified through the camera to the first brightness. For example, when the brightness of the virtual space 110 displayed through the other area is brighter than the brightness of the portion 412 displayed through the area 411 by a designated threshold or more, the wearable device 101 displays the brightness of the portion 412 displayed through the area 411 as a third brightness exceeding the first brightness of the portion 412 identified through the camera. After displaying the portion 412 of the third brightness through the area 411, the wearable device 101 may gradually reduce the brightness of the portion 412 with time. For example, the wearable device 101 may gradually reduce the brightness of the portion 412 from the third brightness to the first brightness.

Referring to FIG. 4B, the wearable device 101 may receive a drag input 420 while providing the virtual space 110. the drag input 420 may be referred to as the first drag input 310 of FIG. 3A. The wearable device 101 may identify a contact point of the drag input based on receiving the drag input 420. The wearable device 101 may identify a path of the drag input (i.e. a path the drag input follows from the contact point). The wearable device 101 may identify a second length of the path. For example, the second length of the path of the drag input 420 is relatively shorter than a first length of the path of the drag input 410 (i.e. compared to FIG. 4A, FIG. 4B illustrates a drag input 420 having a path of shorter length). The wearable device 101 may identify an area 412 for displaying an image in the virtual space 110 based on receiving the drag input 420. The wearable device 101 may segment the image 400 based on the drag input 420.

The wearable device 101 may obtain a segmented portion 422 of the image 400 based on segmenting the image 400. The wearable device 101 may display the segmented portion 422 in an area 421. For example, a size of the area 421 may be relatively smaller than a size of the area 411 of FIG. 4A. For example, since the second length of the path of the drag input 420 is shorter than the first length of the path of the drag input 410 of FIG. 4A, the size of the area 421 may be smaller than the size of the area 411 of FIG. 4A.

Referring to FIG. 4C, the wearable device 101 may identify a drag input 430-1 and/or a drag input 430-2. The drag input 430-1 may be referred to as the first drag input 310 of FIG. 3A. For example, the drag input 430-1 includes a drag input identified in a width direction of the wearable device 101. The wearable device 101 may identify an area 431-1 for displaying an image based on identifying the drag input 430-1. For example, the wearable device 101 identifies a visual object 437 corresponding to a reference surface 435 within an image obtained through a camera, based on identifying the drag input 430-1. The wearable device 101 may identify the area 431-1 corresponding to the reference surface based on the reference surface 435 being identified within a reference distance. The reference distance may correspond to a predetermined or preset distance (which may be modifiable, such as controlled by a user during use) in front of (e.g., from the second surface of) the wearable device 101. The wearable device 101 may be configured to identify an external object located or detected within the reference distance, such as the reference surface 435. For example, this is achieved through the wearable device 101 performing object recognition on image 433, such as on those part of image 433 which are specifically detected to be within the reference distance. The wearable device 101 may change an angle at which the area 431-1 is to be displayed, based on identifying the visual object 437. In another example, the wearable device 101 identifies the area 431-1 for displaying an image based on identifying the reference surface 435 corresponding to the visual object 437. The wearable device 101 may segment an image obtained through a camera in response to the drag input 430-1. The wearable device 101 may obtain a portion of the segmented image. The wearable device 101 may obtain a portion of an image matching the area 431-1. For example, the wearable device 101 identifies a visual object corresponding to an external object such as a keyboard in an image, such as by employing an object recognition technique as known in the art. The wearable device 101 may obtain a portion of an image including the visual object. The wearable device 101 may display the portion of the image in the area 431-1.

The wearable device 101 may change a shape and/or a size of the portion to be displayed in the area 431-1, based on an external object identified through the portion of the image displayed in the area 431-1. In an embodiment of FIG. 4C, when an external object such as a keyboard is identified through the portion of the image, the wearable device 101 displays a portion corresponding to the keyboard (e.g., a portion of the image in which the keyboard is captured) in the image, in the area 431-1. When a portion corresponding to the external object is moved in the image by motion of a user 103 wearing the wearable device 101 (e.g. by the user moving their head, or the user changing position) and/or movement of the external object, the wearable device 101 may display the moved portion in the area 431-1. For example, the wearable device 101 may display the moved portion in the area 431-1 such that the portion is seen as being fixed at the area 431-1. Since the wearable device 101 displays the moved portion in the area 431-1, the wearable device 101 may provide a user experience such as tracking the external object moved within the image. In an embodiment, when a portion of the image corresponding to the external object is partially displayed within the image through the area 431-1, the wearable device 101 changes a position and/or a size of the area 431-1 so that all of the portion of the image corresponding to the external object is displayed through the area 431-1.

The wearable device 101 may identify the drag input 430-2 on the second surface opposite to the first surface on which the display is disposed. The drag input 430-2 may be referred to as the second drag input 320 of FIG. 3B. The wearable device 101 may identify a path of the drag input 430-2 based on identifying the drag input 430-2. The wearable device 101 may identify the visual object 437 indicating a reference surface within an image obtained through a camera, based on identifying the drag input 430-2. In response to receiving the drag input 430-2, the wearable device 101 may identify an area 431-2 for displaying an image. The wearable device 101 may segment an image to be displayed in the area 431-2. The wearable device 101 may display a portion of an image obtained by segmenting the image in the area 431-2. The area 431-2 may not be parallel to a user's gaze within the virtual space. For example, the area 431-2 may be provided in an inclined state within the virtual space, like as the second area 373 of FIG. 3G. That is, if the area 431-1 is considered to correspond to a rectangular shape, when displayed in the virtual space the area 431-1 may be shown inclined such that it appears as a different shape (e.g. a trapezoid, such as a regular trapezoid) For example, the area 431-1 and/or the area 431-2 is/are provided in a state that is not parallel to a surface formed by the x axis and y axis within the virtual space (e.g. from a perspective within the virtual space, such as the perspective of the user wearing the wearable device 101). However, it is not limited thereto. For example, the drag inputs 410, 420, 430-1, and 430-2 described above may be identified as a path in a first direction. The first direction may include a +x direction. The wearable device 101 may identify an area to display a portion of an image, in response to the drag inputs 410, 420, 430-1, and 430-2. In addition, the wearable device 101 may receive a drag input in a second direction opposite to the first direction. In the area to display the portion of the image, the wearable device 101 may refrain from displaying the portion based on receiving the drag input in the second direction. For example, upon receiving the drag input in the second direction, the wearable device 101 may remove or stop displaying the portion in the virtual image.

As described above, the wearable device 101 may receive a drag input in the first direction on the second surface opposite to the first surface in which the display faces. The wearable device 101 may identify an area to display an image based on receiving the drag input. Based on receiving the drag input in the first direction, the wearable device 101 may segment an image within the area and display the image within the area. The wearable device 101 may refrain from (e.g. stop or prevent) displaying a portion of the image displayed in the area, based on a drag input in the second direction opposite to the first direction. The wearable device 101 may provide an external environment through a display of the wearable device 101, by displaying a portion of an image representing the external environment of the wearable device 101 based on a drag input. The wearable device 101 may enhance user convenience by providing the external environment, or a portion thereof, to a user, e.g. while displaying a virtual space such as within the displayed virtual space. The wearable device 101 may enhance user experience of the wearable device 101 by partially providing the external environment through a display.

Figure 5A:
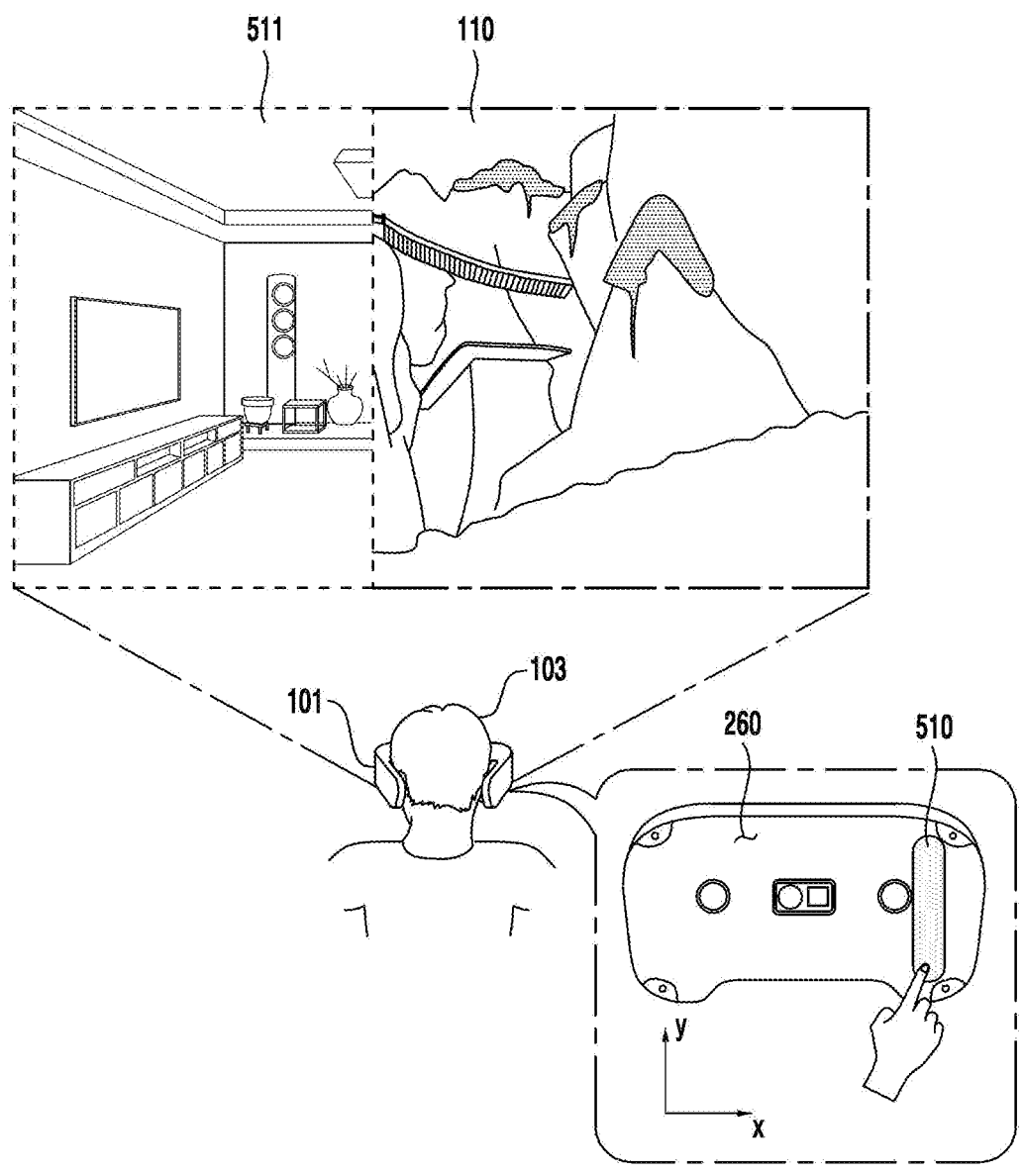
FIG. 5A illustrates an example associated with a use state of a wearable device, according to an embodiment.
Figure 5B:
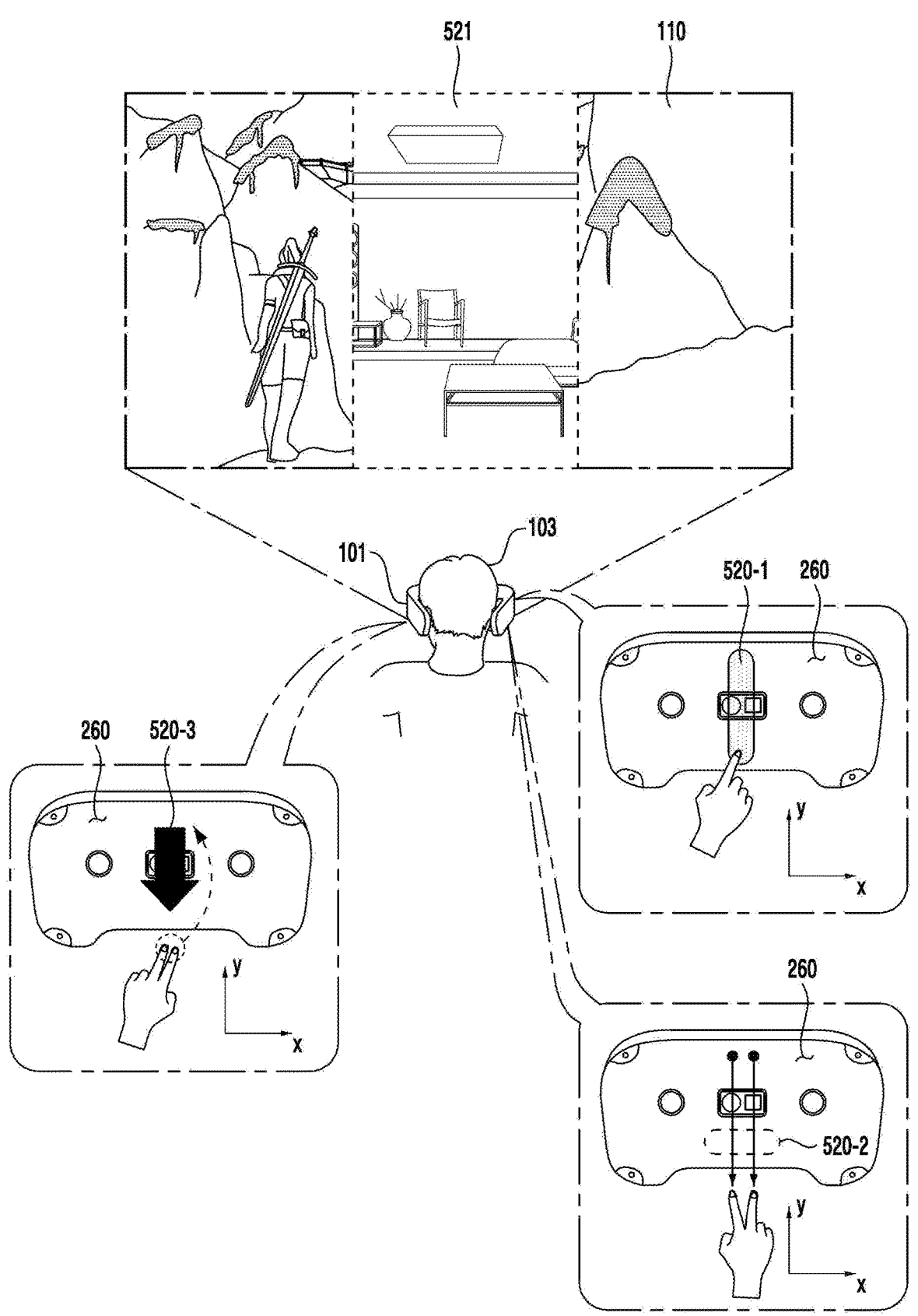
FIG. 5B illustrates an example associated with a use state of a wearable device, according to an embodiment.
Figure 5C:
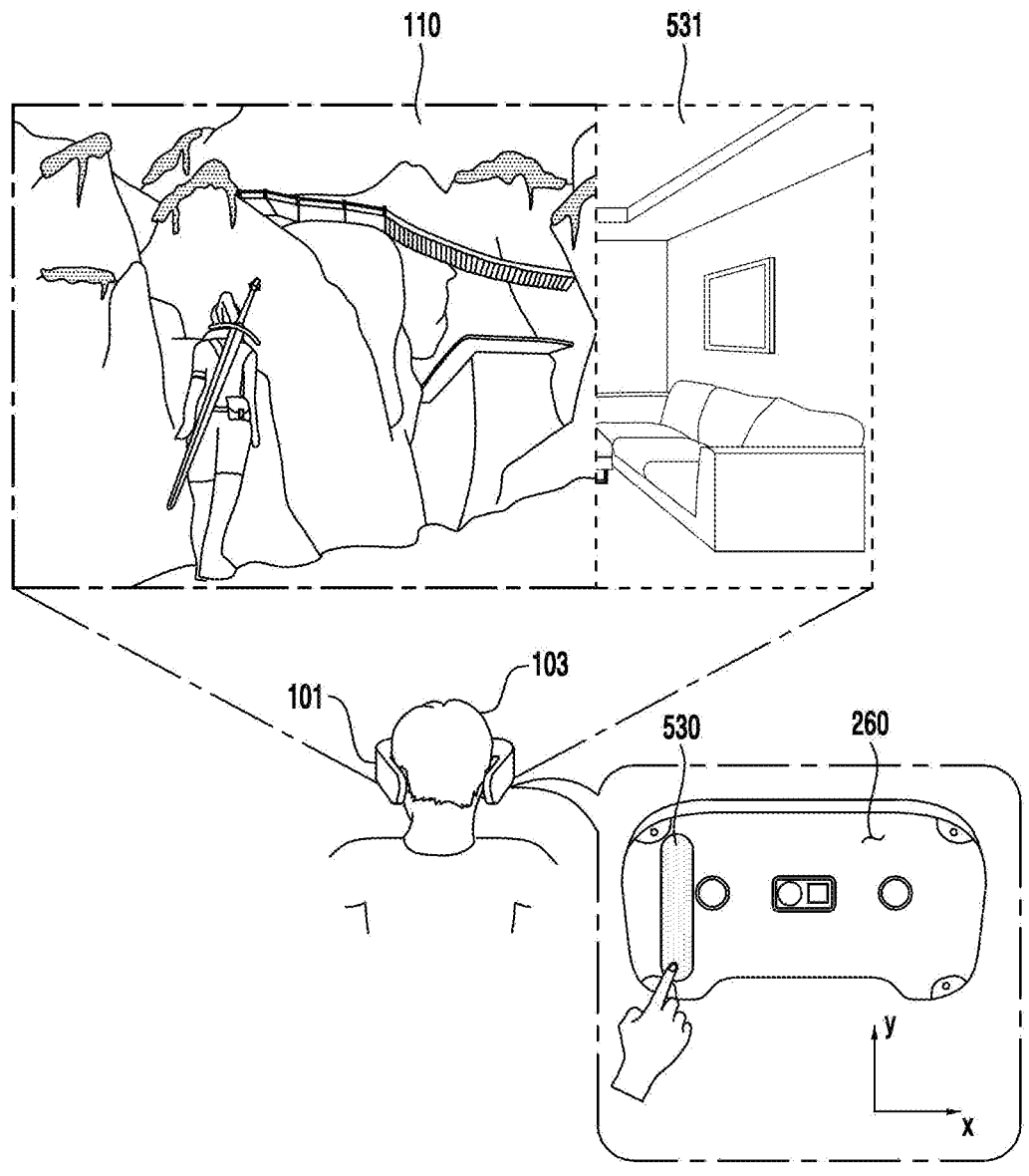
FIG. 5C illustrates an example associated with a use state of a wearable device, according to an embodiment.
Figure 5D:
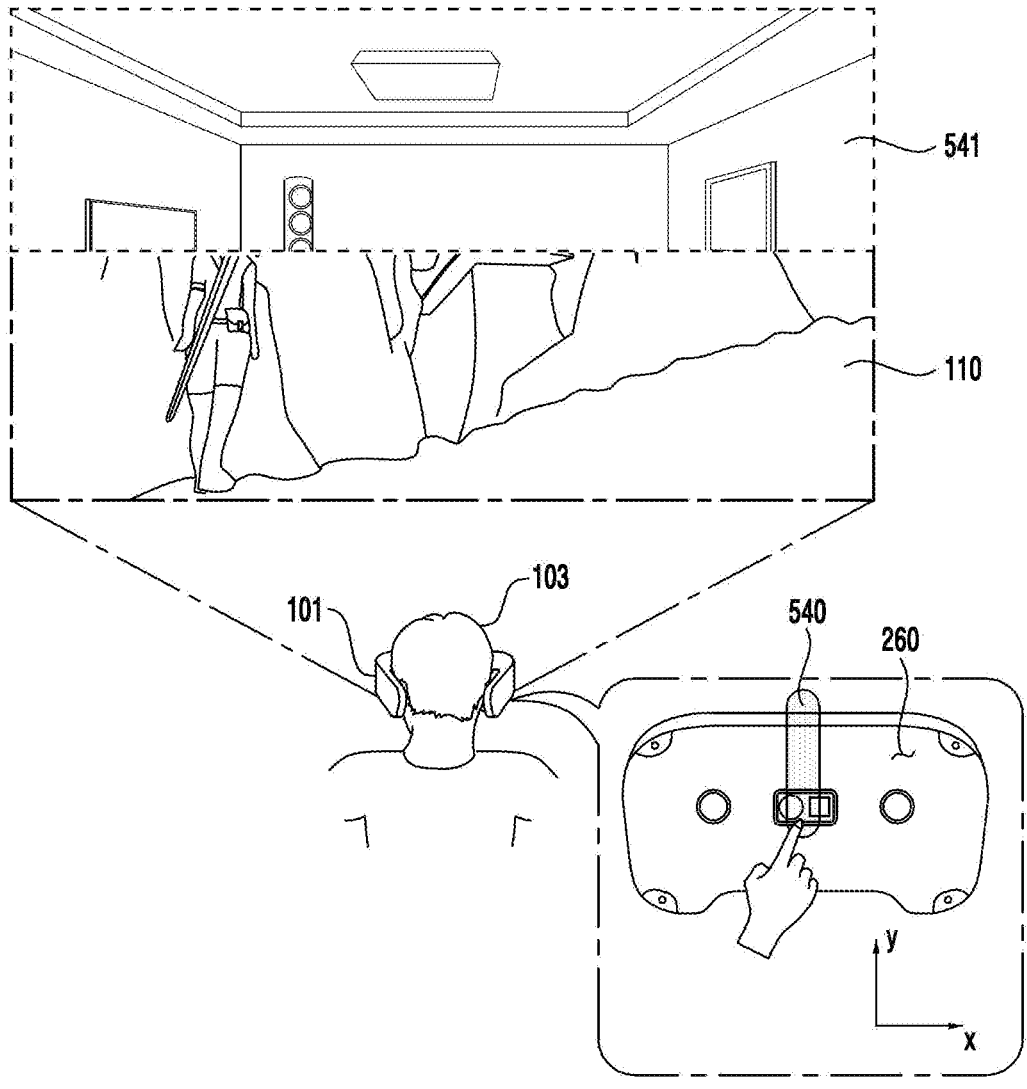
FIG. 5D illustrates an example associated with a use state of a wearable device, according to an embodiment.
Figure 5E:
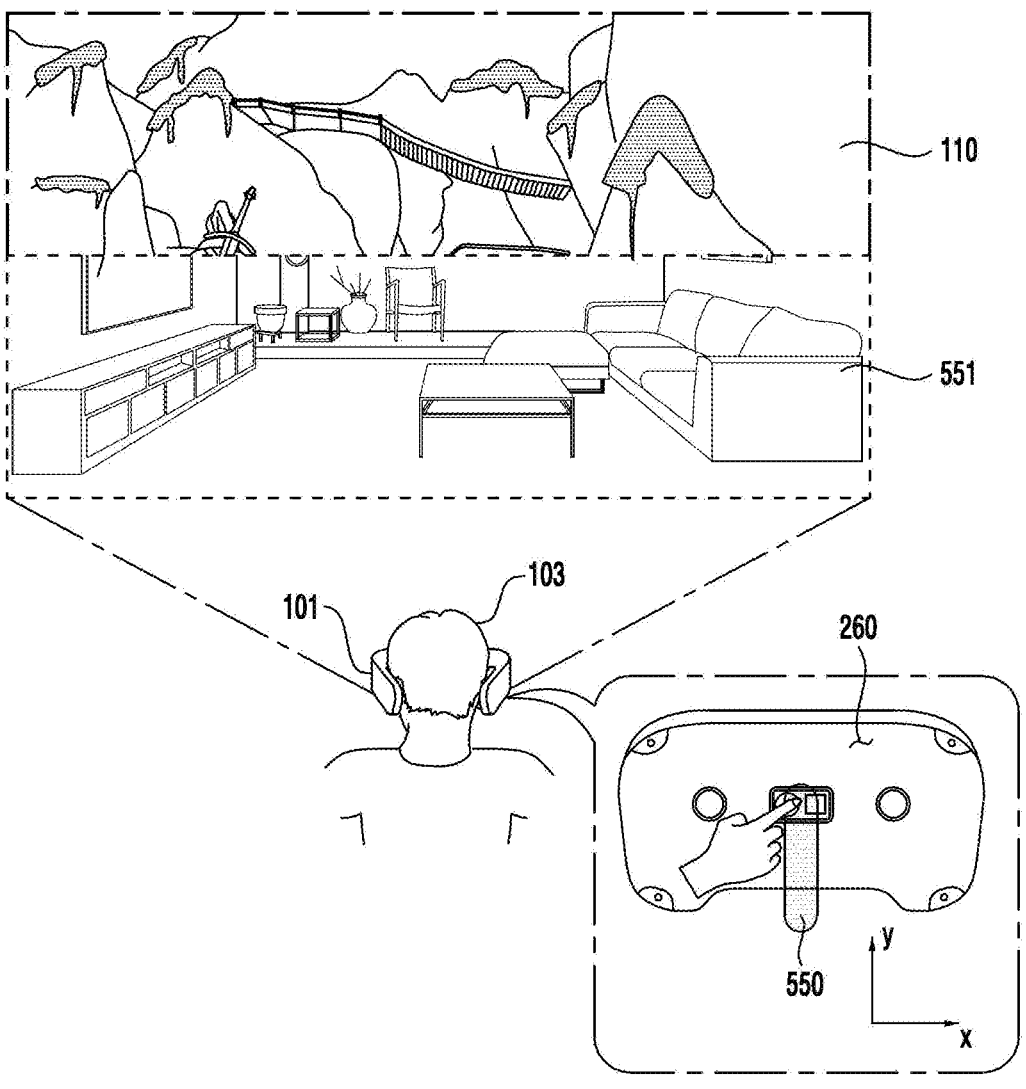
FIG. 5E illustrates an example associated with a use state of a wearable device, according to an embodiment.
Figure 5F:
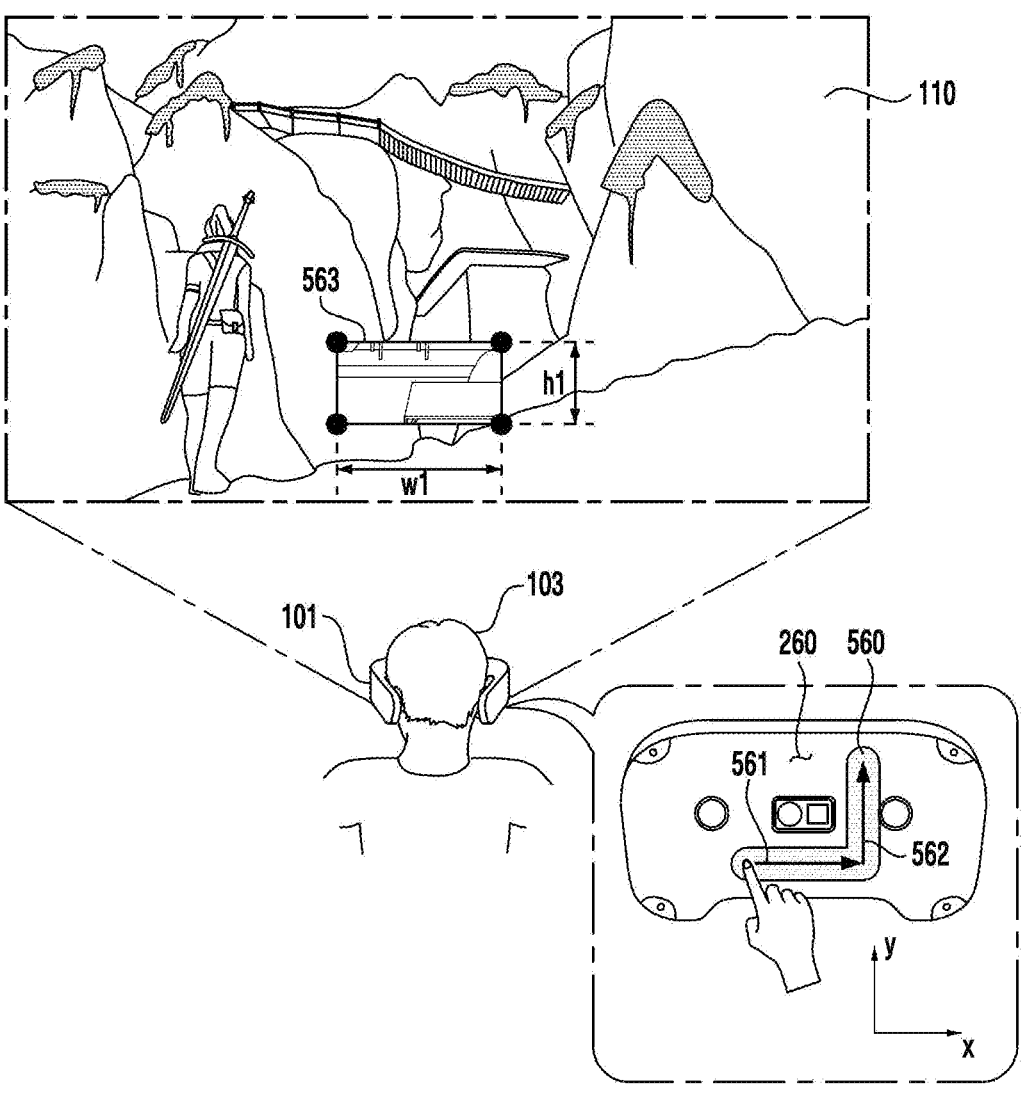
FIG. 5F illustrates an example associated with a use state of a wearable device, according to an embodiment.

FIG. 5A illustrates an example associated with a use state of a wearable device. FIG. 5B illustrates an example associated with a use state of a wearable device. FIG. 5C illustrates an example associated with a use state of a wearable device. FIG. 5D illustrates an example associated with a use state of a wearable device. FIG. 5E illustrates an example associated with a use state of a wearable device. FIG. 5F illustrates an example associated with a use state of a wearable device. A wearable device 101 of FIGS. 5A, 5B, 5C, 5D, 5E, and/or 5F may include the wearable device 101 of FIGS. 1, 2, 3A, 3B, 3C, 3D, 3E, 3F, 3G, 4A, 4B, and/or 4C. Operations of FIGS. 5A, 5B, 5C, 5D, 5E, and/or 5F may be performed by the processor 210 of FIG. 2.

Drag inputs 510, 520, 530, 540, 550, and 560 of FIGS. 5A, 5B, 5C, 5D, 5E, and/or 5F may include a drag input in the y axis direction (e.g. a first direction) similar to or identical to the drag inputs 330, 340, 350, and 360 of FIGS. 3C, 3D, and 3F. For example, the drag input in the y axis direction may include a drag input in a height direction of the wearable device 101.

Referring to FIG. 5A, according to an embodiment, the wearable device 101 receives a drag input 510 on a second surface opposite to a first surface on which a display is disposed. The wearable device 101 may receive the drag input 510 while a virtual space 110 is provided. The drag input 510 may include a drag input in the −y axis direction. The drag input 510 may include a drag input 510 of, on or in a left area (e.g., an area around an end of the +x axis of FIG. 5A; e.g., when worn by a user, the drag input 510 is on a left side of the second surface from the perspective of the user, thereby being of a left area) based on a center of the wearable device 101 in a width direction (e.g. perpendicular to the height direction). For example, the drag input 510 includes a drag input identified within an area including a left edge of the wearable device 101 (e.g. from the perspective of the user wearing the wearable device 101). The wearable device 101 may identify an area 511 for displaying an image in a virtual space, based on receiving of the drag input 510.

The wearable device 101 may identify a left area (e.g., an area around an end of the −x axis of FIG. 5A) provided through a display as an area 511 for displaying an image, based on the drag input 510 identified (or being identified) within the area including the left edge of the wearable device 101. For example, the wearable device 101 identifies an area corresponding to the drag input 510 as the area 511 for displaying an image.

The wearable device 101 may identify a path of the drag input 510. The wearable device 101 may segment an image obtained through a camera, in response to identifying the path of the drag input 510. The wearable device 101 may obtain a portion of the segmented image. The wearable device 101 may display the portion of the segmented image in the area 511.

Optionally, the wearable device 101 changes transparency of the portion of the image displayed through the area 511, based on at least one of the number of the drag input 510 repeatedly performed by a user and/or pressure of an external object performing the drag input 510. For example, the wearable device 101 changes the transparency based on the number of times of the drag input 510 repeatedly performed on the second surface 260. The wearable device 101 may display the portion in the area 511, according to transparency proportional to the number of times. In an embodiment in which the wearable device 101 includes an impact sensing touch sensor, the wearable device 101 may change transparency of the portion of the image displayed through the area 511, based on pressure of the external object performing the drag input 510. The wearable device 101 may display the portion within the area 511, according to transparency proportional to and/or inversely proportional to the pressure.

Referring to FIG. 5B, the wearable device 101 may identify one or more of drag inputs 520-1, 520-2, and 520-3 on a second surface opposite to a first surface on which a display is disposed. For example, while a virtual space 110 is provided, the wearable device 101 identifies one or more of the drag inputs 520-1, 520-2, and 520-3. Each of the drag inputs 520-1, 520-2, and 520-3 may include a drag input in the −y axis direction (or in the height direction). Each of the drag inputs 520-1, 520-2, and 520-3 may include a drag input of, on or in an area including the center of the wearable device 101 in the width direction. For example, each of the drag inputs 520-1, 520-2, and 520-3 include a drag input identified within an area including a center point of the wearable device 101. The wearable device 101 may identify an area 521 for displaying an image in a virtual space, based on identifying of the drag inputs 520-1, 520-2, and 520-3.

The drag input 520-1 may be a drag input in which a single contact point is identified when the drag input is initiated (e.g. for drag input 520-1, a single external object is identified as providing or performing the drag input). The drag input 520-2 may be a drag input in which a plurality of contact points are identified when the drag input is initiated (e.g. for drag input 520-2, a plurality of external objects are identified as providing or performing the drag input). The wearable device 101 may identify width of the area 521 in which an image is to be displayed, based on the plurality of contact points. For example, the drag input 520-3 includes a drag input in which a contact area is identified. For example, when a plurality of contact points are identified within a designated distance, the wearable device 101 may identify an area including the plurality of contact points. The wearable device 101 may identify an area 521 for displaying an image, based on identifying one of the drag inputs 520-1, 520-2, and 520-3.

For example, the wearable device 101 identifies a center area of a screen provided through the display as the area 521 for displaying an image, in response to one of drag inputs 520-1, 520-2, and 520-3 being identified within an area including the center point of the wearable device 101. For example, the wearable device 101 identifies an area corresponding to the identified one of drag inputs 520-1, 520-2, and 520-3 as the area 521 for displaying an image.

For example, the wearable device 101 identifies a path of the identified one of drag inputs 520-1, 520-2, and 520-3. The wearable device 101 may segment an image obtained through a camera, based on identifying the path. The wearable device 101 may obtain a portion of the segmented image. The wearable device 101 may display the portion of the segmented image in the area 521.

Referring to FIG. 5C, the wearable device 101 may receive a drag input 530 on a second surface opposite to a first surface on which a display is disposed. For example, the wearable device 101 receives the drag input 530, while a virtual space 110 is provided. The drag input 530 may include a drag input in the −y axis direction (or in the height direction). The drag input 530 may include a drag input 530 of, on or in a right area (e.g., an area around an end of the −x axis of FIG. 5C) based on a center of the wearable device 101 in the width direction, the drag input 530 may include a drag input identified within an area including a right edge of the wearable device 101 (e.g. from the perspective of the user wearing the wearable device 101). In response to receiving the drag input 530, the wearable device 101 may identify an area 511 for displaying an image in the virtual space 110.

For example, the wearable device 101 identifies a right area (e.g., an area around an end of the +x axis of FIG. 5C) of a screen provided through a display as an area 531 for displaying an image, in response to the drag input 530 identified within an area including a right edge of the wearable device 101. The wearable device 101 may identify an area corresponding to the drag input 530 as the area 531 for displaying an image.

For example, the wearable device 101 identifies a path of the drag input 530. The wearable device 101 may segment an image obtained through a camera, based on identifying the path. The wearable device 101 may obtain a portion of the segmented image. The wearable device 101 may display the portion of the segmented image in the area 531.

The drag inputs 510, 520-1, 520-2, 520-3, and 530 of FIGS. 5A, 5B, and/or 5C described above may include a drag input having a path from an upper edge to a lower edge of the wearable device 101.

Referring to FIG. 5D, the wearable device 101 may provide a virtual space 110 through a display disposed on a first surface. The wearable device 101 may receive a drag input 540 on a second surface opposite to the first surface, while the virtual space 110 is provided. The drag input 540 may include the third drag input 330 of FIG. 3C. For example, the wearable device 101 identifies an area 541 for displaying an image in the virtual space 110, based on receiving the drag input 540.

For example, the area 541 has a width corresponding to a width of a screen in which the virtual space 110 is displayed and a height corresponding to (e.g. based on) a path of the drag input 540. The area 541 may have a height corresponding to a length of the drag input 540 from the upper edge of the screen, based on the drag input 540 being identified in the −y axis direction. The height may be changed according to a set sensitivity, such as set in the wearable device 101 according to a user selection, manufacturer configuration or other suitable method.

The wearable device 101 may identify the path of the drag input 540. The wearable device 101 may segment an image obtained through a camera, based on the path of the drag input 540. The wearable device 101 may display a portion of the segmented image in the area 541.

Referring to FIG. 5E, the wearable device 101 may provide the virtual space 110 through a display disposed toward the first surface. The wearable device 101 may receive a drag input 550 on a second surface opposite to the first surface, while the virtual space 110 is provided. For example, the drag input 550 includes the fifth drag input 350 of FIG. 3E. The wearable device 101 may identify an area 551 for displaying an image in the virtual space 110, based on receiving the drag input 550.

For example, the area 551 has a width corresponding to the width of the screen in which the virtual space 110 is displayed and a height corresponding to (e.g. based on) a path of the drag input 550. The area 551 may have a height corresponding to a length of the drag input 550 from the lower edge of the screen, based on that the drag input 550 is identified in the +y axis direction. The height may be changed based on a set sensitivity, such as set in the wearable device 101 according to a user selection, manufacturer configuration or other suitable method.

The wearable device 101 may identify the path of the drag input 550. The wearable device 101 may segment an image obtained through a camera, based on the path of the drag input 550. The wearable device 101 may display a portion of the segmented image in the area 541.

As described above, according to an embodiment, the wearable device 101 identifies an area for displaying an image, based on a drag input in the y axis direction (or a drag input in a direction corresponding to a height of the wearable device 101). The wearable device 101 may segment an image obtained through a camera, based on a drag input in the y axis direction. The wearable device 101 may display a portion of the segmented image in the area for displaying the image. The wearable device 101 may provide a portion of a surrounding environment of the wearable device 101 based on the drag input. The wearable device 101 may enhance user convenience by providing the surrounding environment in response to the drag input. The wearable device 101 may enhance user experience by providing the surrounding environment of the wearable device 101 in response to the drag input.

Referring to FIG. 5F, the wearable device 101 may receive a drag input 560 having a path in a first direction 561 and a second direction 562. The first direction 561 may correspond to the x axis direction (e.g. the width direction), on a second surface opposite to a direction of a first surface toward which the display faces; and the second direction 562 may correspond to the y axis direction (e.g. the height direction), on the second surface opposite to the direction of the first surface toward which the display faces. For example, the wearable device 101 identifies a width w1 of an area 563 for displaying an image in the virtual space 110, while receiving the drag input 560 in the first direction 561. The wearable device 101 may identify a height h1 of the area 563 for displaying an image in the virtual space 110, while receiving the drag input 560 in the second direction 562. In other words, the wearable device 101 identifies w1 and h1 based on the drag input 560 or, more specifically, based on the component of the drag input 560 in the first direction 561 and the component of the drag input 560 in the second direction 562, respectively.

The wearable device 101 may identify the area 563 for displaying an image, in response to a drag input 560 having a first path in the first direction 561 and a second path in the second direction 562. For example, the wearable device 101 identifies the width w1 of the area 563 for displaying an image based on a length of the first path, and. the wearable device 101 may identify the height h1 of the area 563 for displaying an image based on a length of the second path. Based on identifying the width w1 and the height h1, the wearable device 101 may segment an image obtained through a camera and display the image in an area for displaying an image. The wearable device 101 may display a portion of the segmented image in the area 563 for displaying an image.

In an embodiment, one or more of the drag inputs 510, 520-1, 520-2, 520-3, 530, 540, 550, and 560 described with reference to FIGS. 5A to 5F are identified by a camera (e.g., the camera 240 of FIG. 2) of the wearable device 101 and/or an external electronic device (e.g., a remote controller) connected to the wearable device 101. For example, in an external space capable of being identified through the camera of the wearable device 101 (e.g. a space in front of the camera), the wearable device 101 may detect a body part that is moved from a point of a boundary line of the external space (or elsewhere in the external space) to another point in the external space, where, optionally, the body part has a designated posture (e.g. the body part is forming a predetermined gesture). For example, the wearable device 101 identifies a hand that is moved from a first point of the boundary line to a second point of the boundary line and has a posture in which an index finger is open. In the example, the wearable device 101 identifies an area for displaying an image based on a path connecting the second point from the first point, based on the hand. In the example, the wearable device 101 may process an input performed by a hand moved from the first point to the second point similar to one or more of the drag inputs 510, 520-1, 520-2, 520-3, 530, 540, 550, and 560 described with reference to FIGS. 5A to 5F. Based on identifying the area, the wearable device 101 may display a visual object (or indicator) guiding (e.g. informing or indicating) that at least a portion of the image (being an image captured by a/the camera of the wearable device 101) is to be displayed, in the virtual space. The visual object may include a visual cue of FIGS. 7A to 7F.

In an embodiment, the wearable device 101 identifies an input for setting an area in which an image obtained through a camera is to be displayed in a screen, based on a remote controller, similar to one or more of the drag inputs 510, 520-1, 520-2, 520-3, 530, 540, 550, and 560 of FIGS. 5A to 5F. For example, when a user moves the remote controller, optionally in a state of pressing a designated button of the remote controller paired with the wearable device 101, the wearable device 101 identifies a path of the remote controller while the designated button is pressed, based on a signal transmitted from the remote controller. The wearable device 101 may identify an area in which at least a portion of an image obtained from a camera of the wearable device 101 is to be displayed, in the virtual space, based on the path. A size and/or a shape of the area may correspond to the path. Based on identifying the area, the wearable device 101 may display a visual object (or indicator) guiding (e.g. informing or indicating) that at least a portion of the image is to be displayed in the virtual space. The visual object may include a visual cue of FIGS. 7A to 7F.

As described above, according to an embodiment, the wearable device 101 adjusts a size of an area for displaying an image, based on the drag input 560. The wearable device 101 may display a portion of an image, which is obtained through a camera and segmented based on the drag input 560, within the area whose the size is adjusted. The wearable device 101 may enhance user convenience of the wearable device 101 by providing a portion of the image segmented by the drag input 560 together with a virtual space.

Figure 6A:
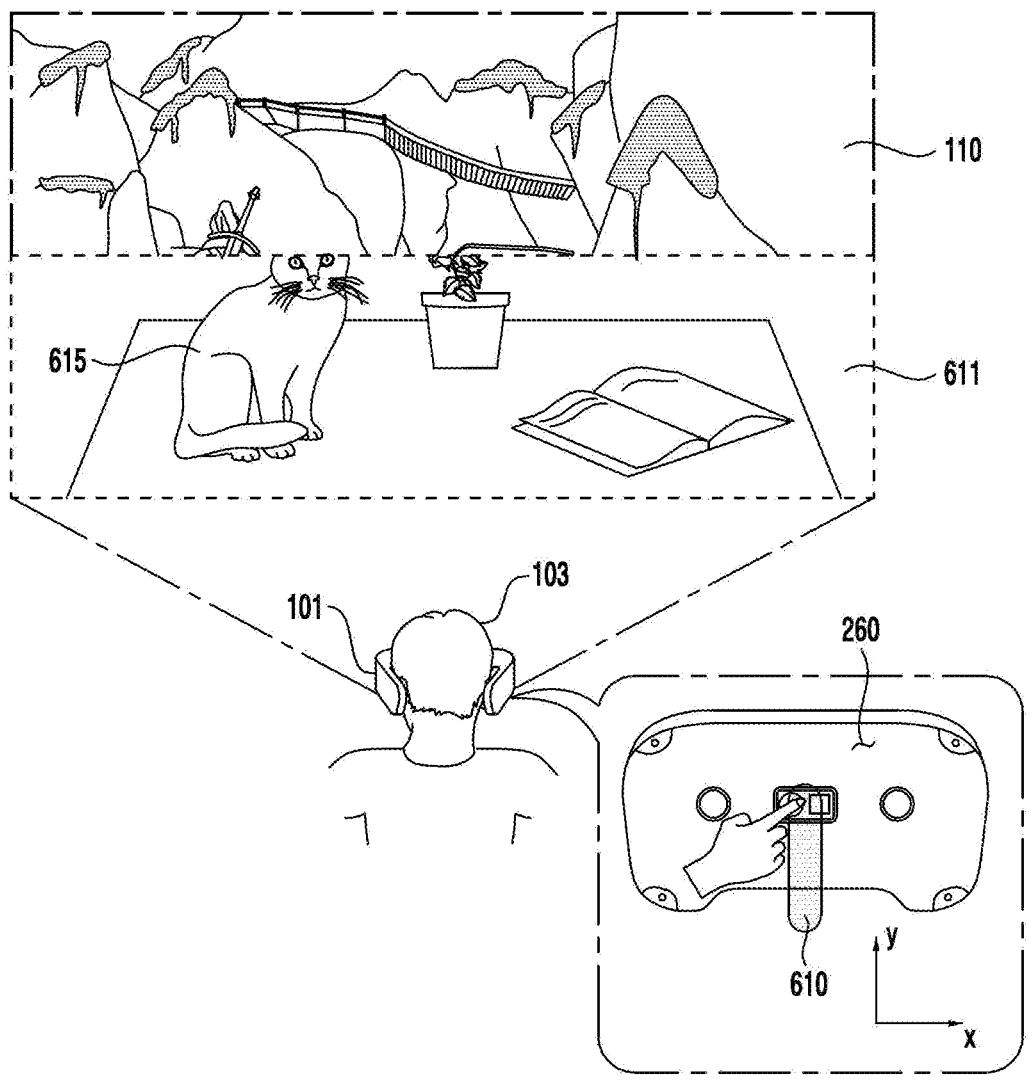
FIG. 6A illustrates an example of a wearable device identifying a visual object corresponding to an external object, according to an embodiment.
Figure 6B:
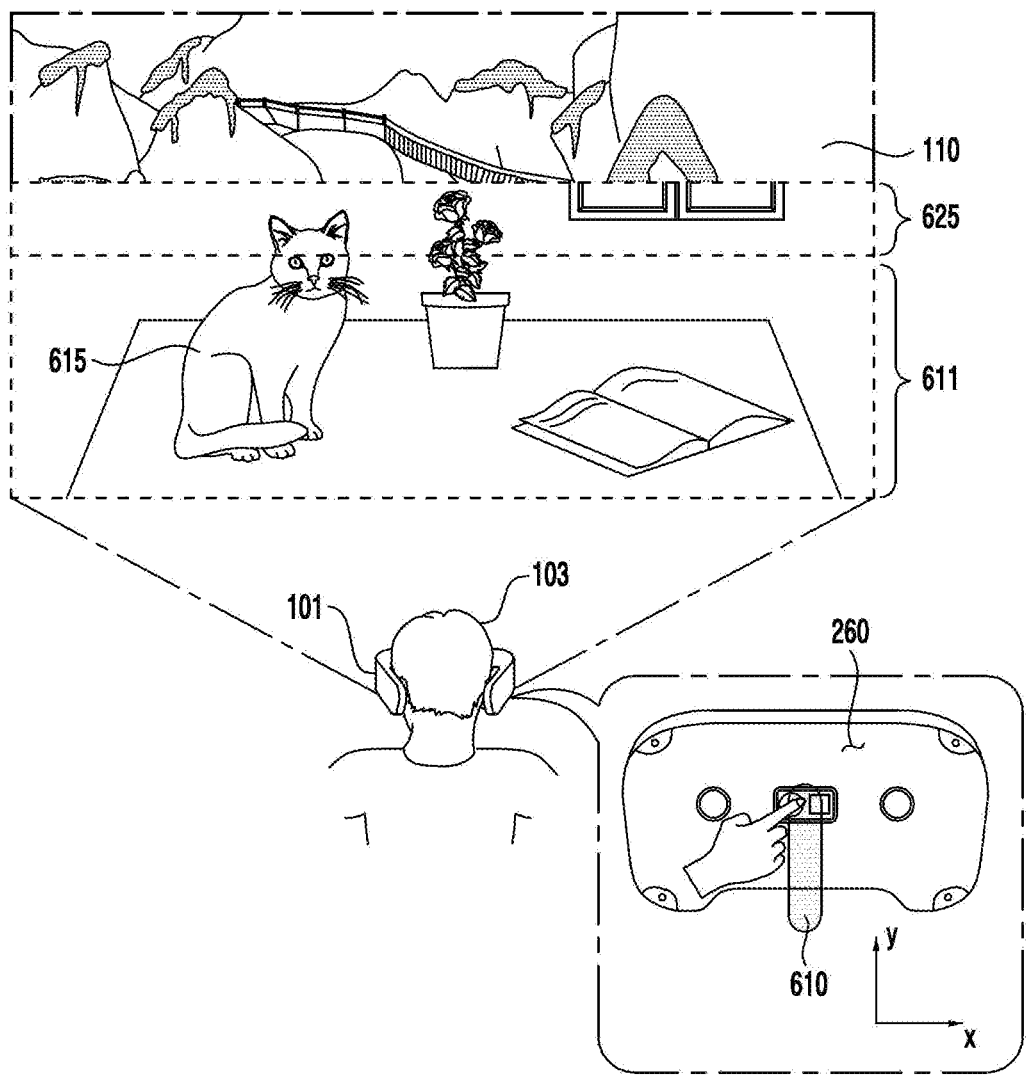
FIG. 6B illustrates an example of a wearable device identifying a visual object corresponding to an external object, according to an embodiment.
Figure 6C:
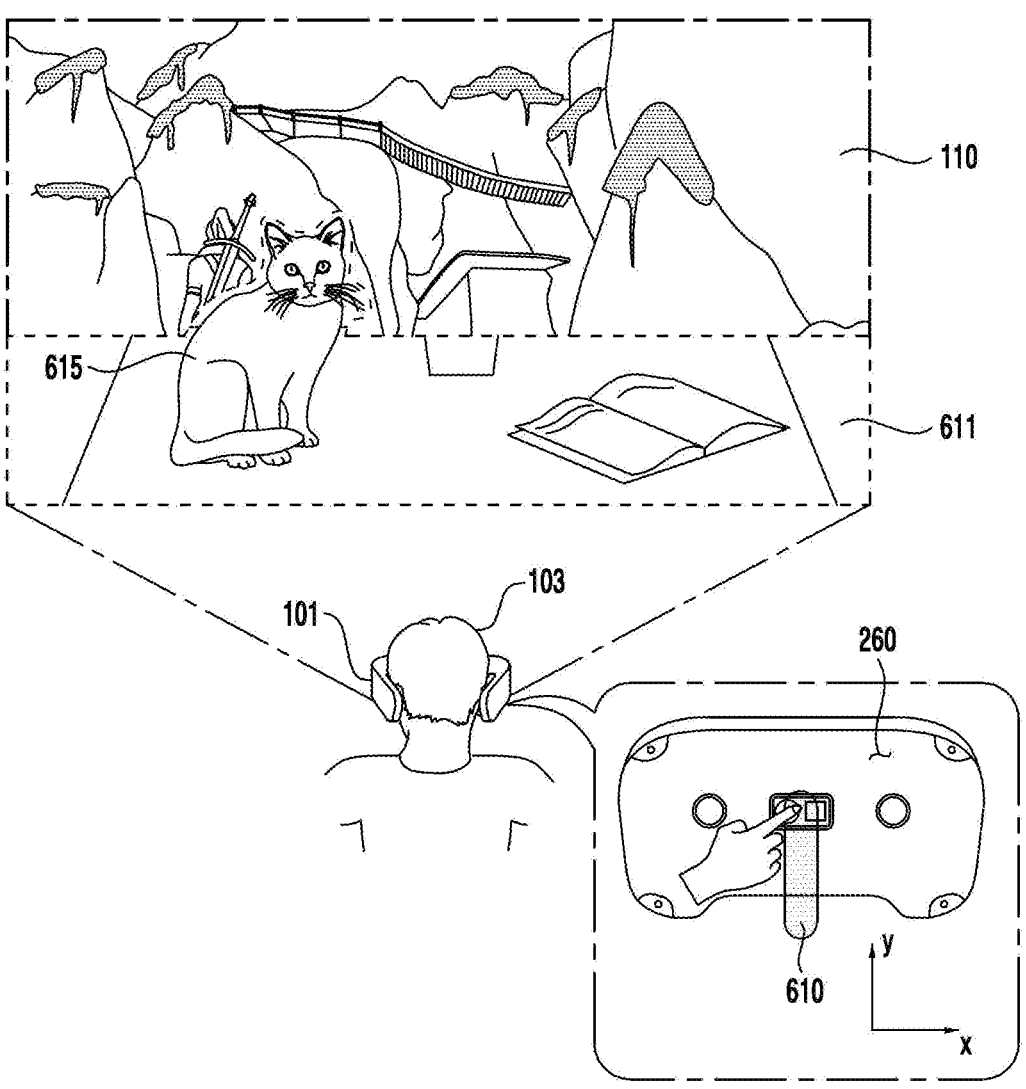
FIG. 6C illustrates an example of a wearable device identifying a visual object corresponding to an external object, according to an embodiment.

FIG. 6A illustrates an example of a wearable device identifying a visual object corresponding to an external object. FIG. 6B illustrates an example of a wearable device identifying a visual object corresponding to an external object. FIG. 6C illustrates an example of a wearable device identifying a visual object corresponding to an external object. A wearable device 101 of FIGS. 6A, 6B, and/or 6C may include the wearable device 101 of FIGS. 1, 2, 3A, 3B, 3C, 3D, 3E, 3F, 3G, 4A, 4B, 4C, 5A, 5B, 5C, 5D, 5E, and/or 5F. Operations of FIGS. 6A, 6B, and/or 6C may be performed by the processor 210 of FIG. 2.

Referring to FIG. 6A, FIG. 6B, and/or FIG. 6C, the wearable device 101 may provide a virtual space 110 through a display disposed on a first surface of the wearable device 101. For example, the wearable device 101 displays a screen representing the virtual space 110 through the display. While displaying the virtual space 110, the wearable device 101 may receive a drag input 610 on a second surface opposite to the first surface. For example, the drag input 610 may be referred to as (e.g. correspond to) the fifth drag input 350 of FIG. 3E.

For example, the wearable device 101 identifies an area 611 for displaying an image based on receiving the drag input 610. The wearable device 101 may identify a path of the drag input 610. The wearable device 101 may segment an image obtained through a camera, based on identifying the path of the drag input 610. The wearable device 101 may display a portion of the segmented image within the area 611.

The wearable device 101 may identify a visual object 615 to which an identifier is assigned within the image (e.g. via object recognition in the image obtained through the camera). For example, the identifier is assigned to the visual object 615 by a user of the wearable device 101 or based on data stored in a memory. The wearable device 101 may display all of the visual object 615 based on identifying the visual object 615 to which the identifier is assigned. For example, the wearable device 101 performs an operation for displaying all of the visual objects 615, based on an input with respect to the partially displayed visual object 615.

Referring to FIG. 6B, the wearable device 101 may add, to a height of the area 611, a height corresponding to the visual object 615 to which the identifier is assigned. For example, the wearable device 101 provides the area 611 and an area 625 in a screen of the display to display the visual object 615, for example while displaying part of virtual space 110.

The wearable device 101 may identify movement of the visual object 615. The wearable device 101 may change a height of the area 625 based on the movement of the visual object 615. For example, the wearable device 101 adds and displays the area 625 for displaying all of the visual object 615 to the area 611 corresponding to the drag input 610, in order to display the visual object 615.

The wearable device 101 may adjust the height of the area 625 based on the movement of the visual object 615. The wearable device 101 may display all of the visual object 615 based on adjusting the height of the area 625.

Referring to FIG. 6C, the wearable device 101 may segment the visual object 615; e.g., the wearable device 101 may crop an area of the image obtained through the camera around the visual object 615 to leave the visual object 615, where the cropped area corresponds to an area outside of area 611. For example, the wearable device 101 segments the visual object 615 while displaying an image obtained through a camera in the area 611 for displaying an image. The wearable device 101 may display the segmented visual object 615 together with the area 611. For example, the wearable device 101 may track the visual object 615 to which the identifier is assigned. The wearable device 101 may track the visual object 615 and display the visual object 615 together with the virtual space 110 and the area 611.

As described above, according to an embodiment, the wearable device 101 identifies a portion of the visual object 615 within an image obtained through a camera. The wearable device 101 may receive an input for a portion of the visual object 615. The wearable device 101 may perform an operation for displaying all of the visual object 615, based on receiving an input for a portion of the visual object 615. The wearable device 101 may provide the visual object 615 desired by a user of the wearable device 101 together with the virtual space 110, by performing the operation of displaying all of the visual object 615. The wearable device 101 may enhance user experience of the wearable device 101 by providing the visual object 615 together with the virtual space 110.

Figure 7A:
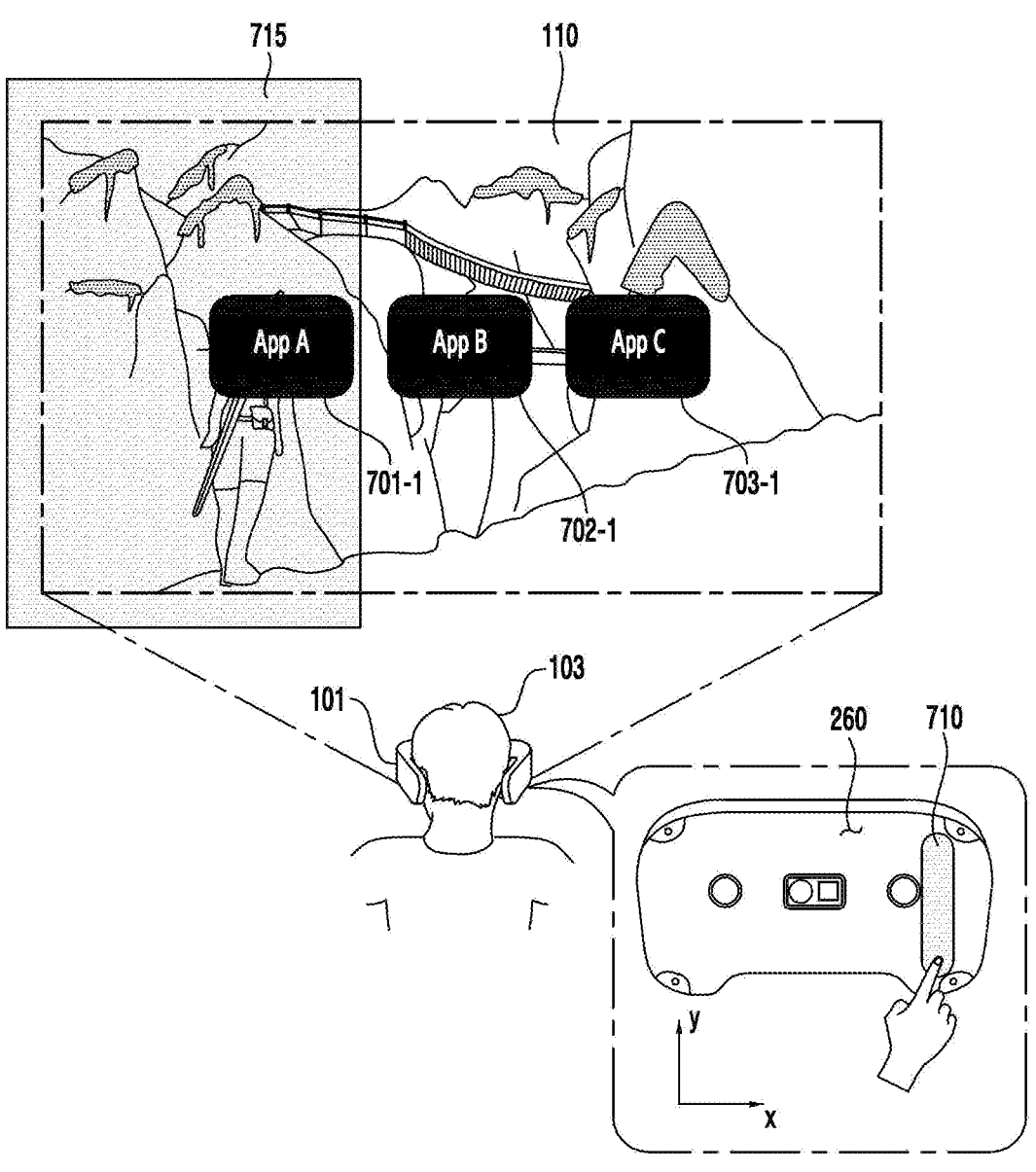
FIG. 7A illustrates an example of a wearable device displaying an interaction available virtual object, according to an embodiment.
Figure 7B:
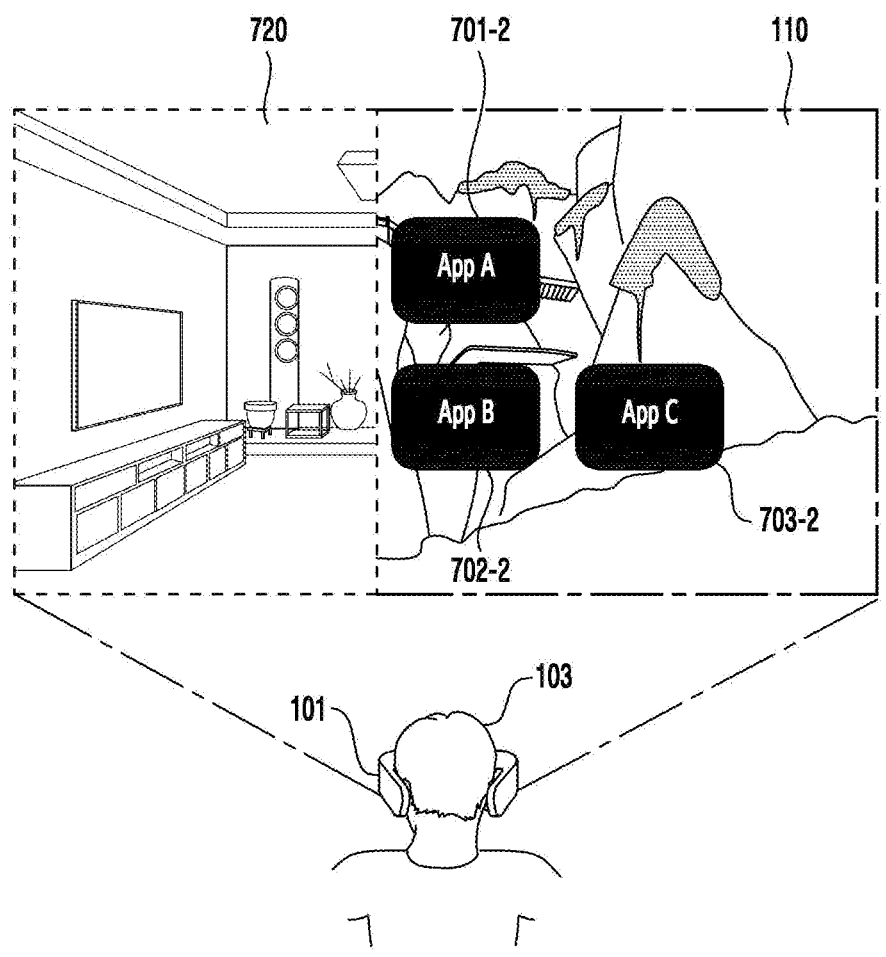
FIG. 7B illustrates an example of a wearable device displaying an interaction available virtual object, according to an embodiment.
Figure 7C:
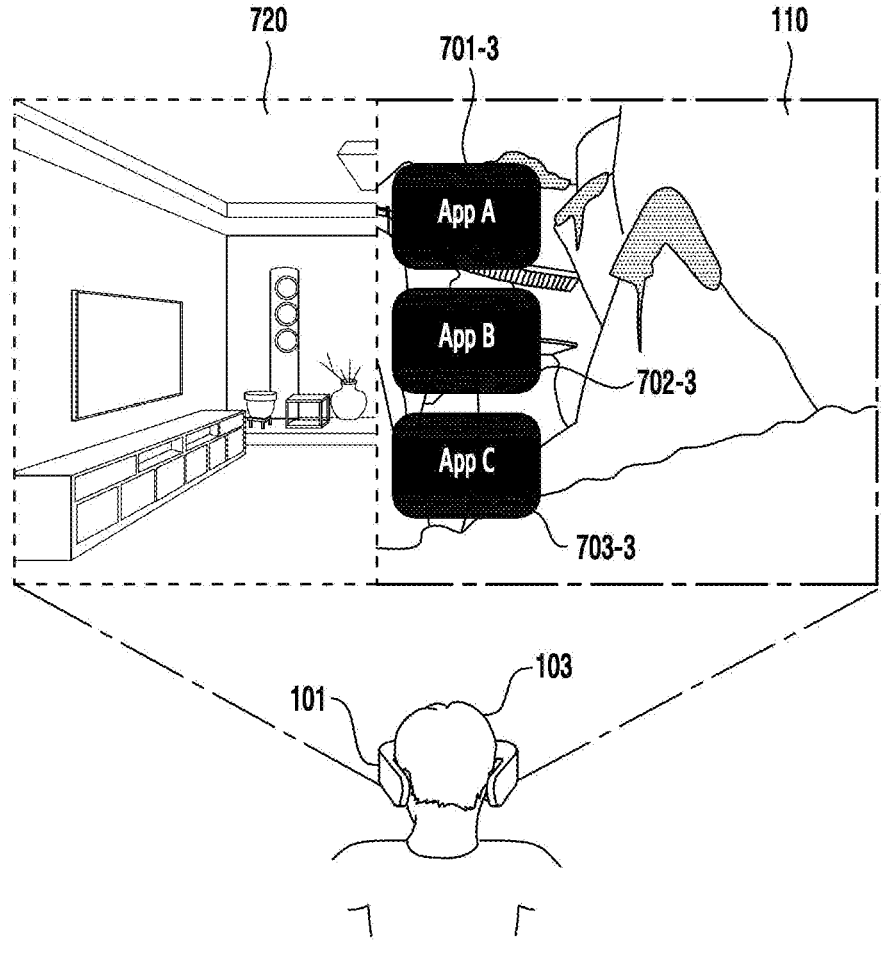
FIG. 7C illustrates an example of a wearable device displaying an interaction available virtual object according to an embodiment.
Figure 7D:
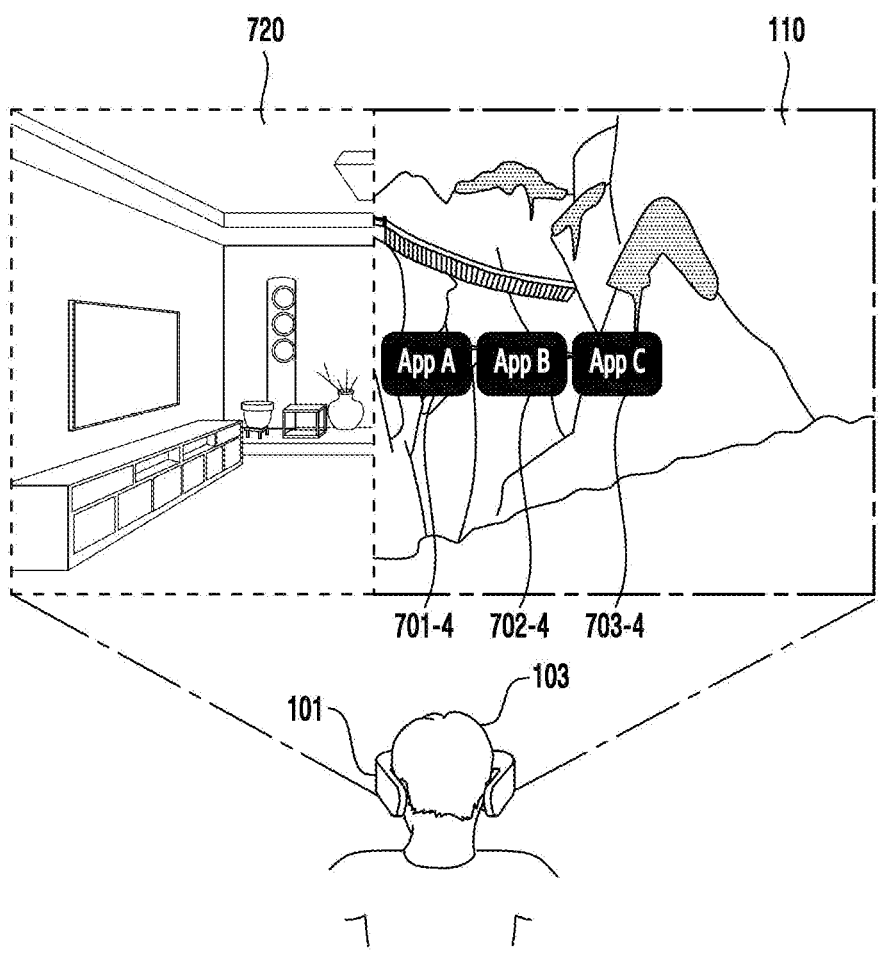
FIG. 7D illustrates an example of a wearable device displaying an interaction available virtual object according to an embodiment.
Figure 7E:
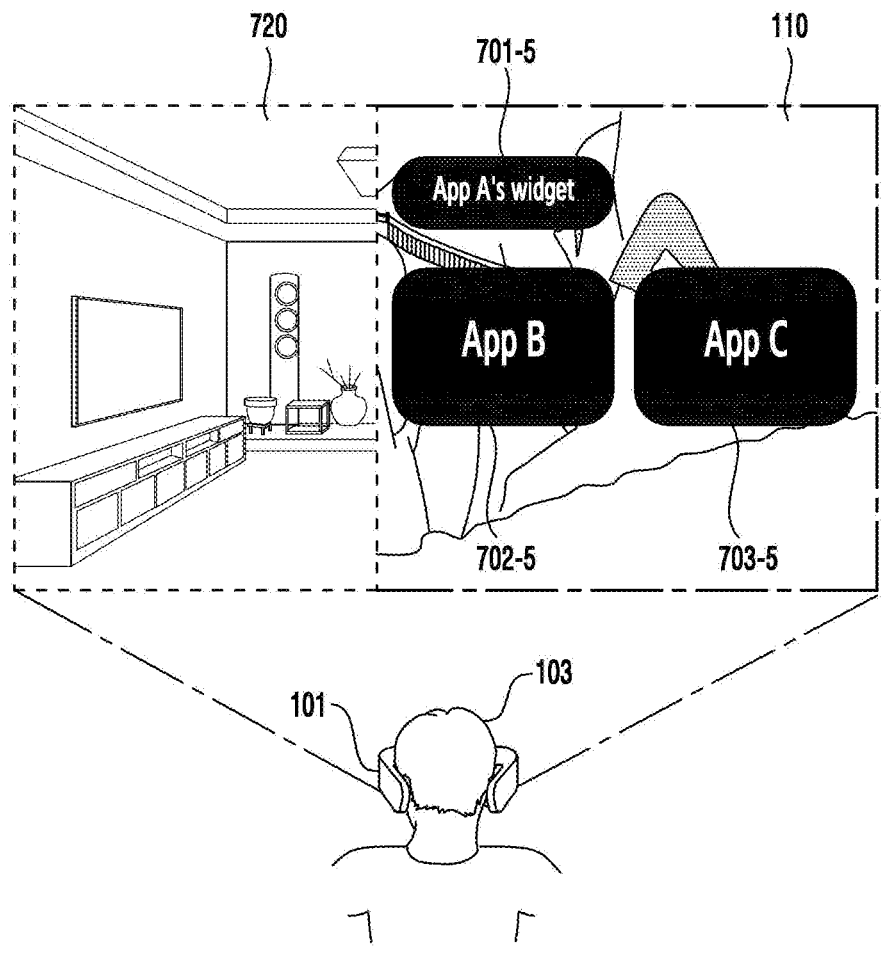
FIG. 7E illustrates an example of a wearable device displaying an interaction available virtual object according to an embodiment.

FIG. 7A illustrates an example of a wearable device displaying an interaction available virtual object. FIG. 7B illustrates an example of a wearable device displaying an interaction available virtual object. FIG. 7C illustrates an example of a wearable device displaying an interaction available virtual object. FIG. 7D illustrates an example of a wearable device displaying an interaction available virtual object. FIG. 7E illustrates an example of a wearable device displaying an interaction available virtual object. A wearable device 101 of FIG. 7A, FIG. 7B, FIG. 7C, FIG. 7D, FIG. 7E, and/or FIG. 7F may include (e.g. correspond to) the wearable device 101 of FIGS. 1, 2, 3A, 3B, 3C, 3D, 3E, 3F, 3G, 4A, 4B, 4C, 5A, 5B, 5C, 5D, 5E, 5F, 6A, 6B, and/or 6C. Operations of FIGS. 7A, 7B, 7C, 7D, 7E, and/or 7F may be performed by the processor 210 of FIG. 2.

Referring to FIG. 7A, the wearable device 101 may display one or more virtual objects 701-1, 702-1, and 703-1 for executing an application while providing a virtual space 110. The wearable device 101 may receive a drag input 710 while displaying the virtual space 110 and the one or more virtual objects 701-1, 702-1, and 703-1. For example, the drag input 710 is illustrated in the −y axis direction, but is not limited thereto. The wearable device 101 may identify an area 715 for displaying the image based on receiving the drag input 710. For example, the wearable device 101 displays the area 715 using a visual object such as a visual cue. Each of the virtual objects 701-1, 702-1, and 703-1 may include an icon for executing an application corresponding to said virtual objects 701-1, 702-1, and 703-1. For example, each of the virtual objects 701-1, 702-1, and 703-1 includes a widget for executing a corresponding application. For example, each virtual object 701-1, 702-1, and 703-1 includes a widget for indicating information provided by the application corresponding to said virtual objects 701-1, 702-1, and 703-1. Each of the virtual objects 701-1, 702-1, and 703-1 may include interaction available virtual objects (i.e., interactable virtual objects). The wearable device 101 may execute a function corresponding to one or more of the virtual objects 701-1, 702-1, and 703-1, in response to an input of/on the one or more of the virtual objects 701-1, 702-1, and 703-1.

For example, the wearable device 101 adjusts transparency of the first virtual object 701-1 superimposed on the area 715 while displaying a visual object representing the area 715, thereby providing a visual cue. The transparency may be associated with an alpha value. For example, transparency decreases as the alpha value becomes greater, and the transparency increases as the alpha value becomes smaller The wearable device 101 may identify the area 715, and change positions and/or size of one or more of the virtual objects 701-1, 702-1, and 703-1 in order to display a portion of an image obtained through a camera on the area 715.

Referring to FIG. 7B, the wearable device 101 may display a portion 720 of an image obtained through a camera, together with the virtual space 110, through a display. The wearable device 101 may display one or more of the virtual objects 701-2, 702-2, and 703-2 while displaying the portion 720 of the image. For example, the wearable device 101 displays the virtual objects 701-2, 702-2, and 703-2 in an area different from an area in which the portion 720 of the image is displayed. For example, the wearable device 101 displays the virtual objects 701-2, 702-2, and 703-2, superimposed on the virtual space 110. In an example of FIG. 7B, the wearable device 101 may display the first virtual object 701-2, by moving the first virtual object 701-2 not to be superimposed on the portion 720 of the image. That is, compared to a position of visual object 701-1 in FIG. 7A, it can be seen that a position of visual object 701-2 in FIG. 7B is different, thereby providing an example of how a visual object may be moved to not be superimposed on the portion 720 of the image.

Referring to FIG. 7C, the wearable device 101 may change arrangement of one of more of the virtual objects 701-3, 702-3, and 703-3. For example, while displaying the portion 720 of the image together with the virtual space 110, the wearable device 101 changes and displays the arrangement of the virtual objects 701-3, 702-3, and 703-3. In an example of FIG. 7C, the virtual objects 701-3, 702-3, and 703-3 are arranged in the y axis direction (or in a height direction). For example, the wearable device 101 arranges the virtual objects 701-3, 702-3, and 703-3 in the y axis direction to be adjacent to the portion 720 of the image. However, it is not limited thereto. For example, the wearable device 101 can arrange the virtual objects 701-3, 702-3, and 703-3 in the x axis direction not to be superimposed on the portion 720 of the image. The wearable device 101 may space and display one or more of the virtual objects 701-3, 702-3, and 703-3 from the portion 720 of the image by a designated distance. When the portion 720 of the image is displayed on the left, the wearable device 101 may display one or more of the virtual objects 701-3, 702-3, and 703-3 to be adjacent to a right edge of the screen.

Referring to FIG. 7D, the wearable device 101 may adjust the size of one or more of the virtual objects 701-4, 702-4, and 703-4. For example, the wearable device 101 displays the virtual objects 701-4, 702-4, and 703-4 by changing the size of each, while providing the portion 720 of the image together with the virtual space 110. The wearable device 101 may display the virtual objects 701-4, 702-4, and 703-4 having a changed size in the virtual space 110. The wearable device 101 may display the virtual objects 701-4, 702-4, and 703-4 having a size smaller than the size before the portion 720 of the image is displayed.

For example, the virtual objects 701-4, 702-4, and 703-4 are represented as a visual object such as an icon and/or a widget. In FIG. 7D, the virtual objects 701-4, 702-4, and 703-4 are illustrated in a form of an icon, but are not limited thereto.

Referring to FIG. 7E, the wearable device 101 may provide virtual objects 701-5, 702-5, and 703-5. For example, the wearable device 101 provides a portion 720 of an image together with a virtual space 110. When providing the portion 720 of the image with the virtual space 110, the wearable device 101 may change the virtual objects 701-5,

702-5, and 703-5 not to be superimposed on the portion 720 of the image. For example, the wearable device 101 changes at least one of the virtual objects 701-5, 702-5, and 703-5 from an icon to a widget. In an example of FIG. 7E, an example in which the first virtual object 701-5 is represented as a widget of a first application is illustrated. For example, the wearable device 101 changes the first virtual object 701-5 into a widget, and changes the size of the second virtual object 702-5 and/or the third virtual object 703-5. The wearable device 101 may provide enlarged size of the second virtual object 702-5 and/or the third virtual object 703-5, and reduced size of the first virtual object 701-5.

For example, the wearable device 101 provides the virtual objects 701-5, 702-5, and 703-5 in order not to be superimposed on an area where the portion 720 of the image is displayed. The wearable device 101 may display the portion 720 of the image on a part of a screen, by providing the virtual objects 701-5, 702-5, and 703-5 through the virtual space 110.

As described above, according to an embodiment, the wearable device 101 displays one or more (e.g. a plurality of) interaction available (i.e. interactable) virtual objects 701-1, 702-1, and 703-1 in the virtual space 110. While displaying the virtual objects, the wearable device 101 may identify an area 715 for displaying a portion 720 of an image. The wearable device 101 may display a portion 720 of an image obtained through a camera, based on the area 715. The wearable device 101 may change a position or adjust a size of the virtual objects 701-1, 702-1, and 703-1, while displaying the portion 720 of the image. The wearable device 101 may enhance convenience of a user provided with an external environment by displaying the virtual objects 701-1, 702-1, and 703-1 only within the virtual space 110, in response to displaying the portion 720 of the image together with the virtual space 110. The wearable device 101 may enhance user experience of the wearable device 101 by providing the portion 720 of the image corresponding to the external environment together with the virtual objects 701-1, 702-1, and 703-1.

Figure 7F:
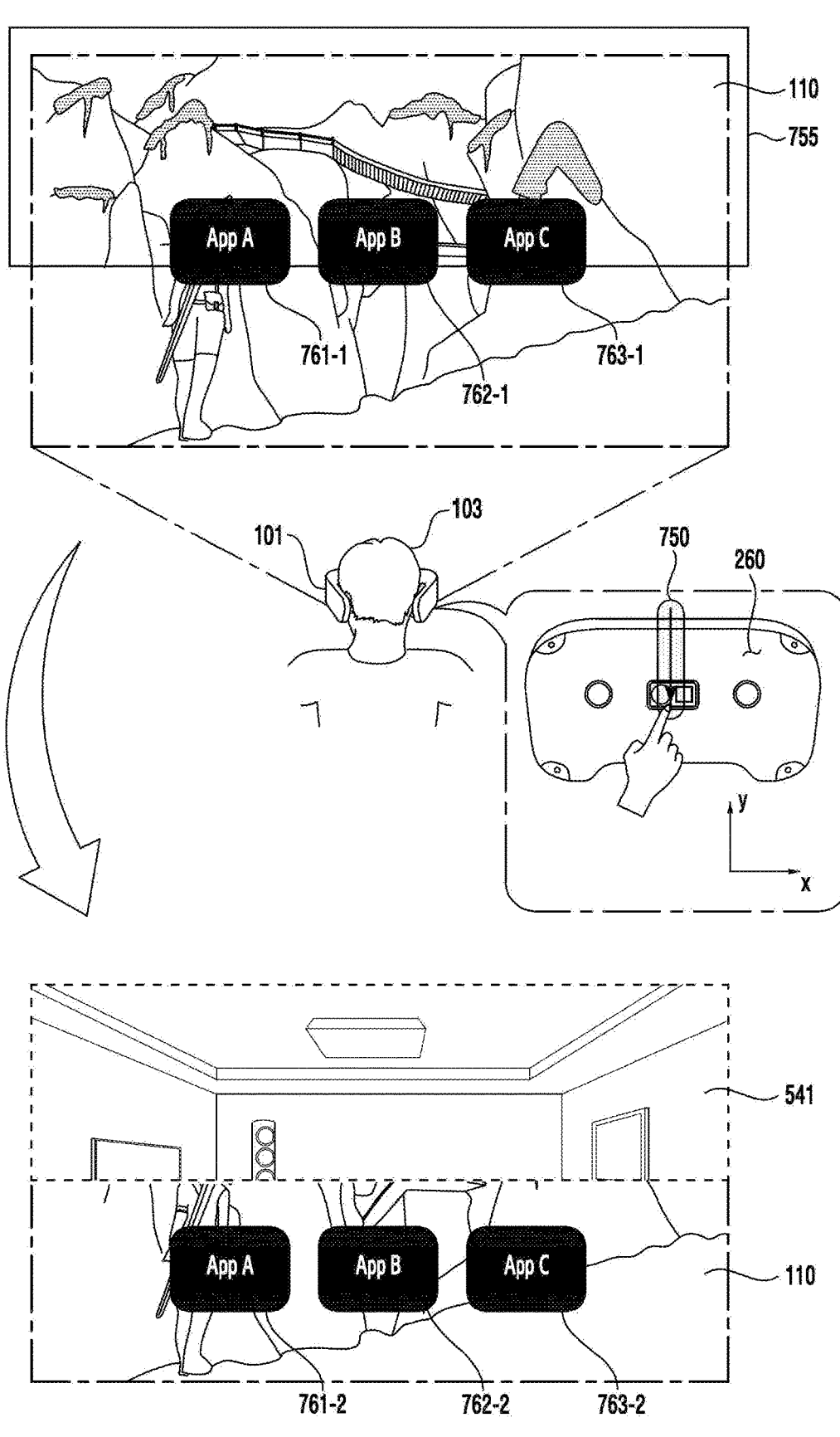
FIG. 7F illustrates an example of a wearable device displaying an interaction available virtual object according to an embodiment.

FIG. 7F illustrates an example of a wearable device displaying an interaction available virtual object. Referring to FIG. 7F, an example of a screen of the wearable device 101 in which executable virtual objects 761-1, 762-1, and 763-1 are displayed is illustrated. The wearable device 101 may display the virtual objects 761-1, 762-1, and 763-1 superimposed on a screen (e.g., a screen for VR) associated with the virtual space 110. In a state in which the screen associated with the virtual space 110 is displayed, the wearable device 101 may receive an input for displaying at least a portion of an image of an external space (e.g. an external environment). The input may include a touch input on a second surface 260 of a housing of the wearable device 101. The virtual objects 761-1, 762-1, and 763-1 of FIG. 7F may correspond to any of the virtual objects 701-1, 702-1, and 703-1 of any of FIGS. 7A to 7E, e.g. having a similar disclosure thereto.

Referring to FIG. 7F, the wearable device 101 may identify an area 755 in which an image for the external space is to be displayed, according to a drag input 750 moved in the −y axis direction on the second surface 260. While receiving the drag input 750, the wearable device 101 may display a visual cue (or a visual affordance) indicating a size of the area 755, superimposed on the screen associated with the virtual space 110. A height of the visual cue may be associated with a distance at which an external object in contact with the second surface 260 is moved in the −y axis direction on the second surface 260. For example, a height of the area 755 and/or a height of the visual cue corresponds to a ratio between a height of the second surface 260 and a distance at which the external object is moved on the second surface 260 along the −y axis direction.

Referring to FIG. 7F, the wearable device 101 receiving the drag input 750 by an external object moving on the second surface 260 in the −y axis direction may display a portion 541 of an image obtained through a camera, together with the virtual space 110. The wearable device 101 may display each of the virtual space 110 and the portion 541 through different portions of the display. In an exemplary case of FIG. 7F, the wearable device 101 may display the virtual space 110 and the portion 541 in each of the portions segmented along a direction of a width from among the width or a height.

Referring to FIG. 7F, in a state of displaying the virtual space 110 and the portion 541 in each of two portions of the display separated by a boundary line formed along a width direction of a display, the wearable device 101 may display the virtual objects 761-2, 762-2, and 763-2 in any one portion of the display on which the virtual space 110 is displayed. For example, the wearable device 101 moves the virtual objects 761-1, 762-1, and 763-1 at least partially superimposed on the area 755 identified by the drag input 750, in response to the drag input 750. The embodiment is not limited thereto, and the wearable device 101 may change a position and/or a size of the virtual objects 761-2, 762-2, and 763-2 displayed in another area, based on a width, a height, and/or a size of another area (e.g., a portion of the display on which the virtual space 110 is displayed) of the display different from the area 755 identified by the drag input 750.

Figure 8A:
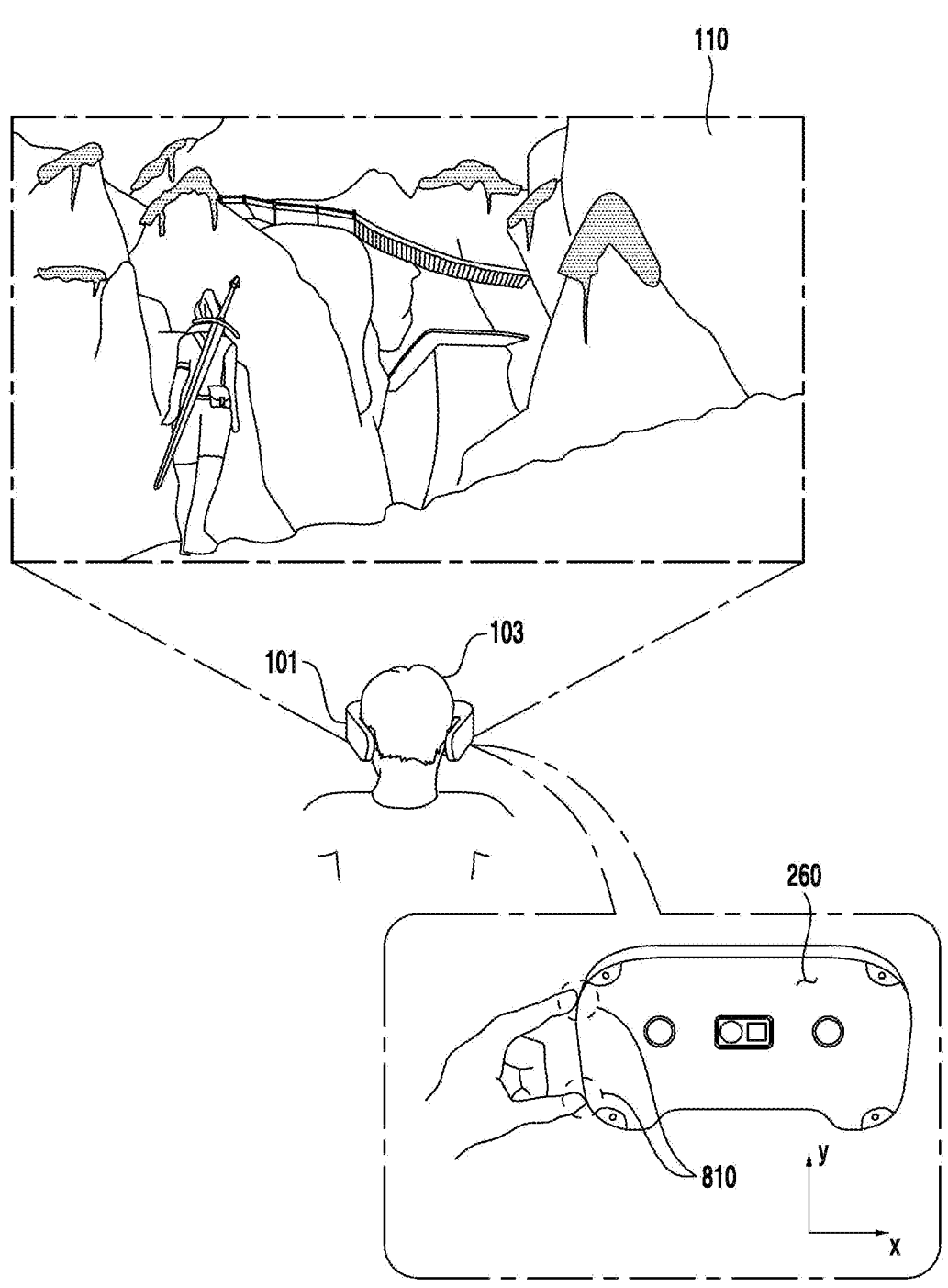
FIG. 8A illustrates an example of a wearable device changing an operation mode, according to an embodiment.
Figure 8B:
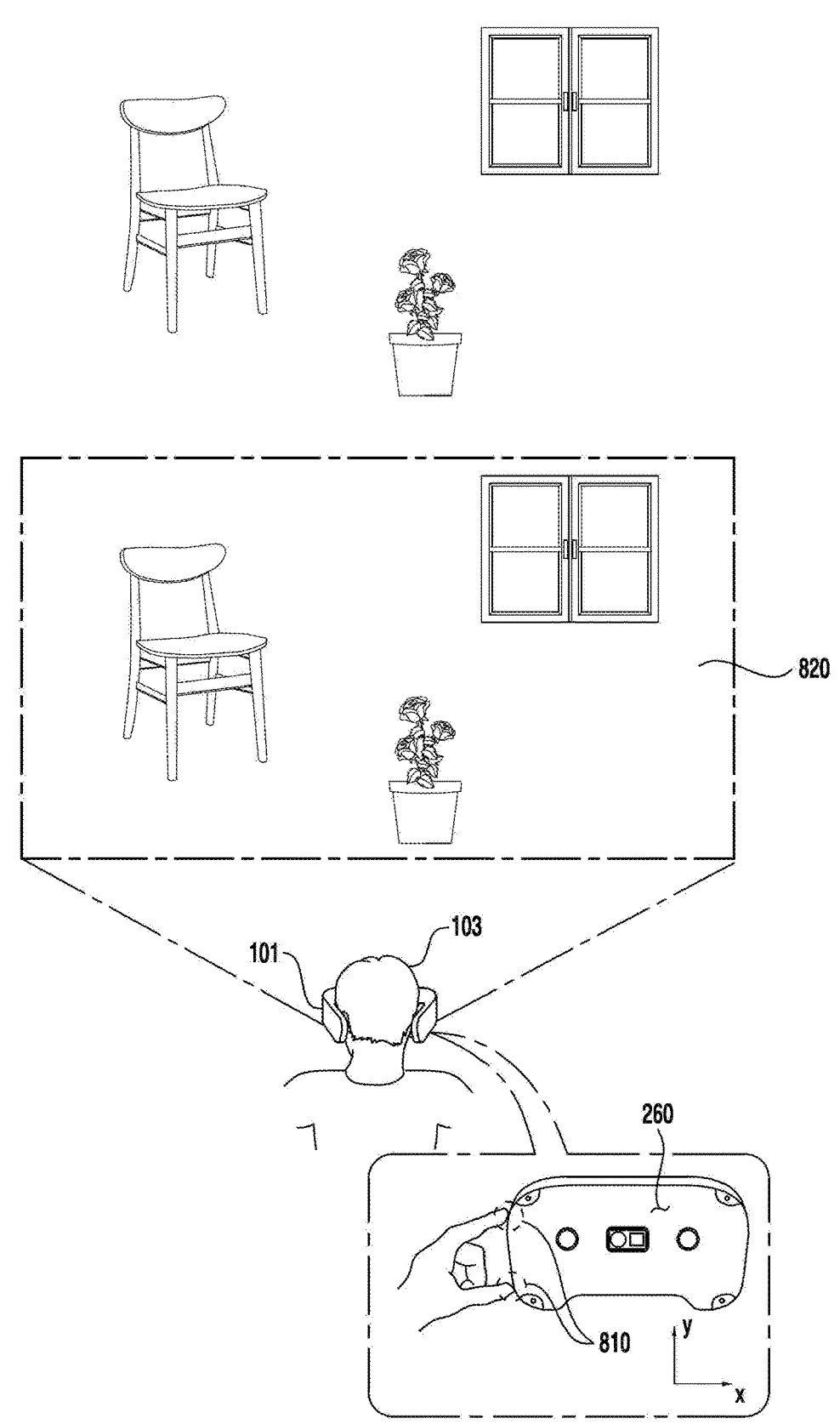
FIG. 8B illustrates an example of a wearable device changing an operation mode, according to an embodiment.

FIG. 8A illustrates an example of a wearable device changing an operation mode. FIG. 8B illustrates an example of a wearable device changing an operation mode. A wearable device 101 of FIG. 8A and/or FIG. 8B may include (e.g., correspond to) the wearable device 101 of FIGS. 1, 2, 3A, 3B, 3C, 3D, 3E, 3F, 3G, 4A, 4B, 4C, 5A, 5B, 5C, 5D, 5E, 5F, 6A, 6B, 6C, 7A, 7B, 7C, 7D, 7E, and/or 7F. Operations of FIG. 8A and/or FIG. 8B may be performed by the processor 210 of FIG. 2.

Referring to FIG. 8A, the wearable device 101 may provide a screen representing the virtual space 110 through a display. The wearable device 101 may receive a touch input for a housing of the wearable device 101 while providing the virtual space 110. For example, the wearable device 101 receives a plurality of touch inputs 810 for the housing. For example, the wearable device 101 may receive touch inputs 810 based on a plurality of contact points. In FIG. 8A, an example in which a plurality of touch inputs 810 for a right edge (e.g., an end of the −x axis of FIG. 8A) of the wearable device 101 are received is illustrated, but is not limited thereto. The wearable device 101 may additionally or alternatively receive a plurality of touch inputs for a left edge; and may receive a plurality of touch inputs for an upper edge and/or a lower edge.

According to an embodiment, the wearable device 101 receives an input (e.g., an input for switching from a VR mode to a VST mode) for displaying an image 820 of an external space (e.g. of part of an external environment), based on a width, a height, a size, and/or an extent (or other characteristic) of a contact surface between a second surface 260 and an external object, identified by a touch sensor (e.g., the touch sensor 251 of FIG. 2). Referring to FIG. 8A, touch inputs 810 based on two fingers may be received by the wearable device 101, such as based on external objects contacted by exceeding a designated extent. The embodiment is not limited thereto, and the wearable device 101 may receive the input by comparing a length of a contact surface between the second surface 260 and an external object with a designated threshold length.

According to an embodiment, the wearable device 101 initiates obtaining an image through a camera, based on receiving a plurality of touch inputs 810. For example, the wearable device 101 may obtain a plurality of images through the camera. The wearable device 101 may obtain a plurality of images through the camera in response to the plurality of touch inputs 810.

Referring to FIG. 8B, the wearable device 101 may at least temporarily cease to display a screen representing the virtual space 110, based on receiving the plurality of touch inputs 810. For example, the wearable device 101 identifies an area for representing the image 820 obtained through the camera in the virtual space 110, based on the plurality of touch inputs 810. The wearable device 101 may display the image 820 obtained through the camera within the area.

The wearable device 101 may identify that the plurality of touch inputs 810 are maintained. For example, the wearable device 101 at least temporarily ceases to display the virtual space 110 and displays the image 820 obtained through the camera, based on the plurality of touch inputs 810 being maintained for a designated duration.

The wearable device 101 may at least temporarily cease to display the entire virtual space 110 and display the image 820 representing an external environment, in response to the plurality of touch inputs 810. For example, the wearable device 101 displays the image 820 obtained through a camera in a part of the virtual space 110, based on the plurality of touch inputs 810. However, it is not limited thereto.

The wearable device 101 may switch from a first screen displaying the virtual space 110 to a second screen including the image 820 representing the external environment, in response to receiving the plurality of touch inputs 810. For example, the wearable device 101 switches from the first screen to the second screen while the plurality of touch inputs 810 are received. The wearable device 9101 may display a second screen representing an external environment while the plurality of touch inputs 810 are received.

As described above, according to an embodiment, the wearable device 101 receives the plurality of touch inputs 810. The wearable device 101 may initiate obtaining an image through a camera, in response to the plurality of touch inputs 810. The wearable device 101 may display a screen including the obtained image 820. The wearable device 101 may enhance user convenience of the wearable device 101, by displaying the image 820 representing an external environment while the plurality of touch inputs 810 are maintained. The wearable device 101 may enhance user experience of the wearable device 101, by providing the image 820 representing the external environment to the user 103, based on the plurality of touch inputs 810.

Figure 9A:
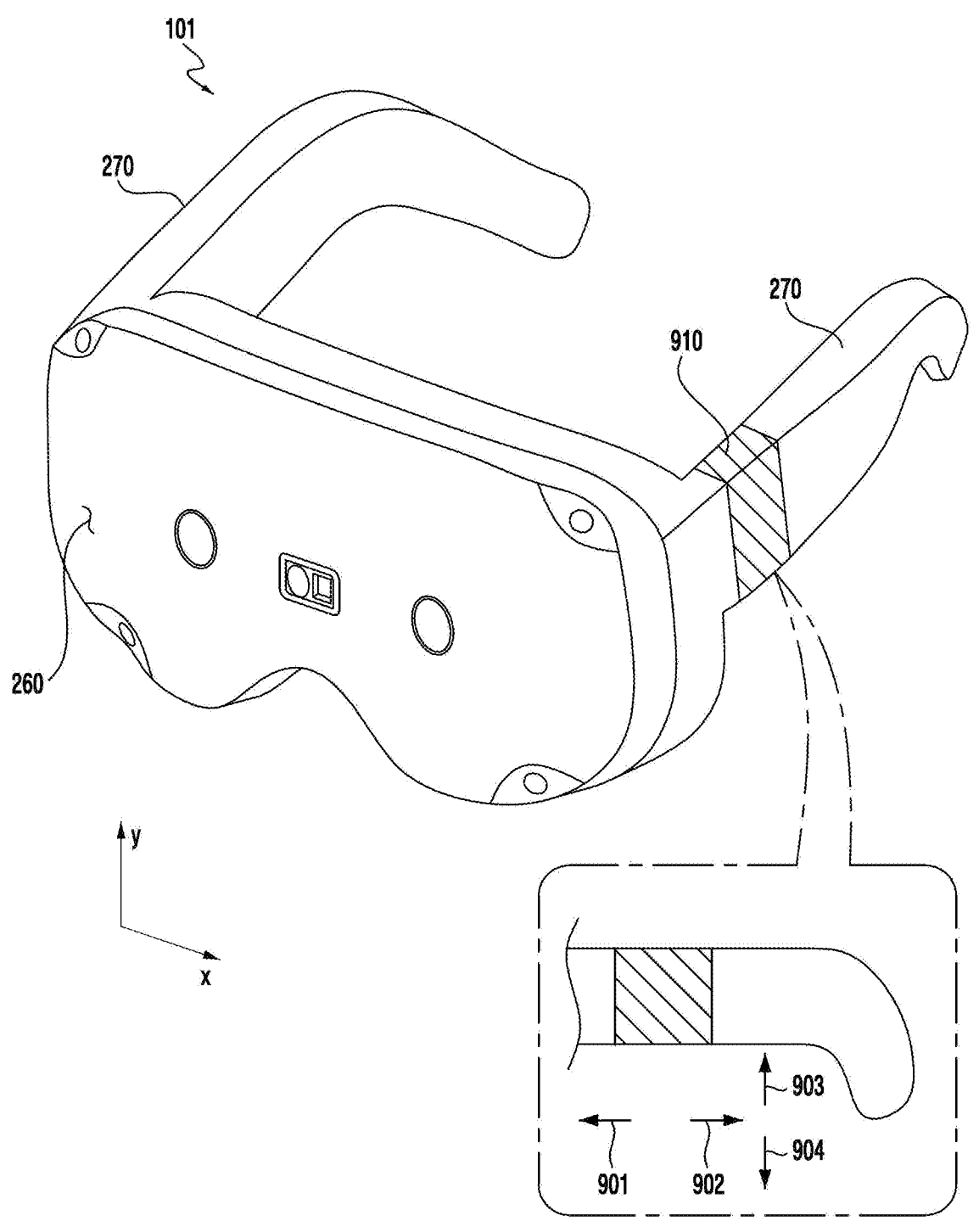
FIG. 9A illustrates an example of a wearable device for identifying a user input, according to an embodiment.
Figure 9B:
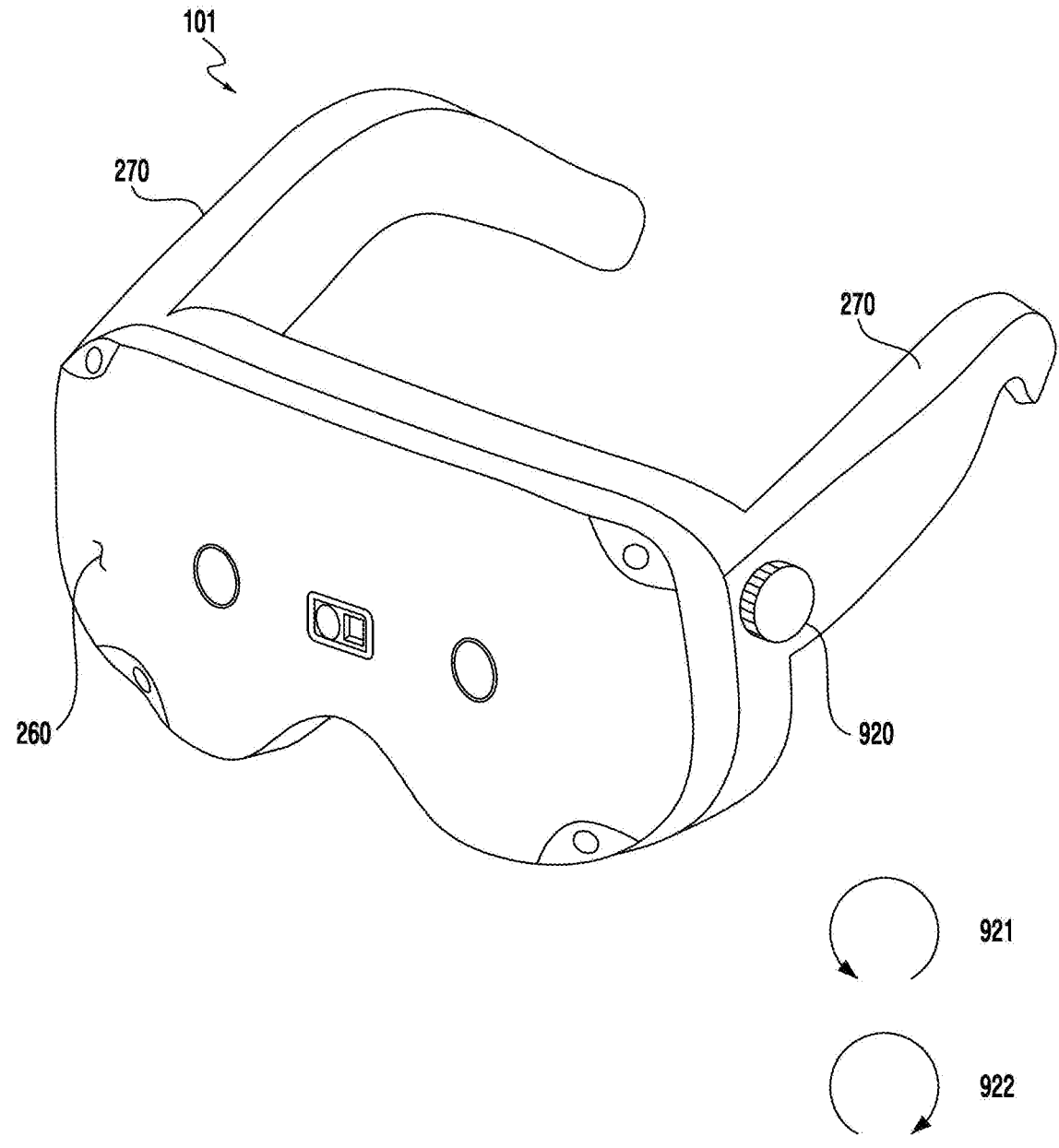
FIG. 9B illustrates an example of a wearable device for identifying a user input, according to an embodiment.

FIG. 9A illustrates an example of a wearable device for identifying a user input. FIG. 9B illustrates an example of a wearable device for identifying a user input. A wearable device 101 of FIG. 9A and/or FIG. 9B may include (e.g., correspond to) the wearable device 101 of FIGS. 1, 2, 3A, 3B, 3C, 3D, 3E, 3F, 3G, 4A, 4B, 4C, 5A, 5B, 5C, 5D, 5E, 5F, 6A, 6B, 6C, 7A, 7B, 7C, 7D, 7E, 7F, 8A and/or 8B. Operations of FIG. 9A and/or FIG. 9B may be performed by the processor 210 of FIG. 2.

Referring to FIG. 9A, the wearable device 101 may include one or more temples 270 (or regions 270, zones 270, controllers 270, input areas 270 etc.). For example, the wearable device 101 includes at least one sensor for detecting an external object on the temples 270. The sensor may include a touch sensor. The temples 270 may extend from the housing of the wearable device 101, where the display is arranged on a surface of the housing. The temples 270 may comprise, or be attached to, a portion of the wearable device 101 arranged to contact an ear of a user such that, when worn by the user, the portion aids in the wearable device 101 being worn by the user. For example, the portion, when contacting the car, aids retaining the wearable device 101 on the head of the user.

For example, the wearable device 101 detects an external object (such as a finger or stylus) on an area 910 formed on the temples 270, by using the touch sensor. The wearable device 101 may receive a user input, such as a touch input and/or a drag input, based on detecting the external object.

The wearable device 101 may receive a drag input on the area 910. For example, a drag input on the area 910 may have a path in a first direction 901 (e.g. a horizontal direction), a path in a second direction 902 (e.g. a horizontal direction, opposite to the first direction 901), a path in a third direction 903 (e.g. a vertical direction), and/or a path in a fourth direction 904 (e.g. a vertical direction, opposite to the third direction 903).

According to an embodiment, the wearable device 101 receives a drag input on the area 910 while providing a virtual space. The wearable device 101 may identify an area for displaying an image obtained through a camera in the virtual space, based on receiving the drag input on the area 910. The wearable device 101 may identify an area for displaying an image based on identifying a path of the drag input. A drag input identified as a path in the first direction 901 may be received as substantially the same input as a drag input in the +x axis direction on the second surface 260. In another example, a drag input identified as a path in the second direction 902 is received as substantially the same input as a drag input in the −x axis direction on the second surface 260. In another example, a drag input identified as a path in the third direction 903 is received as substantially the same input as a drag input in the +y axis direction on the second surface 260. In another example, a drag input identified as a path in the fourth direction 904 is received as substantially the same input as a drag input in the −y axis direction on the second surface 260. In other words, it will be appreciated that a drag input described in relation to FIG. 9A may be similar (e.g., share similar features) to a drag input on a second surface (opposite to a first surface on which a display of the wearable device 101 is disposed) as described in relation to other examples in the present disclosure. However, it is not limited thereto.

According to an embodiment, the wearable device 101 performs operations substantially the same as the operations described in FIGS. 1 to 8B, in response to receiving a drag input in one or more of the first to fourth directions 901 to 904. For example, the wearable device 101 segments an image based on receiving a drag input on the area 910, and displays a portion of the segmented image in the virtual space.

Referring to FIG. 9B, the wearable device 101 may include a hardware component such as a dial 920 (or knob 920). In FIG. 9B, an example of the wearable device 101 including the dial 920 is illustrated, but it is not limited thereto.

For example, the wearable device 101 identifies a user input using the dial 920. For example, the wearable device 101 may receive a rotation input in a fifth direction 921 of the dial 920 (e.g. an anti-clockwise direction). The rotation input in the fifth direction 921 may be received as (e.g. interpreted as) an input substantially the same as a drag input in the −y axis direction on the second surface 260. the wearable device 101 may perform operations at a time when a drag input in the −y axis direction on the second surface 260 described above is received, based on the rotation input in the fifth direction 921 being received.

For example, the wearable device 101 identifies an area for displaying an image within a virtual space, in response to the rotation input in the fifth direction 921 of the dial 920. The wearable device 101 may identify an area having a height, which corresponds to the rotation input, from an upper edge of a screen displaying the virtual space, based on the rotation input in the fifth direction 921, such as based on a degree of rotation of the dial included in the rotation input. The wearable device 101 may display an image obtained through a camera, within an area having the height corresponding to the rotation input based on the rotation input in the fifth direction 921.

As mentioned, the wearable device 101 may receive a user input using the dial 920. In another example, the wearable device 101 may receive a rotation input in a sixth direction 922 of the dial 920 (e.g. a clockwise direction). The rotation input in the sixth direction 922 may be received as substantially the same input as a drag input in the +y axis direction on the second surface 260. The wearable device 101 may perform operations at a time when a drag input in the +y axis direction on the second surface 260 described above is received, in response to the rotation input in the sixth direction 922 being received.

For example, the wearable device 101 identifies an area for displaying an image in the virtual space, in response to the rotation input in the sixth direction 922 of the dial 920. The wearable device 101 may identify an area having a height, which corresponds to the rotation input, from a lower edge of the screen displaying the virtual space, in response to the rotation input in the sixth direction 922 (such as the height being based on a degree of rotation of the dial included in the rotation input). The wearable device 101 may display an image obtained through the camera in an area having a height corresponding to the rotation input based on the rotation input in the sixth direction 922.

As described above, according to an embodiment, the wearable device 101 receives a user input different from a drag input on the second surface 260. For example, the wearable device 101 receives a user input using a hardware component such as the dial 920, or a user input on the area 910 different from the second surface 260. The wearable device 101 may perform operations based on receiving the drag input described in FIGS. 1 to 8B, in response to receiving the user input. The wearable device 101 may enhance user convenience of the wearable device 101 by displaying an image representing an external environment together with a virtual space, in response to a user input. The wearable device 101 may enhance user experience of the wearable device 101 by displaying an image including a surrounding environment of the wearable device 101 together with a virtual space, in response to a user input.

Figure 10A:
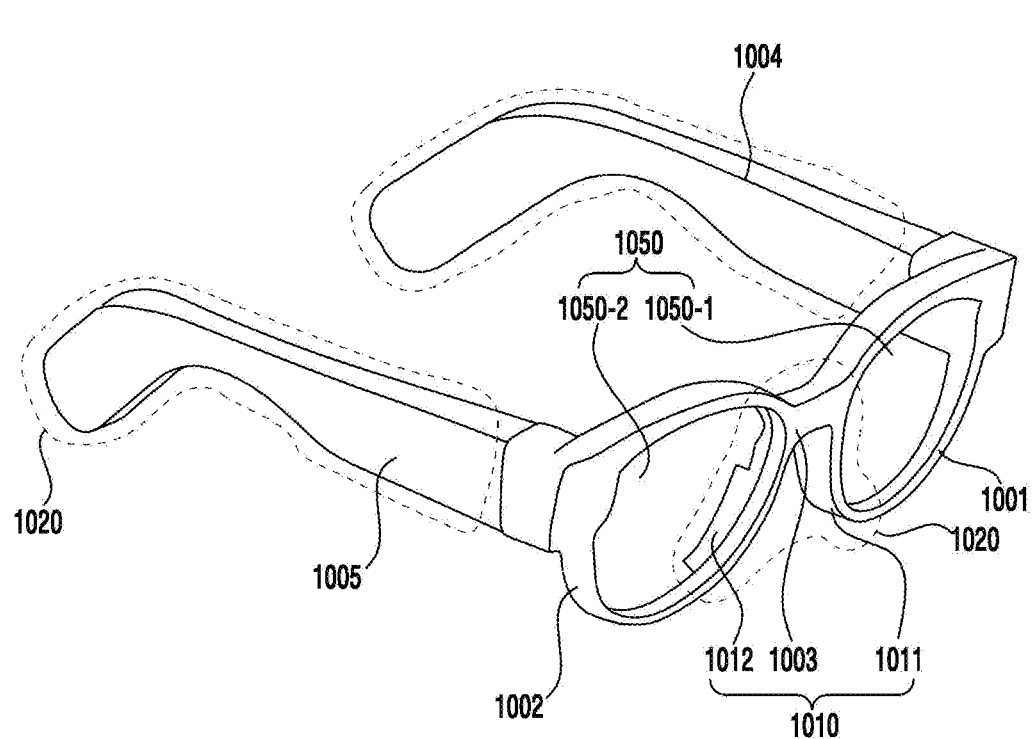
FIG. 10A illustrates an example of a perspective view of a wearable device, according to an embodiment.
Figure 10B:
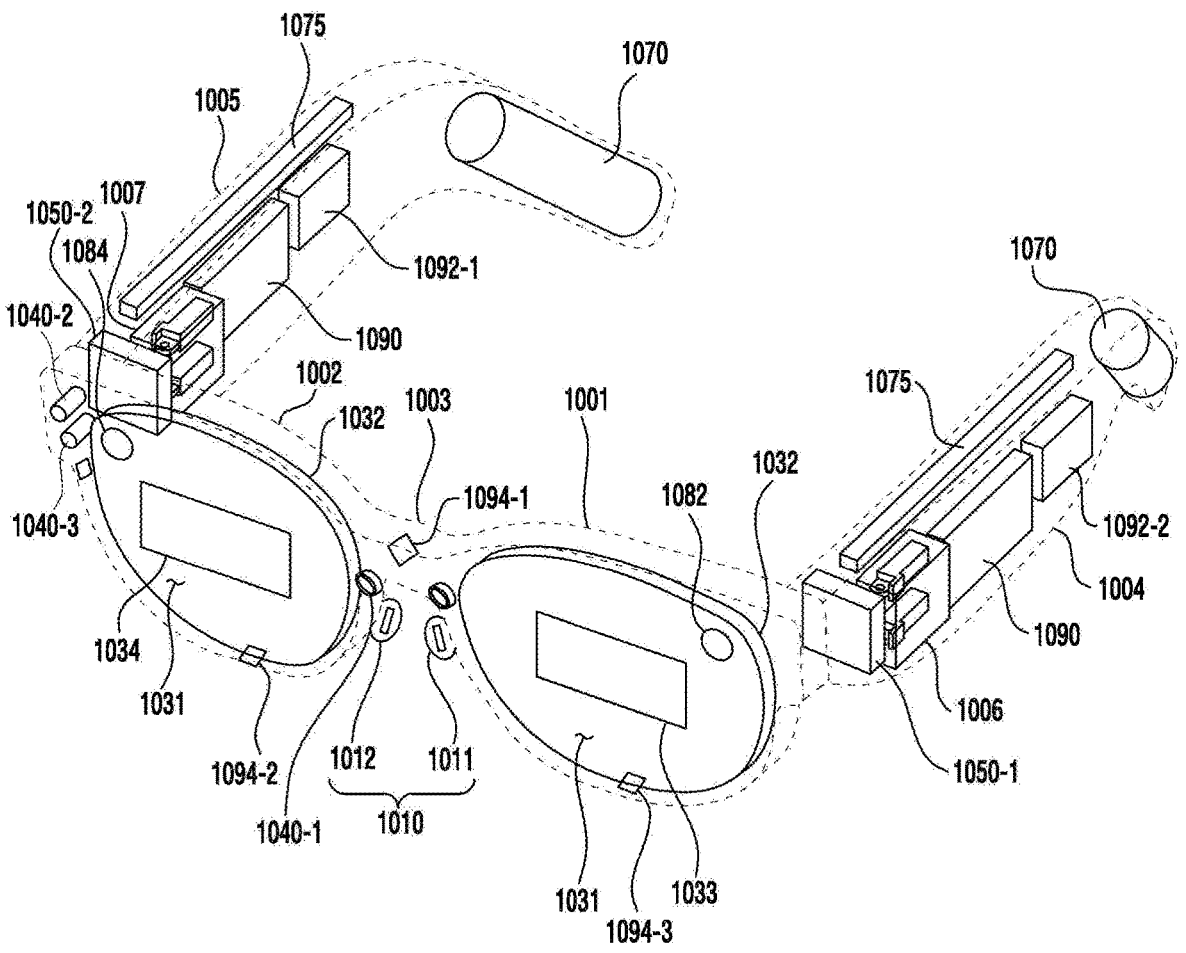
FIG. 10B illustrates an example of one or more hardware disposed in a wearable device, according to an embodiment.

FIG. 10A illustrates an example of a perspective view of a wearable device. FIG. 10B illustrates an example of one or more hardware disposed in a wearable device. A wearable device 1000 of FIG. 10A and/or FIG. 10B may include (e.g. correspond to) the wearable device 101 of FIGS. 1, 2, 3A, 3B, 3C, 3D, 3E, 3F, 3G, 4A, 4B, 4C, 5A, 5B, 5C, 5D, 5E, 5F, 6A, 6B, 6C, 7A, 7B, 7C, 7D, 7E, 7F, 8A, 8B, 9A, and/or 9B. As shown in FIG. 3A, according to an embodiment, the wearable device 1000 may include at least one display 1050 and a frame supporting the at least one display 1050.

The wearable device 1000 is wearable on a portion of the user's body. The wearable device 1000 may provide augmented reality (AR), virtual reality (VR), and/or mixed reality (MR) combining the augmented reality and the virtual reality to a user wearing the wearable device 1000. For example, the wearable device 1000 outputs a virtual reality image to a user through the at least one display 1050 in response to a user's preset gesture obtained through a motion recognition camera 1040-2 of FIG. 10B.

The at least one display 1050 in the wearable device 1000 provides visual information to a user. The at least one display 1050 may include the display 230 of FIG. 2. For example, the at least one display 1050 includes a transparent or translucent lens. The at least one display 1050 may include a first display 1050-1 and/or a second display 1050-2 spaced apart from the first display 1050-1. For example, the first display 1050-1 and the second display 1050-2 are disposed at positions corresponding to the user's left and right eyes, respectively. In various examples disclosed herein, a width direction corresponds to the direction of the centre of the first display 1050-1 relative to the centre of the second display 1050-2, and a height direction corresponds to the direction perpendicular to the width direction.

Referring to FIG. 10B, the at least one display 1050 may provide, to a user wearing the wearable device 1000, other visual information, which is distinct from the visual information, together with the visual information included in the ambient light passing through the lens by forming a displaying area on the lens. The lens may be formed based on at least one of a fresnel lens, a pancake lens, or a multi-channel lens. For example, the displaying area formed by the at least one display 1050 is formed on the second surface 1032 among the first surface 1031 and the second surface 1032 of the lens. When the user wears the wearable device 1000, the ambient light may be transmitted to the user by being incident on the first surface 1031 and being penetrated through the second surface 1032. For another example, the at least one display 1050 displays the virtual reality image to be combined with a real screen transmitted through the ambient light. The virtual reality image outputted from the at least one display 1050 may be transmitted to the user's eyes through the one or more hardware (e.g., optical devices 1082 and 1084, and/or at least one waveguides 1033 and 1034)) included in the wearable device 1000.

According to an embodiment, the wearable device 1000 includes the waveguides 1033 and 1034 that diffract light transmitted from the at least one display 1050 and relayed by the optical devices 1082 and 1084 and transmit it to the user. The waveguides 1033 and 1034 may be formed based on at least one of glass, plastic, or polymer. A nano pattern may be formed on at least a portion of the outside or inside of the waveguides 1033 and 1034. The nano pattern may be formed based on a grating structure having a polygonal or curved shape. Light incident to one end of the waveguides 1033 and 1034 may be propagated to the other end of the waveguides 1033 and 1034 by the nano pattern. The waveguides 1033 and 1034 may include at least one of at least one diffraction element (e.g., a diffractive optical element (DOE), a holographic optical element (HOE)), and a reflection element (e.g., a reflection mirror). For example, the waveguides 1033 and 1034 are disposed in the wearable device 1000 to guide a screen displayed by the at least one display 1050 to the user's eyes. For example, the screen is transmitted to the user's eyes based on total internal reflection (TIR) generated in the waveguides 1033 and 1034.

According to an embodiment, the wearable device 1000 analyzes an object included in a real image collected through a photographing camera 1040-1, combines virtual object corresponding to an object that become a subject of augmented reality provision among the analyzed object, and displays them on the at least one display 1050. The virtual object may include at least one of text and images for various information associated with the object included in the real image. The wearable device 1000 may analyze the object by using a multi-camera such as a stereo camera. For the object analysis, the wearable device 1000 may execute time-of-flight (ToF) and/or simultaneous localization and mapping (SLAM) supported by the multi-camera. The user wearing the wearable device 1000 may watch an image displayed on the at least one display 1050.

According to an embodiment, the frame is configured with a physical structure by which the wearable device 1000 may be worn on the user's body. According to an embodiment, the frame is configured so that when the user wears the wearable device 1000, the first display 1050-1 and the second display 1050-2 may be positioned corresponding to the user's left and right eyes. The frame may support the at least one display 1050. For example, the frame supports the first display 1050-1 and the second display 1050-2 to be positioned at positions corresponding to the user's left and right eyes.

Referring to FIG. 10A, the frame may include an area 1020 at least partially in contact with the portion of the user's body in case that the user wears the wearable device 1000. For example, the area 1020 of the frame in contact with the portion of the user's body includes an area in contact with a portion of the user's nose, a portion of the user's car, and a portion of the side of the user's face that the wearable device 1000 contacts. The frame may include a nose pad 1010 that is contacted on the portion of the user's body. When the wearable device 1000 is worn by the user, the nose pad 1010 may be contacted on the portion of the user's nose. The frame may include a first temple 1004 and a second temple 1005 that is contacted on another portion of the user's body that is distinct from the portion of the user's body.

The frame may include a first rim 1001 surrounding at least a portion of the first display 1050-1, a second rim 1002 surrounding at least a portion of the second display 1050-2, a bridge 1003 disposed between the first rim 1001 and the second rim 1002, a first pad 1011 disposed along a portion of the edge of the first rim 1001 from one end of the bridge 1003, a second pad 1012 disposed along a portion of the edge of the second rim 1002 from the other end of the bridge 1003, the first temple 1004 extending from the first rim 1001 and fixed to a portion of the wearer's car, and the second temple 1005 extending from the second rim 1002 and fixed to a portion of the car opposite to the car. The first pad 1011 and the second pad 1012 may be in contact with the portion of the user's nose, and the first temple 1004 and the second temple 1005 may be in contact with a portion of the user's face and the portion of the user's car. The temples 1004 and 1005 may be rotatably connected to the rim through hinge units 1006 and 1007 of FIG. 10B. The first temple 1004 may be rotatably connected with respect to the first rim 1001 through the first hinge unit 1006 disposed between the first rim 1001 and the first temple 1004. The second temple 1005 may be rotatably connected with respect to the second rim 1002 through the second hinge unit 1007 disposed between the second rim 1002 and the second temple 1005. According to an embodiment, the wearable device 1000 identifies an external object (e.g., a user's fingertip) touching the frame and/or a gesture performed by the external object by using a touch sensor, a grip sensor, and/or a proximity sensor formed on at least a portion of the surface of the frame.

The wearable device 1000 may include hardware (e.g., hardware described above based on the block diagram of FIG. 2) that performs various functions, the hardware may include at least one of a battery module 1070, an antenna module 1075, the optical devices 1082 and 1084, speakers 1092-1 and 1092-2, microphones 1094-1, 1094-2, and 1094-3, a light emitting module (not illustrated), and/or a printed circuit board 1090. Various hardware may be disposed in the frame.

The microphone 1094-1, 1094-2, and 1094-3 of the wearable device 1000 may obtain a sound signal, by being disposed on at least a portion of the frame. The first microphone 1094-1 disposed on the nose pad 1010, the second microphone 1094-2 disposed on the second rim 1002, and the third microphone 1094-3 disposed on the first rim 1001 are illustrated in FIG. 10B, but the number and disposition of the microphone 1094 are not limited to an embodiment of FIG. 10B. In case that the number of the microphone 1094 included in the wearable device 1000 is two or more, the wearable device 1000 may identify the direction of the sound signal by using a plurality of microphones disposed on different portions of the frame.

The optical devices 1082 and 1084 may transmit the virtual object transmitted from the at least one display 1050 to the waveguides 1033 and 1034. For example, the optical devices 1082 and 1084 may be a projector. The optical devices 1082 and 1084 may be disposed adjacent to the at least one display 1050 or may be included in the at least one display 1050 as portion of the at least one display 1050. The first optical device 1082 may correspond to the first display 1050-1, and the second optical device 1084 may correspond to the second display 1050-2. The first optical device 1082 may transmit the light outputted from the first display 1050-1 to the first waveguide 1033, and the second optical device 1084 may transmit light outputted from the second display 1050-2 to the second waveguide 1034.

The camera 1040 may include an eye tracking camera (ET CAM) 1040-1, the motion recognition camera 1040-2, and/or the photographing camera 1040-3. The photographing camera 1040-3, the eye tracking camera 1040-1, and the motion recognition camera 1040-2 may be disposed at different positions on the frame and may perform different functions. The photographing camera 1040-3, the eye tracking camera 1040-1, and the motion recognition camera 1040-2 may be an example of the camera 225 of FIG. 2. The eye tracking camera 1040-1 may output data indicating the gaze of the user wearing the wearable device 1000. For example, the wearable device 1000 detects the gaze from an image including the user's pupil obtained through the eye tracking camera 1040-1. An example in which the eye tracking camera 1040-1 is disposed toward the user's right eye is illustrated in FIG. 10B, but the embodiment is not limited thereto and the eye tracking camera 1040-1 may instead be disposed toward the user's left eye or may be disposed toward two eyes.

The photographing camera 1040-3 may photograph a real image or background to be matched with a virtual image in order to implement the augmented reality or mixed reality content. The photographing camera may photograph an image of a specific object existing at a position viewed by the user and may provide the image to the at least one display 1050. The at least one display 1050 may display one image in which a virtual image provided through the optical devices 1082 and 1084 is overlapped with information on the real image or background including an image of the specific object obtained by using the photographing camera. In an embodiment, the photographing camera is disposed on the bridge 1003 disposed between the first rim 1001 and the second rim 1002.

The eye tracking camera 1040-1 may implement a more realistic augmented reality by matching the user's gaze with the visual information provided on the at least one display 1050 by tracking the gaze of the user wearing the wearable device 1000. For example, when the user looks at the front, the wearable device 1000 naturally displays environment information associated with the user's front on the at least one display 1050 at the position where the user is positioned. The eye tracking camera 1040-1 may be configured to capture an image of the user's pupil in order to determine the user's gaze. The eye tracking camera 1040-1 may receive gaze detection light reflected from the user's pupil and may track the user's gaze based on the position and movement of the received gaze detection light. In an embodiment, the eye tracking camera 1040-1 is disposed at a position corresponding to the user's left and right eyes. The eye tracking camera 1040-1 may be disposed in the first rim 1001 and/or the second rim 1002 to face the direction in which the user wearing the wearable device 1000 is positioned.

The motion recognition camera 1040-2 may provide a specific event to the screen provided on the at least one display 1050 by recognizing the movement of the whole or portion of the user's body, such as the user's torso, hand, or face. The motion recognition camera 1040-2 may obtain a signal corresponding to the gesture by recognizing the user's gesture, and may provide a display corresponding to the signal to the at least one display 1050. The processor may identify a signal corresponding to the operation and may perform a preset function based on the identification. In an embodiment, the motion recognition camera 1040-2 may be disposed on the first rim 1001 and/or the second rim 1002.

The camera 1040 included in the wearable device 1000 is not limited to the above-described eye tracking camera 1040-1 and the motion recognition camera 1040-2. For example, the wearable device 1000 identifies an external object included in the FoV by using the photographing camera 1040-3 disposed toward the user's FoV. That the wearable device 1000 identifies the external object may be performed by using a sensor for identifying a distance between the wearable device 1000 and the external object, such as a depth sensor and/or a time of flight (ToF) sensor. The camera 1040 disposed toward the FoV may support an autofocus function and/or an optical image stabilization (OIS) function. The wearable device 1000 includes the camera 1040 (e.g., a face tracking (FT) camera) disposed toward the face in order to obtain an image including the face of the user wearing the wearable device 1000.

Although not illustrated, the wearable device 1000 may further include a light source (e.g., LED) that emits light toward a subject (e.g., user's eyes, face, and/or an external object in the FoV) photographed by using the camera 1040. The light source may include an LED having an infrared wavelength. The light source may be disposed on at least one of the frame, and the hinge units 1006 and 1007.

The battery module 1070 may supply power to electronic components of the wearable device 1000. In an embodiment, the battery module 1070 is disposed in the first temple 1004 and/or the second temple 1005. The battery module 1070 may be a plurality of battery modules 1070. The plurality of battery modules 1070, respectively, may be disposed on each of the first temple 1004 and the second temple 1005. In an embodiment, the battery module 1070 is disposed at an end of the first temple 1004 and/or the second temple 1005.

The antenna module 1075 may transmit the signal or power to the outside of the wearable device 1000 or may receive the signal or power from the outside. The antenna module 1075 may be electronically and/or operably connected to a communication circuit of the wearable device 1000. The antenna module 1075 may be disposed in the first temple 1004 and/or the second temple 1005. For example, the antenna module 1075 is disposed close to one surface of the first temple 1004 and/or the second temple 1005.

The speakers 1092-1 and 1092-2 may output a sound signal to the outside of the wearable device 1000. A sound output module may be referred to as a speaker. In an embodiment, the speakers 1092-1 and 1092-2 may be disposed in the first temple 1004 and/or the second temple 1005 in order to be disposed adjacent to the car of the user wearing the wearable device 1000. The wearable device 1000 may include the second speaker 1092-2 disposed adjacent to the user's left car by being disposed in the first temple 1004, and the first speaker 1092-1 disposed adjacent to the user's right car by being disposed in the second temple 1005.

The light emitting module (not illustrated) may include at least one light emitting element. The light emitting module may emit light of a color corresponding to a specific state or may emit light through an operation corresponding to the specific state in order to visually provide information on a specific state of the wearable device 1000 to the user. For example, in case that the wearable device 1000 needs charging, it repeatedly emits red light at a preset timing. In an embodiment, the light emitting module is disposed on the first rim 1001 and/or the second rim 1002.

Referring to FIG. 10B, the wearable device 1000 may include the printed circuit board (PCB) 1090. The PCB 1090 may be included in at least one of the first temple 1004 or the second temple 1005. The PCB 1090 may include an interposer disposed between at least two sub PCBs. On the PCB 1090, one or more hardware (e.g., hardware illustrated by the blocks described above with reference to FIG. 2) included in the wearable device 1000 may be disposed. The wearable device 1000 may include a flexible PCB (FPCB) for interconnecting the hardware.

According to an embodiment, the wearable device 1000 includes at least one of a gyro sensor, a gravity sensor, and/or an acceleration sensor for detecting the posture of the wearable device 1000 and/or the posture of a body part (e.g., a head) of the user wearing the wearable device 1000. Each of the gravity sensor and the acceleration sensor may measure gravity acceleration, and/or acceleration based on preset 3-dimensional axes (e.g., x axis, y axis, and z axis) perpendicular to each other. The gyro sensor may measure angular velocity of each of preset 3-dimensional axes (e.g., x axis, y axis, and z axis). At least one of the gravity sensor, the acceleration sensor, and the gyro sensor may be referred to as an inertial measurement unit (IMU). According to an embodiment, the wearable device 1000 may identify the user's motion and/or gesture performed to execute or stop a specific function of the wearable device 1000 based on the IMU.

Figure 11A:
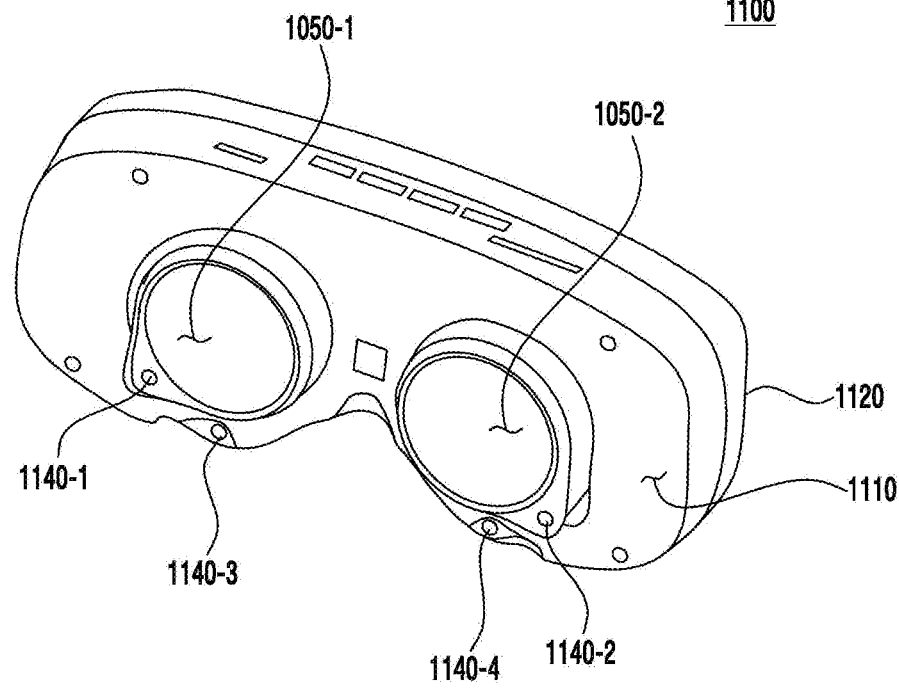
FIGS. 11A to 11B illustrate an example of an appearance of a wearable device, according to an embodiment.
Figure 11B:
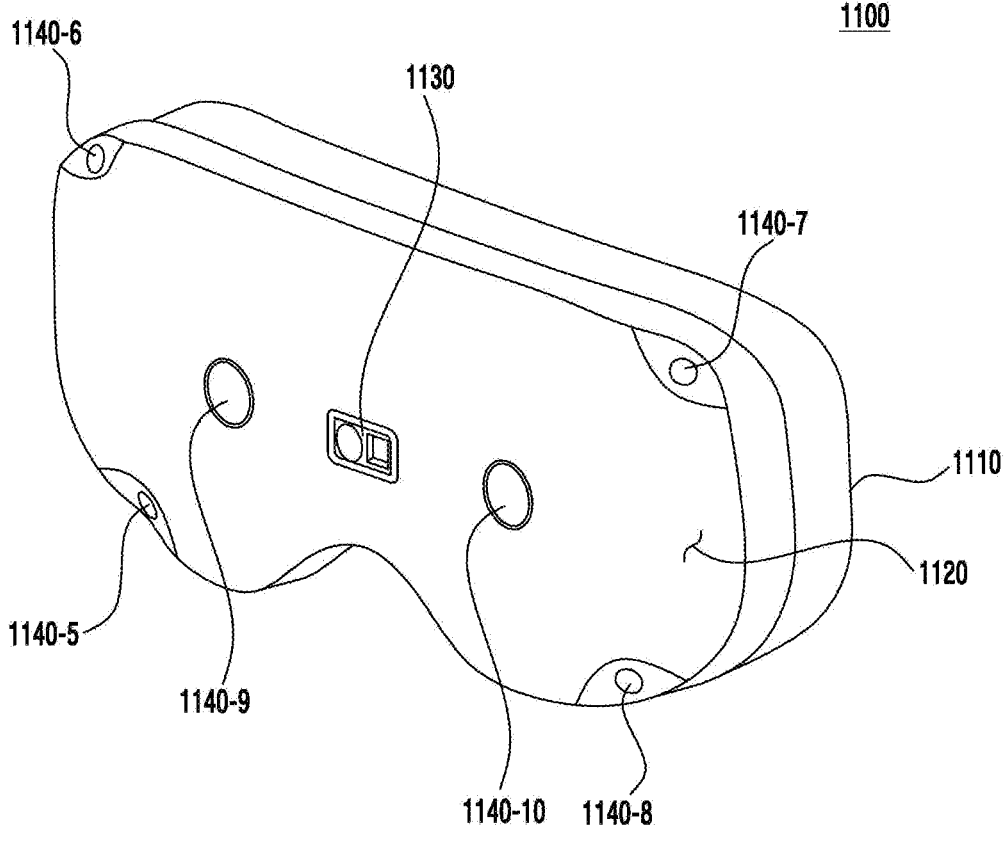

FIGS. 11A to 11B illustrate an example of an appearance of a wearable device. A wearable device 101 of FIG. 11A and/or FIG. 11B may include (e.g. correspond to) the wearable device 101 of FIGS. 1, 2, 3A, 3B, 3C, 3D, 3E, 3F, 3G, 4A, 4B, 4C, 5A, 5B, 5C, 5D, 5E, 5F, 6A, 6B, 6C, 7A, 7B, 7C, 7D, 7E, 7F, 8A, 8B, 9A, and/or 9B. An example of an appearance of a first surface 1110 of a housing of the wearable device 1100 is illustrated in FIG. 11A, and an example of an appearance of a second surface 1120 opposite to the first surface 1110 is illustrated in FIG. 11B.

Referring to FIG. 11A, the first surface 1110 of the wearable device 1100 may have an attachable shape on the user's body part (e.g., the user's face). Although not illustrated, the wearable device 1100 may further include a strap for being fixed on the user's body part, and/or one or more temples (e.g., the first temple 1004 and/or the second temple 1005 of FIGS. 10A to 10B). A first display 1150-1 for outputting an image to the left eye among the user's two eyes and a second display 1150-2 for outputting an image to the right eye among the user's two eyes may be disposed on the first surface 1110. The wearable device 1100 may be formed on the first surface 1110 and may further include rubber or silicon packing for preventing interference by light (e.g., ambient light) different from the light emitted from the first display 1150-1 and the second display 1150-2.

The wearable device 1100 may include cameras 1140-3 and 1140-4 for photographing and/or tracking two eyes of the user adjacent to each of the first display 1150-1 and the second display 1150-2. The cameras 1140-3 and 1140-4 may be referred to as ET cameras. According to an embodiment, the wearable device 1100 includes cameras 1140-1 and 1140-2 for photographing and/or recognizing the user's face. The cameras 1140-1 and 1140-2 may be referred to as FT cameras.

Referring to FIG. 11B, a camera (e.g., cameras 1140-5, 1140-6, 1140-7, 1140-8, 1140-9, and 1140-10), and/or a sensor (e.g., the depth sensor 1130) for obtaining information associated with the external environment of the wearable device 1100 may be disposed on the second surface 1120 opposite to the first surface 1110 of FIG. 11A. For example, the cameras 1140-5, 1140-6, 1140-7, 1140-8, 1140-9, and 1140-10 are disposed on the second surface 1120 in order to recognize an external object different from the wearable device 1100. For example, by using cameras 1140-9, and 1140-10, the wearable device 1100 obtains an image and/or video to be transmitted to each of the user's two eyes. The camera 1140-9 may be disposed on the second surface 1120 of the wearable device 1100 to obtain an image to be displayed through the second display 1150-2 corresponding to the right eye among the two eyes. The camera 1140-10 may be disposed on the second surface 1120 of the wearable device 1100 to obtain an image to be displayed through the first display 1150-1 corresponding to the left eye among the two eyes.

The wearable device 1100 may include the depth sensor 1130 disposed on the second surface 1120 in order to identify a distance between the wearable device 1100 and the external object. By using the depth sensor 1130, the wearable device 1100 may obtain spatial information (e.g., a depth map) about at least a portion of the FoV of the user wearing the wearable device 1100.

Although not illustrated, a microphone for obtaining sound outputted from the external object may be disposed on the second surface 1120 of the wearable device 1100. The number of microphones may be one or more according to embodiments.

Figure 12:
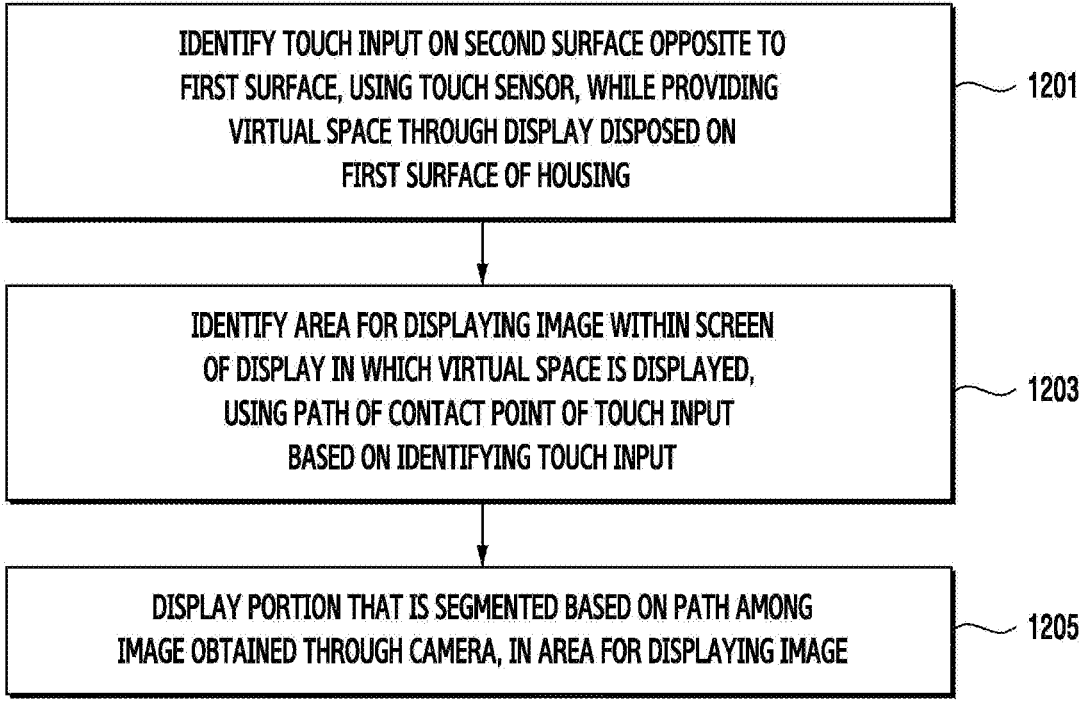
FIG. 12 illustrates an example of a flowchart of an operation of a wearable device according to an embodiment.

FIG. 12 illustrates an example of a flowchart of an operation of a wearable device. A wearable device of FIG. 12 may include (e.g. correspond to) the wearable device 101 of FIGS. 1, 2, 3A, 3B, 3C, 3D, 3E, 3F, 3G, 4A, 4B, 4C, 5A, 5B, 5C, 5D, 5E, 5F, 6A, 6B, 6C, 7A, 7B, 7C, 7D, 7E, 7F, 8A, 8B, 9A, 9B, the wearable device 1000 of FIGS. 10A, 10B, and/or the wearable device 1100 of FIGS. 11A and/or 11B. Operations of FIG. 12 may be performed by the processor 210 of FIG. 2.

Referring to FIG. 12, in operation 1201, a wearable device (e.g., the wearable device 101 of FIGS. 1 to 9B) provides a virtual space through a display (e.g., the display 230 of FIG. 2) disposed on a first surface (e.g., the first surface 1110 of the wearable device 1100 of FIG. 11A) of a housing. For example, the first surface is disposed in a direction in which the wearable device faces the user in a state of being worn by the user. While providing the virtual space, the wearable device may receive a touch input on a second surface (e.g., the second surface 1120 of the wearable device 110 of FIG. 11B and/or the second surface 260 of the wearable device 101 of FIGS. 1 to 9B) opposite to a first surface using a sensor. The touch input may include a drag input (e.g., the first drag input 310 of FIG. 3A, the second drag input 320 of FIG. 3B, the third drag input 330 of FIG. 3C, the fourth drag input 340 of FIG. 3D, the fifth drag input 350 of FIG. 3E, and the sixth drag input 360 of FIG. 3F). The sensor may include a touch sensor (e.g., the touch sensor 251 of FIG. 2). For example, while providing a virtual space through a display disposed on the first surface of the housing, the wearable device receives a drag input on the second surface opposite to the first surface, by using the touch sensor.

In operation 1203, the wearable device identifies a contact point of a touch input based on identifying the touch input. The wearable device may identify a path of the drag input (or a path taken by the drag input from the contact point) based on receiving the drag input. The wearable device may identify an area for displaying an image in a screen of a display on which the virtual space is displayed, based on identifying the path from the contact point of the drag input. The wearable device may identify an area for displaying the image based on a direction of the path. The direction may include an x axis direction on the second surface and/or a y axis direction on the second surface.

In operation 1205, the wearable device obtains an image through a camera. The wearable device may segment the image obtained through the camera, based on a path of a drag input detected on the second surface. The wearable device may obtain a portion in which the image is segmented. The wearable device may display the portion in which the image is segmented on an area for displaying an image. The wearable device may display a portion, which is segmented based on the path, among the image obtained through the camera in an area for displaying the image.

In an embodiment, a sequence in which the operation of identifying an area (e.g., an area of operation 1203) of a screen in which an image is to be displayed and the operation of segmenting an image based on a path of a drag input is performed is not limited to an embodiment illustrated in FIG. 12. The wearable device may instead segment an image based on a path of a drag input, and then identify an area for displaying the image in a screen of a display. In another example, the wearable device identifies the area in the screen substantially at the same time as segmenting the image.

An operation of a wearable device based on the touch input of FIGS. 1 to 12 may be performed based on a camera (e.g., the camera 240 of FIG. 2 and/or an external camera connected to the wearable device 101 of FIG. 2). For example, the wearable device detects a user's body part (e.g., hand) by using the camera. That is, instead of or in addition to being configured to identify a touch input on the second surface, the wearable device may be configured to detect a gesture input, or similar, through a camera of the wearable device. In a state of providing a virtual space based on operation 1201, the wearable device may identify an area for displaying an image in the virtual space, indicated by a path of the body part, based on receiving a gesture (e.g., a swipe gesture) performed by the body part at a boundary line of the display and/or a boundary line of a FoV of a camera. The wearable device may display an image obtained through a camera within the area.

An operation of the wearable device based on the touch input of FIGS. 1 to 12 may be performed based on an external electronic device (e.g., a controller) connected to the wearable device. For example, in a state of providing the virtual space based on operation 1201, the wearable device identifies an area for displaying an image in the virtual space, indicated by a path of the body part, based on detecting an external electronic device moved in an external space corresponding to the boundary line of the display. The wearable device may display an image obtained through a camera within the area.

As described above, according to an embodiment, the wearable device identifies an area for displaying an image in a virtual space, in response to a drag input. The wearable device may segment an image obtained through a camera, in response to the drag input. The wearable device may display a segmented portion of the image in a part of the virtual space, based on the drag input. The wearable device may enhance user convenience of the wearable device by displaying the segmented portion of the image in a part of the virtual space.

Metaverse is a compound word of the English words "Meta" meaning "virtual" and "transcendence" and "Universe" meaning cosmos, and refers to a three-dimensional virtual world in which social, economic, and cultural activities take place like a real world. Metaverse is a concept that has evolved one step further than a virtual reality (VR, cutting-edge technology that enables people to experience real-life experiences in a virtual world created by a computer), and it is characterized by using avatars to not only enjoy games or virtual reality, but also social and cultural activities like a reality. A metaverse service may provide media content for enhancing immersion in the virtual world, based on an augmented reality (AR), a virtual reality environment (VR), a mixed environment (MR), and/or an extended reality (XR).

For example, media content provided by the metaverse service may include social interaction content including avatar-based game, concert, party, and/or meeting. For example, the media content may include information for economic activities such as advertising, user created content, and/or sales and/or shopping of productions. Ownership of the user created content may be proved by a blockchain-based non-fungible token (NFT). The metaverse service may support economic activities based on real money and/or cryptocurrency. By the metaverse service, virtual content associated with the real world, such as digital twin or life logging, may be provided.

Figure 13:
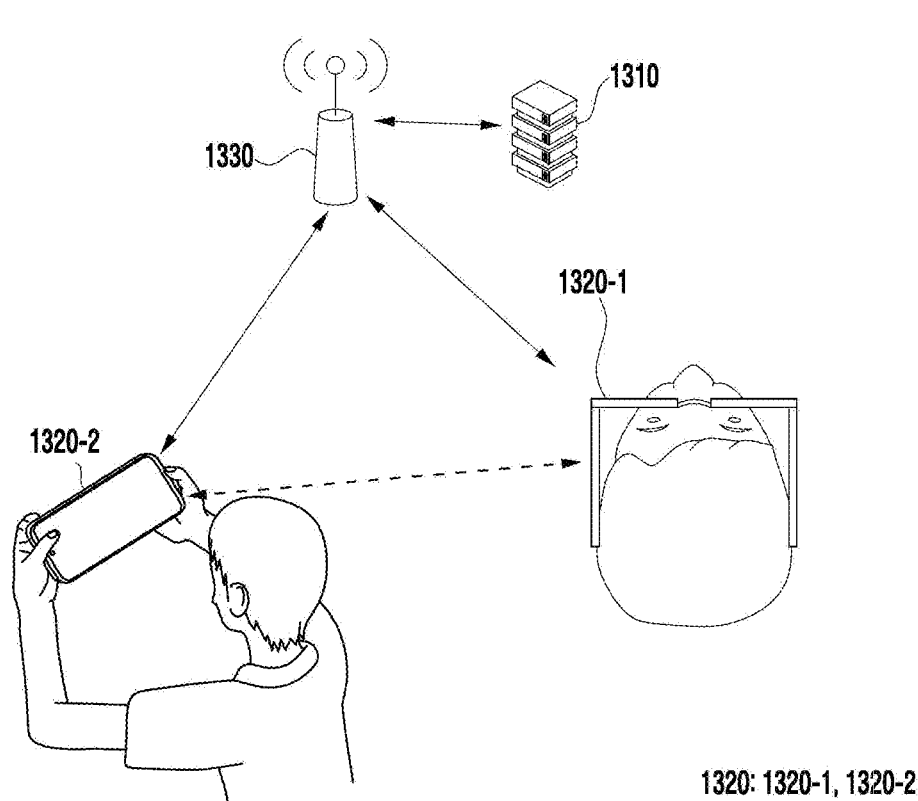
FIG. 13 is an exemplary diagram of a network environment in which a metaverse service is provided through a server.

FIG. 13 is an exemplary diagram of a network environment in which a metaverse service is provided through a server.

Referring to FIG. 13, a network environment 1301 may include a server 1310, a user terminal 1320 (e.g., a first terminal 1320-1 and a second terminal 1320-2), and a network connecting the server 1310 and the user terminal 1320. In the network environment 1301, the server 1310 may provide a metaverse service to the user terminal 1320. The network may be formed by at least one intermediate node 1330 including an access point (AP) and/or a base station. The user terminal 1320 may access the server 1320 through the network and output a user interface (UI) associated with a metaverse service to a user of the user terminal 1320. Based on the UI, the user terminal 1320 may obtain information to be inputted into the metaverse service from the user, or output information (e.g., multimedia content) associated with the metaverse service to the user.

In this case, the server 1310 provides a virtual space so that the user terminal 1320 may perform activities in the virtual space. In addition, the user terminal 1320 may represent information provided by the server 1310 to the user by installing an S/W agent to access the virtual space provided by the server 1310, or transmit information that the user wants to represent in the virtual space to the server. The S/W agent may be provided directly through the server 1310, downloaded from a public server, or embedded and provided when purchasing a terminal.

In an embodiment, the metaverse service provides a service to the user terminal 1320 and/or a user by using the server 1310. The embodiment is not limited thereto, and the metaverse service may be provided through individual contacts between users. For example, in the network environment 1301, the metaverse service is provided by a direct connection between the first terminal 1320-1 and the second terminal 1320-2, independently of the server 1310. Referring to FIG. 13, in the network environment 1301, the first terminal 1320-1 and the second terminal 1320-2 may be connected to each other through a network formed by at least one intermediate node 1330. In an embodiment in which the first terminal 1320-1 and the second terminal 1320-2 are directly connected, any one of the first terminal 1320-1 and the second terminal 1320-2 perform a role of the server 1310. For example, a metaverse environment is configured only with a device-to-device connection (e.g., a peer-to-peer (P2P) connection).

The user terminal 1320 (or the user terminal 1320 including the first terminal 1320-1 and the second terminal 1320-2) may be made in various form factors, and it is characterized by including an output device for providing an image and/or sound to the user and an input device for inputting information into the metaverse service. An exemplary user terminal 1320 in various form factors may include a smartphone (e.g., the second terminal 1320-2), an AR device (e.g., the first terminal 1320-1), a VR device, an MR device, a Video See Through (VST) device, an Optical See Through (OST) device, a smart lens, a smart mirror, a TV capable of inputting and outputting, or a projector.

A network (e.g., a network formed by at least one intermediate node 1330) includes all of various broadband networks including 3G, 4G, and 5G and short-range networks (e.g., a wired network or a wireless network that directly connects the first terminal 1320-1 and the second terminal 1320-2) including Wi-Fi and BT.

A wearable device of FIG. 13 may include (e.g. correspond to) the wearable device 101 of FIGS. 1, 2, 3A, 3B, 3C, 3D, 3E, 3F, 3G, 4A, 4B, 4C, 5A, 5B, 5C, 5D, 5E, 5F, 6A, 6B, 6C, 7A, 7B, 7C, 7D, 7E, 7F, 8A, 8B, 9A, 9B, the wearable device 1000 of FIGS. 10A, 10B, the wearable device 1100 of FIGS. 11A, 11B, and/or 12A.

Figure 14A:
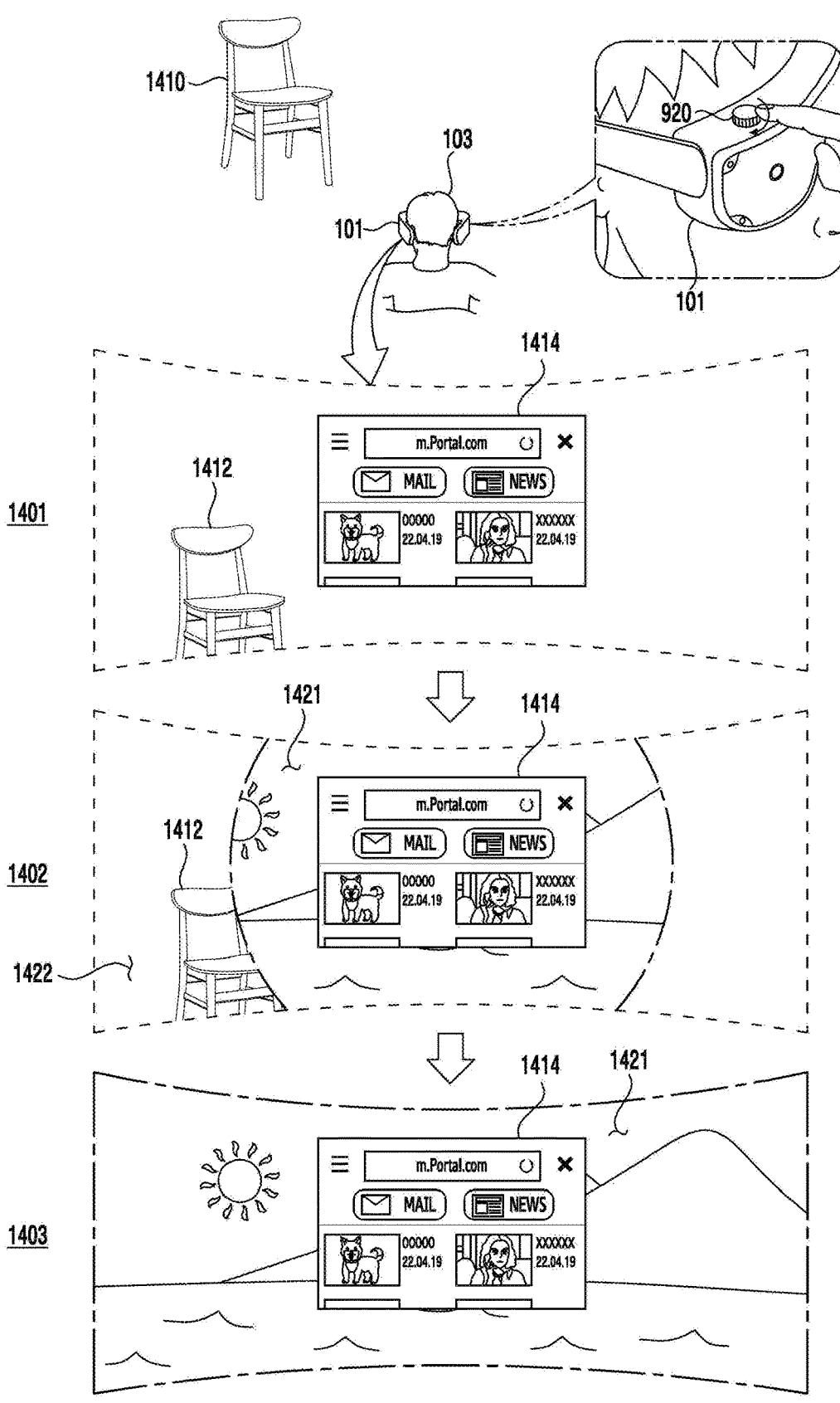
FIGS. 14A and 14B illustrate an exemplary operation of a wearable device according to rotation of a dial.
Figure 14B:
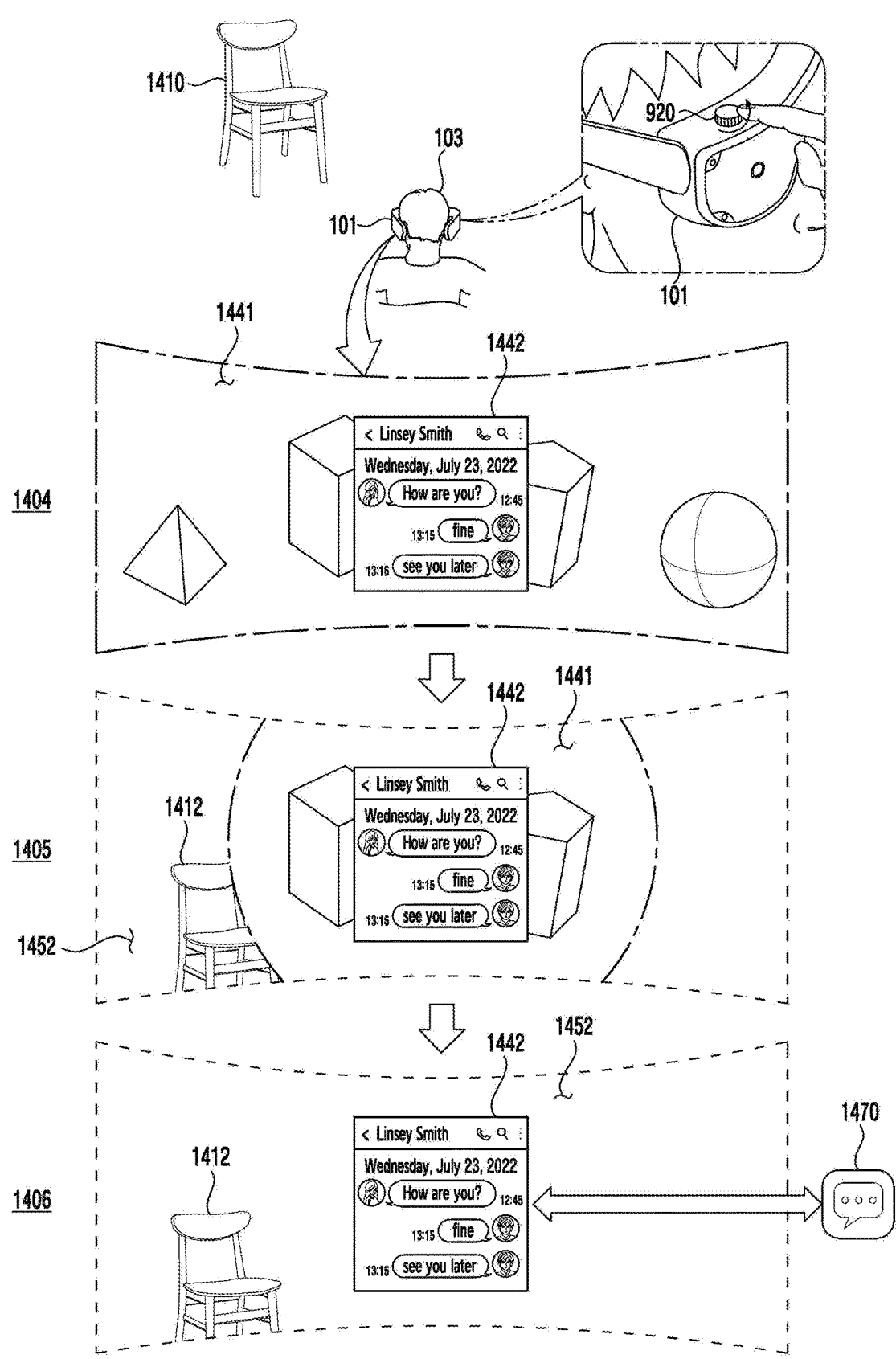

FIGS. 14A and 14B illustrate an exemplary operation of a wearable device 101 according to rotation of a dial 920. An operation of the wearable device 101 described with reference to FIGS. 14A to 14B may be performed by the wearable device 101 of FIGS. 1 to 2 and/or the processor 210 of FIG. 2. An operation of the wearable device 101 described with reference to FIGS. 14A to 14B may be associated with the operation of the wearable device described with reference to FIGS. 1 to 12.

Referring to FIG. 14A and/or FIG. 14B, the wearable device 101 may include the dial 920 on a housing of the wearable device 101. The dial 920 of FIGS. 14A and/or 14B may correspond to the dial 920 of FIG. 9B. The dial 920 may be exposed at least partially through a surface (e.g., a flat surface and/or a curved surface of the housing referred to as a side surface) of the housing. In order to detect rotation and/or pressing of the dial 920, the electronic device 101 may include a sensor (e.g., the sensor 250 of FIG. 2) electrically and/or operably connected to the dial 920. For example, the sensor includes a hall sensor, a gyro sensor, a variable resistance, a switch, or any combination thereof. The housing forming the appearance and/or exterior of the wearable device 101 may include a frame of FIGS. 10A and/or 10B and/or a strap capable of being wrapped around a head of a user 103. Referring to FIG. 14A and/or FIG. 14B, an example of the dial 920 being exposed upward from the housing while being worn on a head of the user 103 is illustrated, but a position of the dial 920 is not limited thereto.

According to an embodiment, the wearable device 101 includes a display forming at least a part of the housing to be arranged in front of eyes of the user 103 wearing the wearable device 101, while being worn by the user 103. The display may include the display 230 of FIG. 2. The display may be disposed on a contoured surface of the wearable device having an outline corresponding to the face of the user 103.

The wearable device 101 may include one or more cameras (e.g., the camera 240 of FIG. 2) exposed through at least a part of the housing of the wearable device 101, in order to obtain an image of at least a part of an environment adjacent to the wearable device 101. While the wearable device 101 is worn on the user's head 103, the one or more cameras may be arranged in a direction different from a direction of the user's face 103. The wearable device 101 may visualize the environment adjacent to the wearable device 101 (e.g., VST mode), by displaying an image obtained from the one or more cameras on the display.

Referring to FIG. 14A and/or FIG. 14B, different states 1401, 1402, 1403, 1404, 1405, and 1406 of the wearable device 101 to be switched between the VST mode or the VR mode in response to input related to dial 920 are illustrated. In the VST mode, the wearable device 101 may display at least a part of an image and/or video of an external environment obtained from one or more cameras on the display. In the VR mode, the wearable device 101 may display a screen provided from one or more software applications executed for the VR mode, on the entire displaying region of the display. In the VR mode, the wearable device 101 may provide a user experience like as being disconnected from the external environment or separated from the external environment.

Referring to FIG. 14A, in a state 1401, the wearable device 101 may display a virtual object 1414 and an image for an external environment obtained from one or more cameras on the display. When an external object (e.g., a chair 1410) is disposed in front of the user 103 wearing the wearable device 101, the user 103 wearing the wearable device 101 may view a visual object 1412 corresponding to the external object within an image displayed through the display. The user 103 who views the visual object 1412 displayed by the wearable device 101 in the state 1401 may recognize the chair 1410 disposed in front of the user 103. As in the state 1401, a mode of the wearable device 101 for displaying an image for an external environment through at least a part of the display may be referred to as a VST mode and/or an AR mode.

Referring to FIG. 14A, a virtual object 1414, which is a screen (e.g., window and/or activity) provided by execution of a software application executed by the wearable device 101 may occupy at least a part of a display area of the display. Although an embodiment of displaying a virtual object 1414 having a two-dimensional panel and/or rectangular shape is illustrated, the embodiment is not limited thereto. In another example, the wearable device 101 displays a virtual object having a three-dimensional shape. The virtual object 1414 may include a screen, cursor, icon, and/or widget provided from a software application.

In the state 1401 of FIG. 14A, the wearable device 101 may receive an input for rotating the dial 920 in a first direction (e.g., a clockwise direction). The input (or a rotation of the dial 920) may be detected by a sensor and/or a circuit connected to the dial 920. The wearable device 101 may calculate or determine a degree (e.g., angle of rotation), a direction (e.g., the clockwise direction and/or a counterclockwise direction) and/or a speed to which the dial 920 is rotated by the input, by using sensor data of a sensor connected to the dial 920.

In the state 1401 of FIG. 14A, the wearable device 101 detecting the dial 920 rotating in the clockwise direction may provide a transition from the state 1401 associated with AR mode to the VR mode. The transition may refer to gradually reducing a size of an area in which an image and/or video corresponding to an external environment is displayed in the display, and gradually increasing a size of an area in the display in which a virtual space provided by the wearable device 101 is displayed. Referring to FIG. 14A, the wearable device 101 detecting the dial 920 rotating in the clockwise direction may switch from state 1401 to state 1402.

In the state 1402, the wearable device 101 receiving an input for rotating the dial 920 in the clockwise direction may enlarge or expand a first area 1421 in which a virtual space is displayed, while the input is maintained. The virtual space may be referred to as a background area and/or a background space. The virtual space displayed through the first area 1421 may be set as a background of a virtual reality. A size of the first area 1421 and/or a speed at which the first area 1421 is expanded may be associated with a speed and/or an angle of rotation of the dial 920 rotating in the clockwise direction. For example, as the dial 920 rotates in the clockwise direction, the size of the first area 1421 gradually increases. For example, according to the speed at which the dial 920 rotates, the size of the first area 1421 increases more rapidly.

In the state 1402 of FIG. 14A, the wearable device 101 may expand the first area 1421 centered around a position of the virtual object 1414 displayed through the display, in response to an input for rotating the dial 920. In the state 1402 of detecting the dial 920 rotating in the clockwise direction, since the first area 1421 is expanded in a manner centering around the position of the virtual object 1414, the wearable device 101 may display a virtual space having a shape and/or size surrounding the virtual object 1414 through the expanded first area 1421.

Referring to FIG. 14A, in the state 1402 of expanding the first area 1421 corresponding to the virtual space in response to detecting the rotation of the dial 920, the wearable device 101 may reduce a second area 1422 displaying an image and/or video for the external environment according to the VST mode. Since the second area 1422 is reduced, the visual object 1412 corresponding to an external object (e.g., the chair 1410) displayed through the second area 1422 may gradually disappear within the display.

Referring to FIG. 14A, in the state 1402 of receiving an input for rotating the dial 920, the wearable device 101 may reduce the size of the second area 1422, and/or may change brightness (or luminance), illuminance, and/or transparency (and/or opacity) of an image displayed through the second area 1422. For example, the wearable device 101 reduces the brightness of the image displayed through the second area 1422, by using the angle and/or speed of the dial 920 rotating in the clockwise direction by the input. For example, while the input is maintained, the image displayed through the second area 1422 is gradually darkened.

Referring to FIG. 14A, in the state 1402 in which an input for rotating the dial 920 is maintained, the wearable device 101 may gradually expand the size of the first area 1421 and/or gradually reduce the size of the second area 1422. In the state 1403 after the state 1402, the first area 1421 extended by the input may occupy the entire display area of the display. In the state 1403 of displaying the virtual object 1414 superimposed on the virtual space displayed through the first area 1421, an image and/or video representing the external space may disappear fully from the display.

A state 1403 in which the size of the second area 1422 is substantially reduced to 0 may correspond to the VR mode. In state 1403, the wearable device 101 may provide user experience fully disconnected from the outside. In an embodiment providing transition from the VST mode to the VR mode in response to an input for rotating the dial 920 in the clockwise direction, the wearable device 101 provides a transition from the VR mode to the VST mode in response to another input for rotating the dial 920 in a counterclockwise direction. That is, the VR mode can be changed to the VST mode by providing an input in the opposite direction to that input used to change from the VST mode to the VR mode.

An exemplary operation of the wearable device 101 switching to the state 1403 corresponding to the VR mode that fully blocks the external environment according to the input for rotating the dial 920 in the clockwise direction has been described, but the embodiment is not limited thereto. In another example, in the state 1402 of displaying all of the first area 1421 corresponding to the virtual space and the second area 1422 including an image of the external environment in response to the input, when the input for rotating the dial 920 is ceased, the wearable device 101 maintains displaying all of the first area 1421 and the second area 1422. In the state 1402, in response to another input for rotating the dial 920 in the counterclockwise direction, the wearable device 101 may switch from the state 1402 to the state 1401.

Referring to FIG. 14B, in a state 1404 corresponding to the VR mode, the wearable device 101 may display a virtual space through a first area 1441 occupying the entire display area of the display, and may display a virtual object 1442 superimposed on the virtual space. The virtual object 1442 may be provided by execution of a software application executed by the wearable device 101. The virtual space displayed through the first area 1441 may include an image, video, and/or a set of one or more three-dimensional graphical objects (in the exemplary state 1404 of FIG. 14B, a pyramid, a rectangular parallelepiped, a pentagonal column and/or sphere) set as a background of the virtual reality.

In the state 1404 in which the virtual object 1442 superimposed on the virtual space is displayed, the wearable device 101 may receive an input for rotating the dial 920 in the counterclockwise direction. While the input is maintained, the wearable device 101 may reduce the first area 1441 in which the virtual space is displayed. A state 1405 after the state 1404 may be a state of the wearable device 101 in which the first area 1441 is reduced in response to the input.

Referring to the state 1405 of FIG. 14B, the wearable device 101 may maintain the size of the virtual object 1442, superimposed on the virtual space displayed within the first area 1441, which is reduced while the input is maintained. In response to the input, the wearable device 101 may further display a second area 1452 including an image obtained from one or more cameras in response to the input. While the input is maintained, the wearable device 101 may expand the second area 1412 including the image further displayed on the display. The wearable device 101 may display a visual object 1412 representing an external object (e.g., the chair 1410) disposed in front of the wearable device 101, through the expanded second area 1412. The user 103 viewing the visual object 1412 may recognize the external object.

Referring to FIG. 14B, in the state 1405 of receiving an input for rotating the dial 920 in the counterclockwise direction, the wearable device 101 may reduce the first area 1441 in a manner centering around a position of the virtual object 1442 superimposed on the virtual space displayed through the first area 1441. For example, the wearable device 101 reduces the first area 1441 centering around a position where the virtual object 1442 is displayed in the display. In the state 1405 in which the first area 1441 is reduced, specific three-dimensional graphical objects (e.g., pyramid and/or sphere) included in the virtual space may no longer be displayed. Since the size of the virtual object 1442 is maintained while the input is maintained, the virtual object 1442 may be continuously displayed on the display, independently of the first area 1441 reduced by the input.

Referring to FIG. 14B, in the state 1405 of expanding the size of the second area 1452 in response to an input for rotating the dial 920, the wearable device 101 may change brightness (or luminance), illuminance, and/or transparency of an image displayed through the second area 1452. For example, the wearable device 101 increases brightness of an image displayed through the second area 1422, by using the angle and/or speed of the dial 920 rotating in counterclockwise direction by the input. For example, while the input is maintained, the image displayed through the second area 1422 is gradually brightened. In the example, while the input is maintained, the virtual space displayed through the first area 1441 is gradually darkened. A first brightness of the image in the second area 1422 at a first timing of receiving the input may be less than a second brightness of the image in the second area 1422 extended after the first timing. In the first timing, the wearable device 101 may display an image with a designated brightness through the second area 1422, and change the brightness of the image to a brightness exceeding the designated brightness while the input for rotating the dial 920 after the first timing is maintained.

While providing user experience based on the VR mode, such as the state 1404, the wearable device 101 may display a screen having a brightness different from a brightness (or illuminance) of an external environment. In response to an input for switching from the VR mode to the VST mode, such as an input for rotating the dial 920, the wearable device 101 may perform an operation to compensate for a difference between a brightness of the VR mode and the brightness of the external environment. For example, the wearable device 101 receiving the input within the state 1404 determines or identifies a first brightness of the external environment by using an image obtained from one or more cameras. When the first brightness is brighter than a second brightness of the display in the state 1404 by a threshold and more, the image to be displayed through the second area 1452 in response to the input may be displayed using the second brightness. While the input is maintained, the wearable device 101 may gradually expand the second area 1452, and gradually change the brightness of the image displayed through the second area 1452 from the second brightness to the first brightness.

Referring to FIG. 14B, while the input is maintained, the wearable device 101 may be switched from the state 1405 to a state 1406 in which the size of the first area 1441 viewed through the display is substantially reduced to zero. While the input for rotating the dial 920 is maintained, the size of the first area 1441 may be reduced until a timing at which the size of the first area 1441 is reduced to the size of the virtual object 1442.

In an embodiment, in the state 1406 in which the size of the first area 1441 occupying a display area of the display to display the virtual space becomes substantially zero, when the input for rotating the dial 920 is maintained, the wearable device 101 performs an operation for reducing the virtual object 1442 superimposed on the virtual space. For example, the wearable device 101 changes or replaces the virtual object 1442 to an icon 1470 having a size less than the size of the virtual object 1442. The icon 1470 may include an image and/or text representing a software application corresponding to the virtual object 1442. In the state 1406 of displaying the virtual object 1442 from among the virtual space or the virtual object 1442 based on the reduced size of the first area 1441, the wearable device 101 may cease to display the virtual object 1442 in response to the input for rotating the dial 920 in the counterclockwise direction, and may display the icon 1470 in a position in the display in which the virtual object 1442 was displayed.

An exemplary operation of the wearable device 101 switching to a state 1406 that fully removes the virtual space provided in the VR mode in response to the input for rotating the dial 920 in the counterclockwise direction has been described, but the embodiment is not limited thereto. In another example, in the state 1405 of displaying all of the first area 1441 where the virtual space of the VR mode is displayed and the second area 1452 including an image for the external environment, when the rotation of the dial 920 by the input is ceased, the wearable device 101 maintains displaying all of the first area 1441 and the second area 1452. In the state 1405, when receiving another input for rotating the dial 920 in the clockwise direction, the wearable device 101 may switch back to the state 1404. That is, state 1405 can be changed to state 1404 by providing an input in the opposite direction to that input used to change state 1404 to state 1405.

Referring to FIG. 14A and/or FIG. 14B, an embodiment of the wearable device 101 for switching from the VST mode to the VR mode in response to the dial 920 rotating in the clockwise direction and switching from the VR mode to the VST mode in response to the dial 920 rotating in the counterclockwise direction has been described, but the embodiment is not limited thereto. In another example, the wearable device 101 switches from the VR mode to the VST mode in response to the input for rotating the dial 920 in the clockwise direction, and switch from the VST mode to the VR mode in response to the input for rotating the dial 920 in the counterclockwise direction.

An exemplary operation of expanding or reducing an area in which the virtual space is displayed centering around the virtual object 1442 by the wearable device 101 has been described, but the embodiment is not limited thereto. Hereinafter, an exemplary operation of the wearable device 101 using a direction of the user's gaze will be described with reference to FIGS. 15A and/or 15B.

Figure 15A:
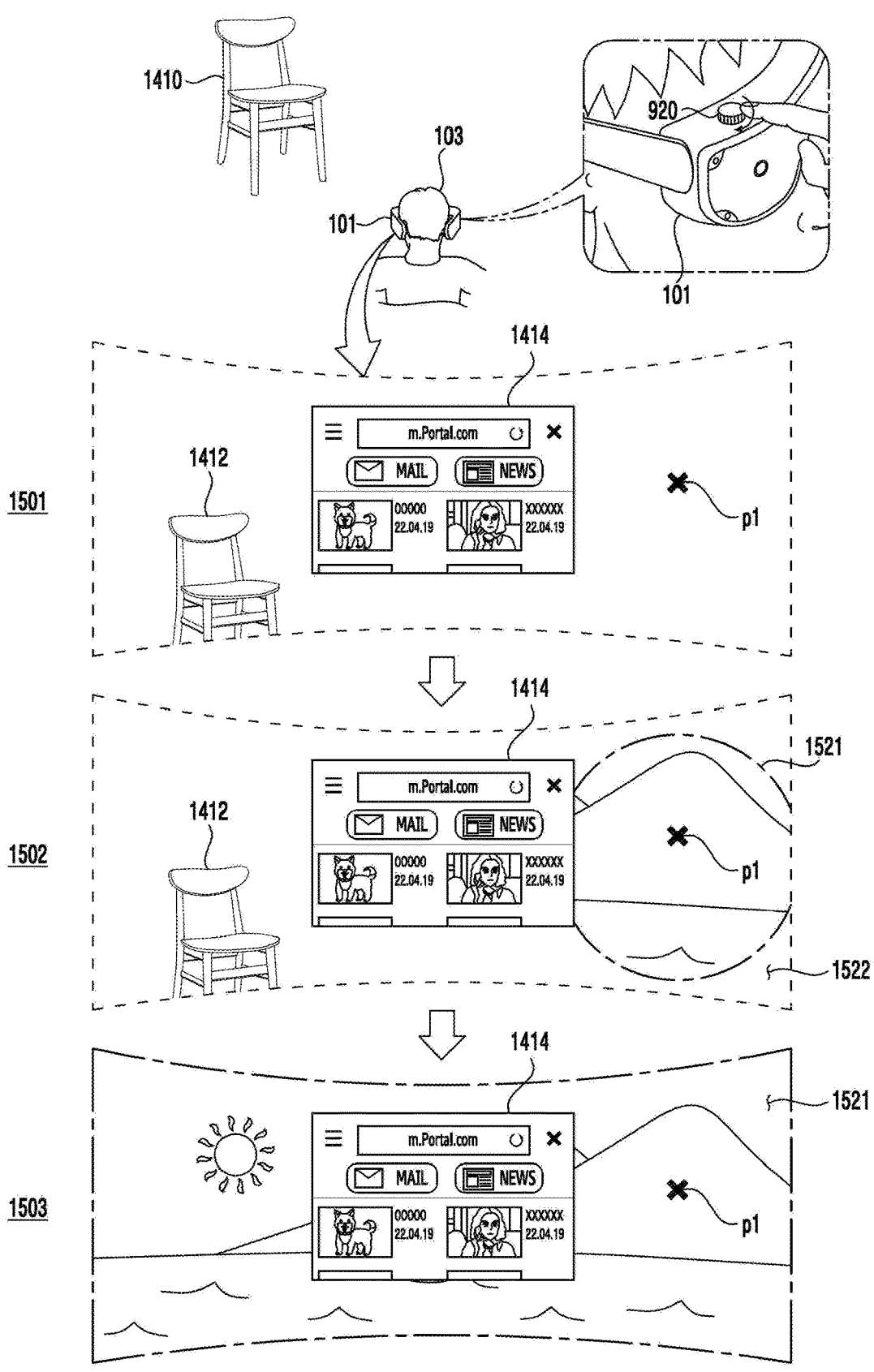
FIGS. 15A and 15B illustrate an exemplary operation of a wearable device according to rotation of a dial.
Figure 15B:
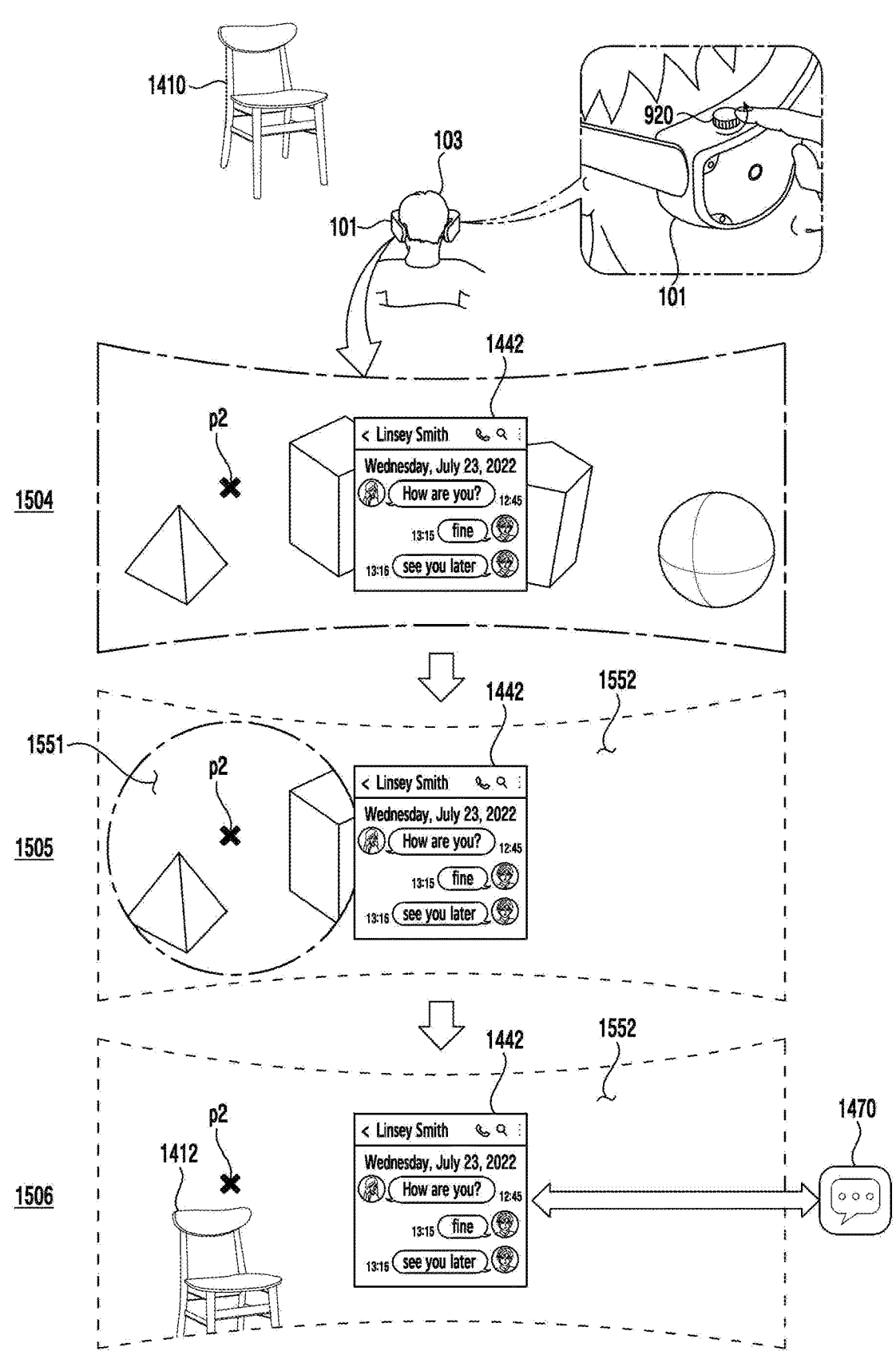

FIGS. 15A and 15B illustrate an exemplary operation of a wearable device 101 according to rotation of a dial 920. An operation of the wearable device 101 described with reference to FIGS. 15A to 15B may be performed by the wearable device 101 of FIGS. 1 to 2 and/or the processor 210 of FIG. 2. The operation of the wearable device 101 described with reference to FIGS. 15A to 15B may be associated with the operation of the wearable device described with reference to FIGS. 1 to 12. The operation of the wearable device 101 described with reference to FIGS. 15A to 15B may be associated with the operation of the wearable device 101 of FIGS. 14A and/or 14B.

Referring to FIG. 15A and/or FIG. 15B, different states 1501, 1502, 1503, 1504, 1505, and 1506 of the wearable device 101 switching between the VST mode or the VR mode in response to an input for rotating the dial 920 are illustrated. In a state 1501 corresponding to the VST mode, the wearable device 101 may display a virtual object 1414 superimposed on an image for an external environment. The virtual object 1414 may be provided from one or more software applications executed by the wearable device 101. In the state 1501 corresponding to the VST mode, a user 103 wearing the wearable device 101 may view the visual object 1412 corresponding to an external object (e.g., the chair 1410) through a display.

In the state 1501, the wearable device 101 receiving an input for rotating the dial 920 in the clockwise direction may provide a transition from the VST mode to the VR mode. A state 1502 of FIG. 15A may be an exemplary state in which the wearable device 101 receiving the input provides the transition. In the state 1502 in which the input is maintained, in response to the transition, the wearable device 101 may display a first area 1521 corresponding to a virtual space set as a background in the VR mode, and may gradually expand the first area 1521. The wearable device 101 expanding the first area 1521 may gradually reduce a second area 1421 in which an image and/or video obtained from one or more cameras are displayed.

In the state 1502 of FIG. 15A, the wearable device 101 may display or expand the first area 1521 centering around a position p1 in a display corresponding to a gaze of the user 103 wearing the wearable device 101. The position p1 may be identified using a camera (or an infrared (IR) sensor) disposed toward at least one of two eyes of the user 103 wearing the wearable device 101. For example, using images of the two eyes obtained through the camera, the wearable device 101 estimates or determines the position p1 in the display at which the user 103 gazes. The wearable device 101 may display the first area 1521 centering around the position p1 determined at a timing of receiving an input for rotating the dial 920 in the clockwise direction. While the input is maintained, the wearable device 101 may set or change a size of the first area 1521 and/or a size in which the first area 1521 is expanded by using at least one of an angle and/or a speed at which the dial 920 rotates.

Referring to FIG. 15A, in a state 1503 in which the input for rotating the dial 920 is maintained, the first area 1521 as extended or expanded, centering around the position p1 gazed at by the user 103 wearing the wearable device 101, may occupy the entire display area of the display. In the state 1503 in which the first area 1521 occupies the entire display area of the display, an image and/or video for the external environment may disappear from the display. In the state 1503, the wearable device 101 may cease to display an image and/or video corresponding to the external environment, and may cease to expand the first area 1521. In the state 1503 corresponding to the VR mode, the wearable device 101 may display the virtual object 1414 superimposed on the virtual space displayed through the first area 1521.

Referring to FIG. 15B, in a state 1504 corresponding to the VR mode, the wearable device 101 may provide a user experience disconnected from the external environment by using the virtual space set as a background. In the state 1504, the wearable device 101 receiving an input for rotating the dial 920 in the counterclockwise direction may switch to a state 1505 providing a transition from the VR mode to the VST mode. In the exemplary state 1505 of FIG. 15B, the wearable device 101 may reduce the first area 1551 in which the virtual space is displayed, and may expand the second area 1552 in which an image and/or video obtained from one or more cameras are displayed.

In the state 1505 of FIG. 15B, the wearable device 101 may reduce the first area 1551 centering around a position p2 in the display corresponding to a gaze of the user 103 wearing the wearable device 101. Centering around the position p2, the wearable device 101 may reduce the first area 1551 according to a size and/or speed corresponding to at least one of an angle of rotation and/or speed of the dial 920. In other words, the first area 1551 shrinks to the position p2 according to the input for rotating the dial 920, or according to a size and/or speed corresponding to at least one of an angle of rotation and/or speed of the dial 920.

Referring to FIG. 15B, in a state 1506 after the state 1505 where the input for rotating the dial 920 is maintained, the size of the first area 1551 in which the virtual space is displayed may be substantially reduced to zero. In the state 1506, the virtual object 1442 may be displayed independently of the virtual space displayed through the first area 1551. When the input is maintained in the state 1506, the wearable device 101 may replace the virtual object 1442 with an icon 1470 having a size less than the size of the virtual object 1442 and representing a software application executed to provide the virtual object 1442.

Hereinafter, referring to FIGS. 16A to 16B, an exemplary operation of the wearable device 101 associated with the dial 920 described with reference to FIGS. 14A to 14B and 15A to 15B will be described.

Figure 16A:
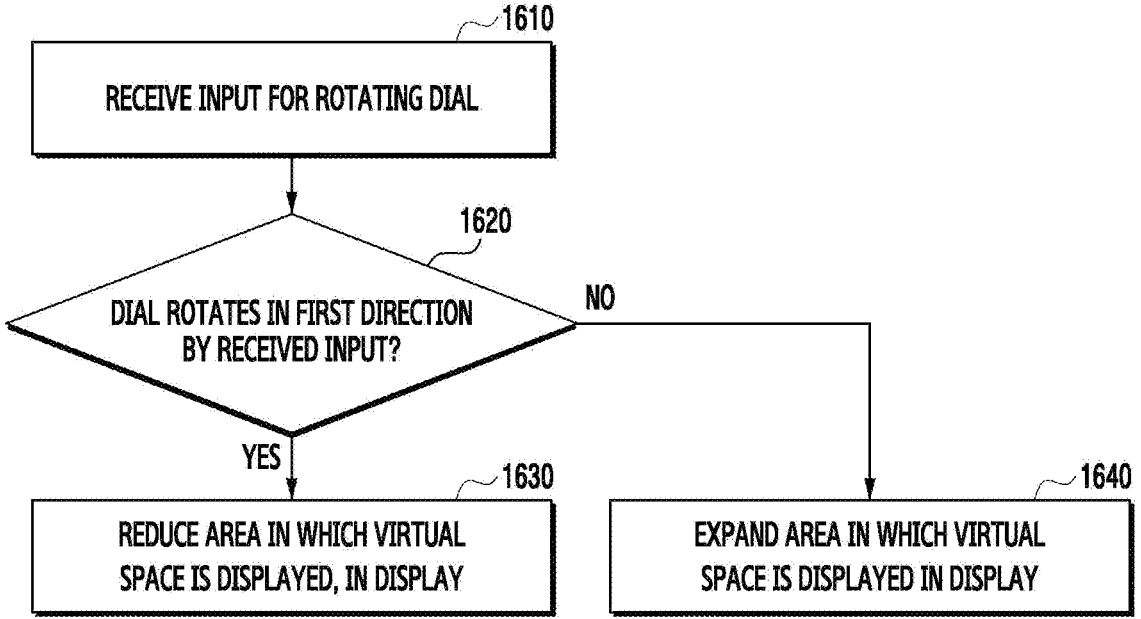

FIGS. 16A and 16B illustrate a flowchart of an operation of a wearable device, according to an embodiment. An operation of the wearable device described with reference to FIGS. 16A to 16B may be performed by the wearable device 101 of FIGS. 1 to 2 and/or the processor 210 of FIG. 2. The operation of the wearable device described with reference to FIGS. 16A to 16B may be associated with the operation of the wearable device 101 described with reference to FIGS. 14A to 14B and 15A to 15B.

Referring to FIG. 16A, in operation 1610, a processor of the wearable device receives an input for rotating a dial (e.g., the dial 920 of FIGS. 9B, 14A, 14B, 15A, and/or 15B). The input may be detected by a sensor and/or circuit associated with the dial. The processor may obtain information indicating an angle of rotation, speed and/or direction of the dial from the sensor and/or the circuit.

Referring to FIG. 16A, in operation 1620, the processor of the wearable device determines or identifies whether the dial rotates in a first direction by the received input. As a non-limiting example, the first direction of operation 1620 may correspond to the counterclockwise direction. When receiving an input for rotating the dial in the first direction (1620—YES), the processor performs operation 1630.

When receiving an input for rotating the dial in a second direction (e.g., the clockwise direction) opposite to the first direction (1620—NO), the processor performs operation 1640.

Referring to FIG. 16A, in operation 1630, the processor of the wearable device reduces an area in which the virtual space is displayed, in the display (e.g., the display 230 of FIG. 2). The area of operation 1630 may include the first area 1421 of FIG. 14A, the first area 1441 of FIG. 14B, the first area 1521 of FIG. 15A, and/or the first area 1551 of FIG. 15B. While reducing the area of operation 1630, the processor may expand another area in which an image and/or video obtained from one or more cameras (e.g., the camera 240 of FIG. 2) is displayed. The other area may include the second area 1422 of FIG. 14A, the second area 1452 of FIG. 14B, the second area 1522 of FIG. 15A, and/or the second area 1552 of FIG. 15B.

In an embodiment, while the input for rotating the dial in the first direction is maintained, the processor performs (e.g. continues to perform) operation 1630. The processor may perform operation 1630 until the area of operation 1630 is substantially reduced to zero. In the display, after the area of the operation 1630 becomes zero, the processor receiving the input for rotating the dial in the first direction may change another VR object (e.g., the virtual object 1442 in FIG. 14B) displayed in the display to another virtual object having a size smaller than the VR object, such as the icon 1470 of FIG. 14B.

The processor reducing the area of operation 1630 may gradually change a brightness, illuminance, and/or transparency of the area. For example, the processor gradually reduces a brightness of the area of operation 1630, or gradually increases the transparency.

Referring to FIG. 16A, in operation 1640, the processor of the wearable device expands an area in which the virtual space is displayed in the display. The area of operation 1640 may correspond to the area of operation 1630. The processor expanding the area of operation 1640 may gradually adjust the brightness, illuminance, and/or transparency of the area. For example, the processor gradually increases the brightness of operation 1640, or gradually reduces the transparency. Performing operation 1640 by the processor may be performed while an input for rotating the dial in a second direction opposite to the first direction of operation 1620 is maintained (e.g. operation 1640 continues to be performed while the input is maintained). The processor may perform operation 1640 until the area of operation 1640 corresponds to the entire display area of the display.

Referring to FIG. 16B, operations of the wearable device associated with operation 1630 are illustrated. In an embodiment, while performing operation 1630, the processor of the wearable device performs at least one of operations of FIG. 16B.

Referring to FIG. 16B, in operation 1650, the processor of the wearable device receives an input for rotating the dial in a first direction. The first direction of operation 1650 may correspond to the first direction of operation 1620. The processor receiving an input for rotating the dial in the first direction may perform operation 1655.

Referring to FIG. 16B, in operation 1655, the processor of the wearable device reduces a first area in the display displaying the virtual space, and expands a second area in the display including an image obtained from a camera. For example, this is based on receiving the input, with the reducing and/or expanding performing based on a characteristic of the input such as rotation speed, duration etc. The first area of the operation 1655 may include the first area 1421 of FIG. 14A, the first area 1441 of FIG. 14B, the first area 1521 of FIG. 15A, and/or the first area 1551 of FIG. 15B, and the second area of operation 1655 may include the second area 1422 of FIG. 14A, the second area 1452 of FIG. 14B, the second area 1522 of FIG. 15A, and/or the second area 1552 of FIG. 15B.

Referring to FIG. 16B, in operation 1660, the processor of the wearable device identifies or determines whether a virtual object superimposed on a virtual space is displayed without the virtual space. For example, this may be as a result of reducing the first area and/or expanding the second area. When a size of the first area reduced by operation 1655 is to be substantially zero, or a size of the first area viewed through the display is to be substantially zero, the virtual object may be displayed without the virtual space. When the virtual object is displayed without the virtual space (1660—YES), the processor performs operation 1665. When at least a part of the virtual space is displayed in the display (1660—NO), the processor bypasses or not performs operation 1665, and directly performs operation 1670.

Referring to FIG. 16B, in operation 1665, the processor of the wearable device ceases to display the virtual object, and may display an icon having a size less than a size of the virtual object. In a state in which the virtual object is displayed without the virtual space (e.g., the state 1406 of FIG. 14B and/or the state 1506 of FIG. 15B), when the input for rotating the dial in the first direction is maintained, the processor may perform operation 1665. The icon of operation 1665 may include the icon 1470 of FIGS. 14B and/or 15B.

Referring to FIG. 16B, in operation 1670, the processor of the wearable device determines or identifies whether the dial is ceased to rotate by the input of operation 1650. When the dial is ceased to rotate (1670—YES), the processor performs operation 1675. When the dial continuously rotates along the first direction by the input of operation 1650 (1670—NO), the processor performs operation 1655. For example, while the input for rotating the dial in the first direction is maintained, the processor repeatedly perform operations 1655, 1660, 1665, and 1670 of FIG. 16B.

Referring to FIG. 16B, in operation 1675, the processor of the wearable device ceases to reduce the first area. For example, this is based on (such as being responsive to) determining or identifying (or detecting) the dial is no longer rotated (i.e. the input ceases). Since reducing the first area is ceased, switching from the VR mode to the VST mode may be ceased. After operation 1675, when the input for rotating the dial in the first direction is received again, the operations of FIGS. 16A and/or 16B may be performed again.

Hereinafter, referring to FIG. 17A and/or FIG. 17B, example operations of the wearable device associated with a user's gaze will be described.

Figure 17A:
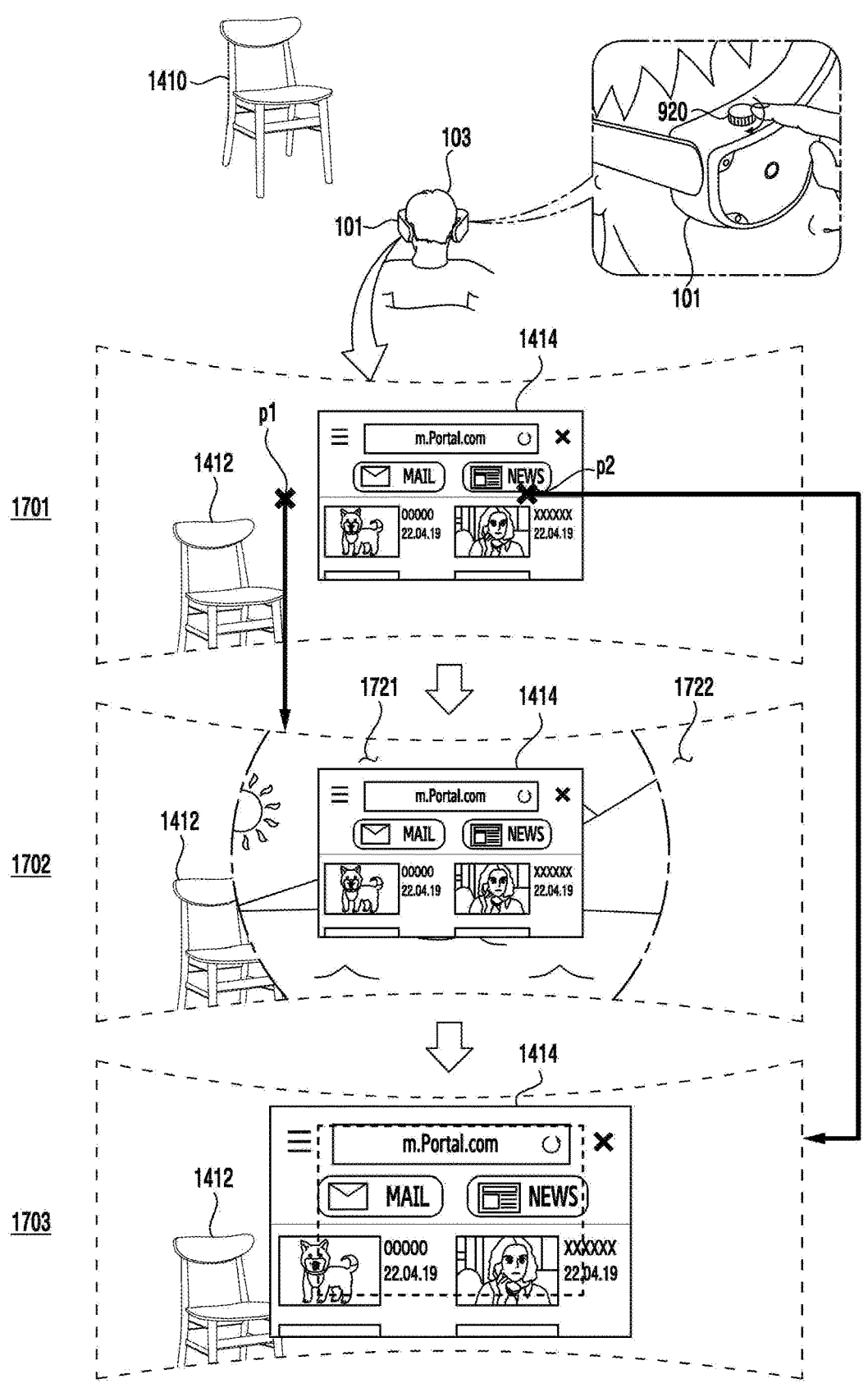
FIGS. 17A and 17B illustrate an exemplary operation of a wearable device in association with a user's gaze detected by a sensor.
Figure 17B:
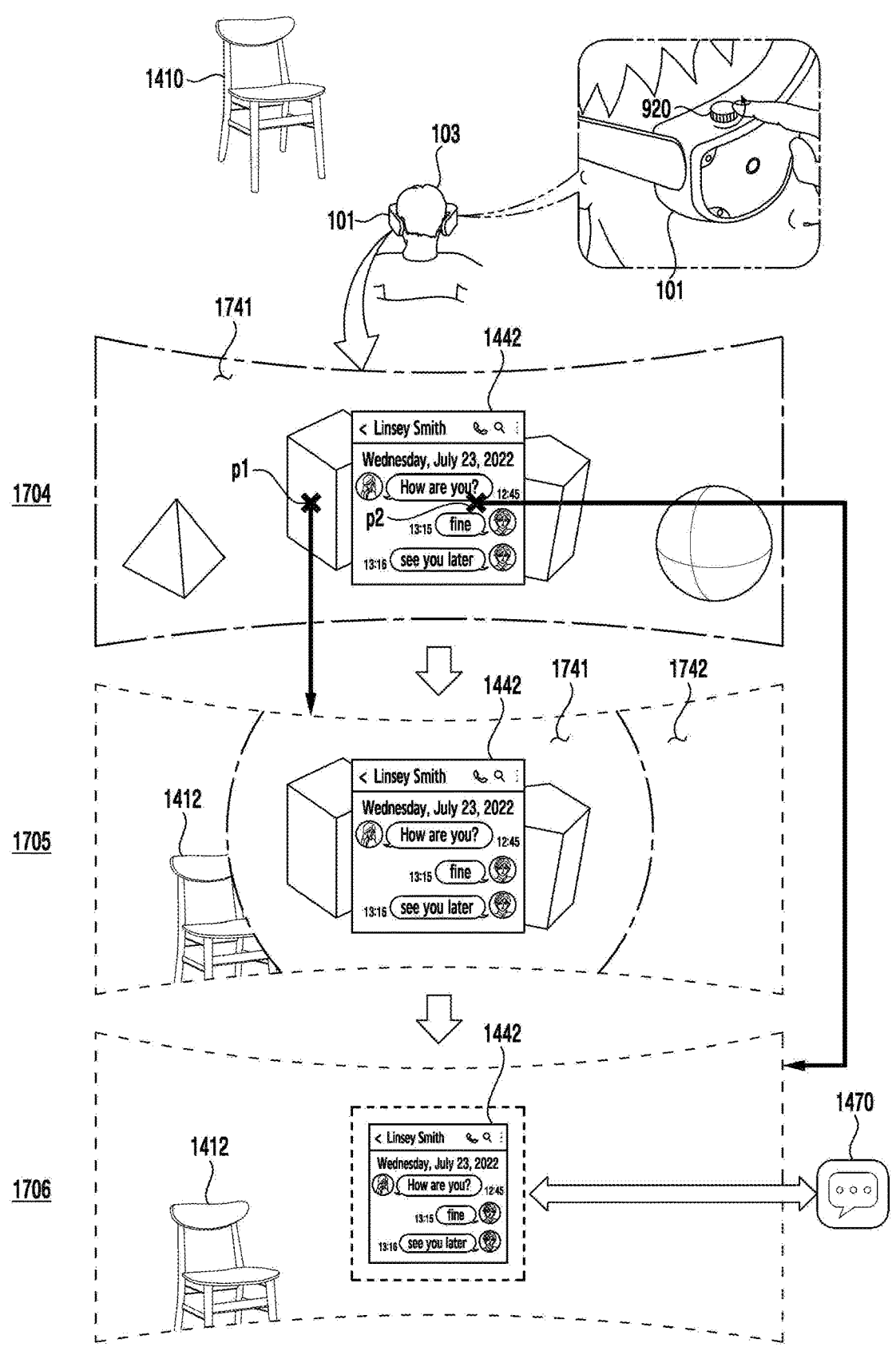

FIGS. 17A and 17B illustrate example operations of a wearable device 101 in association with a user's gaze 103 detected by a sensor. An operation of the wearable device 101 described with reference to FIGS. 17A to 17B may be performed by the wearable device 101 of FIGS. 1 to 2 and/or the processor 210 of FIG. 2. The operation of the wearable device 101 described with reference to FIGS. 17A to 17B may be associated with the operation of the wearable device described with reference to FIGS. 1 to 12.

Referring to FIG. 17A and/or FIG. 17B, different states 1701, 1702, 1703, 1704, 1705, and 1706 of the wearable device 101 receiving an input for rotating a dial 920 are illustrated. Referring to FIG. 17A, in a state 1701 corresponding to the VST mode, the wearable device 101 may display a virtual object 1414 provided from a software application superimposed on an image (e.g., an image including the visual object 1412 corresponding to an external object such as the chair 1410) representing an external environment. In the state 1701, the wearable device 101 may receive the input for rotating the dial 920 in a first designated direction (e.g., the clockwise direction).

In an embodiment, the wearable device 101 receiving the input for rotating the dial 920 determines whether to provide a transition from the VST mode to the VR mode, by using a position corresponding to a gaze of a user 103 wearing the wearable device 101, confirmed at a timing of receiving the input. For example, when a direction of the gaze of the user 103 corresponding to a position p1 within an area where an image representing an external environment is displayed is detected, the wearable device 101 provides a transition from the VST mode to the VR mode in response to the input. In the example, the wearable device 101 may switch from the state 1701 to a state 1702. In the state 1702, the wearable device 101 may expand a first area 1721 for displaying the virtual space according to the input, and reduce a second area 1722 in which an image corresponding to the external environment is displayed according to the input.

In the state 1701 of receiving the input for rotating the dial 920, the wearable device 101 may detect a direction of the gaze of the user 103 corresponding to the position p2 in the virtual object 1414. The wearable device 101 detecting the direction of the gaze of the user 103 corresponding to the position p2 may change a size and/or position (e.g., a distance of the virtual object 1414 from the user 103 represented by binocular disparity) of the virtual object 1414 corresponding to the position p2, instead of providing the transition from the VST mode to the VR mode. A state 1703 of FIG. 17A may be a state after the size and/or position of the virtual object 1414 is adjusted by the wearable device 101 that receives the input for rotating the dial 920 and detects the direction of the gaze of the user 103 corresponding to the position p2 in the virtual object 1414.

In the state 1703 of FIG. 17A, the wearable device 101 may increase the size of the virtual object 1414 displayed through the display. The wearable device 101 may expand the virtual object 1414 based on a position on which the virtual object 1414 is displayed. The wearable device 101 may provide a user experience like as the virtual object 1414 moving toward the user 103, by increasing the binocular disparity of the virtual object 1414. The wearable device 101 may provide a user experience like as the virtual object 1414 approaching toward the user 103 according to the input for rotating the dial 920, by reducing a depth value assigned to the virtual object 1414. In the state 1703, while the input for rotating the dial 920 is maintained, the wearable device 101 may expand the virtual object 1414 or move the virtual object 1414 toward the user 103.

Referring to FIG. 17B, a state 1704 of the wearable device 101 corresponding to the VR mode is illustrated. In the state 1704, the wearable device 101 receiving the input for rotating the dial 920 in a second designated direction may perform an operation associated with the input. The second designated direction may be a direction (e.g., the counterclockwise direction) opposite to the first designated direction described with reference to FIG. 17A. Mapping between the first designated direction and the second designated direction and the clockwise direction and the counterclockwise direction is not limited to the embodiment described with reference to FIGS. 17A to 17B. In another example, the first designated direction is the counterclockwise direction, and the second designated direction is the clockwise direction.

In the state 1704 of FIG. 17B, the wearable device 101 receiving the input for rotating the dial 920 may detect a position and/or direction of the gaze of the user 103 at a timing of receiving the input. At the timing of receiving the input, the wearable device 101 detecting a direction of the gaze of the user 103 corresponding to a point p1 in a first area 1741 in which the virtual space is displayed may switch to an exemplary state providing a transition from the VR mode to the VST mode, such as in the state 1705. In the state 1705, while the input is maintained, the wearable device 101 may reduce the first area 1741, and may expand a second area 1742 in which an image corresponding to the external environment is displayed.

In the state 1704 of FIG. 17B, the wearable device 101 receiving the input for rotating the dial 920 may switch to a state for adjusting a size and/or position of the virtual object 1442 based on detecting a direction of the gaze of the user 103 corresponding to the point p2 in the virtual object 1442, such as in a state 1706. In the state 1706, the wearable device 101 may reduce the virtual object 1442 while the input is maintained. In other words, based on identifying an input using the dial 920 and a gaze of the user, one or more of the first area 1741, the second area 1742 or the virtual object 1442 is controlled. For example, a size of the one or more of the first area 1741, the second area 1742 or the virtual object 1442 is controlled, such as based on a characteristic of the received input using the dial 920.

In the state 1706, the wearable device 101 may reduce binocular disparity of the virtual object 1442 while the input is maintained. Due to the reduced binocular disparity, the user 103 wearing the wearable device 101 may recognize that the virtual object 1442 moves away from the user 103. When the virtual object 1442 is reduced to a designated size, and/or the binocular disparity corresponding to the virtual object 1442 is reduced to less than a designated binocular disparity, the wearable device 101 may cease to display the virtual object 1442, and may display an icon 1470 associated with the virtual object 1442. The icon 1470 may include an image and/or text representing a software application executed to provide the virtual object 1442.

Figure 18:
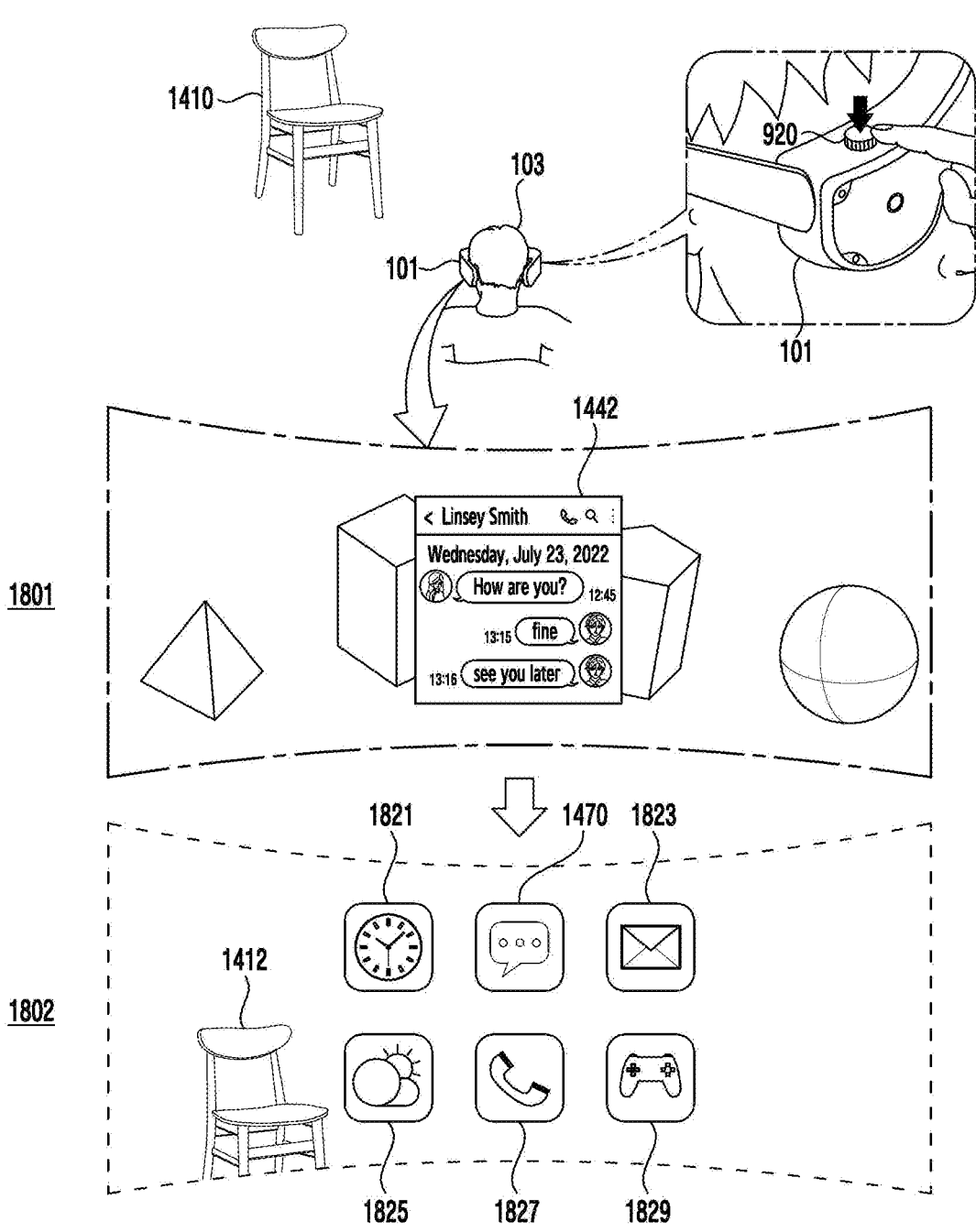
FIG. 18 illustrates an exemplary operation of a wearable device in association with a dial.

FIG. 18 illustrates an example operation of a wearable device 101 in association with a dial 920. An operation of the wearable device 101 described with reference to FIG. 18 may be performed by the wearable device 101 of FIGS. 1 and 2 and/or the processor 210 of FIG. 2. The operation of the wearable device 101 described with reference to FIG. 18 may be associated with the operation of the wearable device described with reference to FIGS. 1 to 12.

Referring to FIG. 18, states 1801 and 1802 of the wearable device 101 associated with an input of pressing the dial 920 are illustrated. Referring to FIG. 18, a state 1442 of the wearable device 101 displaying a virtual object 1442 superimposed on a virtual space in VR mode is illustrated. In the state 1442, the wearable device 101 may receive an input for clicking the dial 920. For example, a click of the dial 920 includes an action of pressing the dial 920 for less than a designated duration (e.g., a duration less than 1.5 seconds). In response to the input for clicking the dial 920, the wearable device 101 may switch to a state 1802 that displays icons 1821, 1470, 1823, 1825, 1827, and 1829 representing each of one or more software applications installed in the wearable device 101, such as a home screen (or a launcher screen).

Referring to FIG. 18, the state 1802 switched from the state 1801 in response to the input for clicking the dial 920 is illustrated. In the state 1802, the wearable device 101 may display icons 1821, 1470, 1823, 1825, 1827, and 1829 superimposed on an image and/or video for the external environment in VST mode (or AR mode). The wearable device 101 may display icons corresponding to each of one or more software applications, which is installed in the wearable device 101 or executed by the wearable device 101, such as the icon 1470 corresponding to the virtual object 1442. For example, the input for clicking the dial 920 corresponds to an input for switching to a designated state that visualizes software applications installed in the wearable device 101 by using a screen in which icons 1821, 1470, 1823, 1825, 1827, and 1829 are listed, such as in the state 1802. Each icon 1821, 1470, 1823, 1825, 1827, and 1829 may be selectable to execute the corresponding application.

As described above, the dial 920 included in the wearable device 101 may be rotated in a clockwise direction and/or counterclockwise direction, and/or may be pressed. In response to the rotation of the dial 920, the wearable device 101 may provide a transition between the VST mode and the VR mode. In response to the click of the dial 920, the wearable device 101 may switch to a state in which icons 1821, 1470, 1823, 1825, 1827, and 1829 representing each of the software applications installed in the wearable device 101 are displayed, such as the state 1802. Mapping between an input capable of receiving through the dial 920 and operation of the wearable device 101 is not limited to the above-described embodiment.

In an embodiment, the wearable device 101 communicates with an external electronic device such as a watch and/or a ring. Hereinafter, an example operation of the wearable device 101 providing a transition between the VST mode and the VR mode in response to an input received through an external electronic device will be described with reference to FIGS. 19 to 20.

Figure 19:
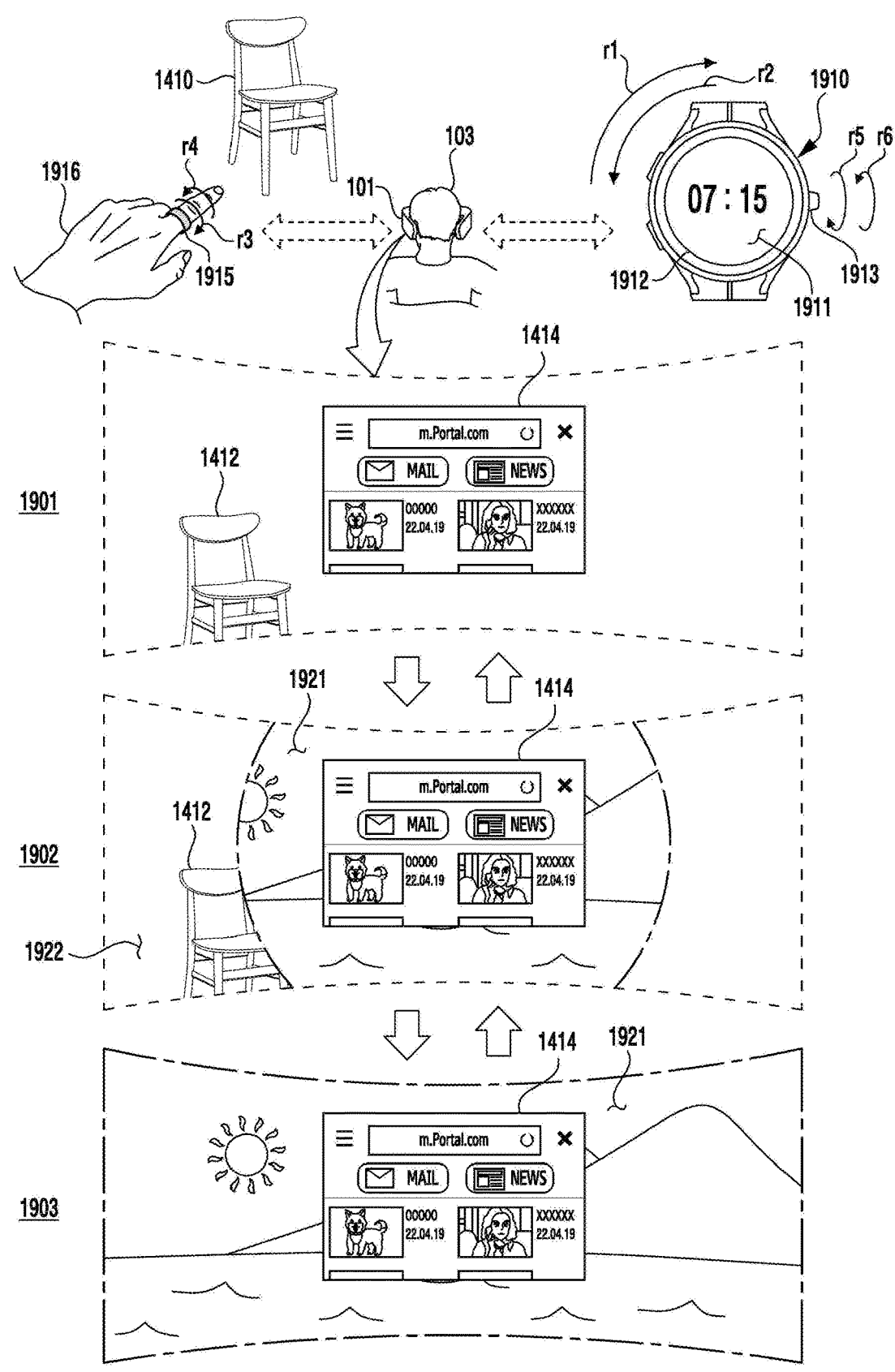
FIG. 19 illustrates an exemplary operation of a wearable device connected with an external electronic device.

FIG. 19 illustrates an example operation of a wearable device 101 connected with an external electronic device (e.g., a watch 1910 and/or a ring 1915). An operation of the wearable device 101 described with reference to FIG. 19 may be performed by the wearable device 101 of FIGS. 1 and 2 and/or the processor 210 of FIG. 2. The operation of the wearable device 101 described with reference to FIG. 19 may be associated with the operation of the wearable device described with reference to FIGS. 1 to 12.

Referring to FIG. 19, different states 1901, 1902, and 1903 of the wearable device 101 communicating with the watch 1910 and/or the ring 1915 are illustrated. A communication link between the wearable device 101 and an external electronic device (e.g., the watch 1910 and/or the ring 1915) may be established using a wireless communication protocol, such as Bluetooth, Bluetooth low energy (BLE), a near field communication (NFC), WiFi and/or WiFi-direct. The wearable device 101 may receive a signal and/or information indicating a user input detected by the external electronic device, through the communication link, from the external electronic device.

Referring to FIG. 19, the watch 1910 may include a circular display 1911 and a bezel ring 1912 arranged along an outline of the display 1911. The watch 1910 receiving an input for rotating the bezel ring 1912 may transmit a signal for notifying a reception of the input to the wearable device 101. Referring to FIG. 19, the watch 1910 may include a crown 1913 exposed to the outside through another surface (e.g., a side surface) next to a surface (e.g., a front surface) of the watch 1910 on which the display 1911 is disposed. The watch 1910 detecting a rotation of the crown 1913 may transmit a signal for notifying the rotation of the crown 1913 to the wearable device 101.

Referring to FIG. 19, the ring 1915 worn on a hand 1916 may include a touch sensor. When an external object (e.g., a finger) in contact with the ring 1915 is dragged, the ring 1915 may transmit a signal for notifying a reception of an input associated with the external object to the wearable device 101.

According to an embodiment, the wearable device 101 provides a transition between the VST mode and the VR mode, in response to a signal transmitted from an external electronic device such as the watch 1910 and/or the ring 1915. For example, in the state 1901 of displaying an image for an external environment and a virtual object 1414, the wearable device 101 switches to the VR mode in the VST mode, in response to the signal.

The watch 1910 that detects motion of the bezel ring 1912 rotating in a counterclockwise direction r2 and/or rotation of the crown 1913 rotating in a counterclockwise direction r5 may transmit a signal associated with the motion to the wearable device 101. The wearable device 101 receiving the signal in the state 1901 corresponding to the VST mode may provide a transition from the VST mode to the VR mode by switching to the state 1902. In the state 1902, the wearable device 101 may expand a first area 1921 in which a virtual space is displayed, and may reduce a second area 1922 in which an image corresponding to an external environment is displayed.

The watch 1910 that receives an input for rotating the bezel ring 1912 in the counterclockwise direction r2 and/or an input for rotating the crown 1913 in the counterclockwise direction r5 may transmit a signal associated with the input to the wearable device 101, while the input is maintained. In the state 1902, the wearable device 101 that receives the signal periodically or repeatedly may expand the first area 1921 and reduce the second area 1922. The wearable device 101 may reduce the second area 1922 until a state 1903 in which a size of the second area 1922 viewed through the display is substantially zero.

Similarly, the ring 1915 that detects an external object dragged in a counterclockwise direction r4 along a surface of the ring 1915 may transmit a signal indicating an input associated with the external object to the wearable device 101. The wearable device 101 receiving the signal may provide a transition from the VST mode to the VR mode while the input detected by the ring 1915 is maintained.

For example, the watch 1910 that detects motion of the bezel ring 1912 rotating in a clockwise direction r1 and/or the crown 1913 rotating in a clockwise direction r6 transmits a signal indicating an input associated with the motion to the wearable device 101. In the state 1903 corresponding to the VR mode and/or the state 1902 displaying a virtual space through the first area 1921, the wearable device 101 receiving the signal may provide a transition from the VR mode to the VST mode. The wearable device 101 may reduce the first area 1921 in which the virtual space is displayed, and may expand the second area 1922 in which an image corresponding to the external environment is displayed.

Reducing the first area 1921 by the wearable device 101 may be performed, while receiving a signal from the watch 1910 indicating that receiving an input for rotating the bezel ring 1912 in the clockwise direction r1 (or an input for rotating the crown 1913 in the clockwise direction r6) is maintained. While the input is maintained, the first area 1921 may be reduced until becoming substantially zero, such as in the state 1901. After the first area 1921 disappeared from the display, the wearable device 101 receiving a signal associated with the input from the watch 1910 may replace the virtual object 1414 with an icon corresponding to the virtual object 1414.

Similarly, the ring 1915 that detects an external object dragged in a clockwise direction r3 along a surface of the ring 1915 may transmit a signal indicating an input associated with the external object to the wearable device 101. The wearable device 101 receiving the signal may provide a transition from the VR mode to the VST mode, while the input detected by the ring 1915 is maintained.

Hereinafter, an operation of the wearable device 101 described with reference to FIG. 19 will be described with reference to FIG. 20.

Figure 20:
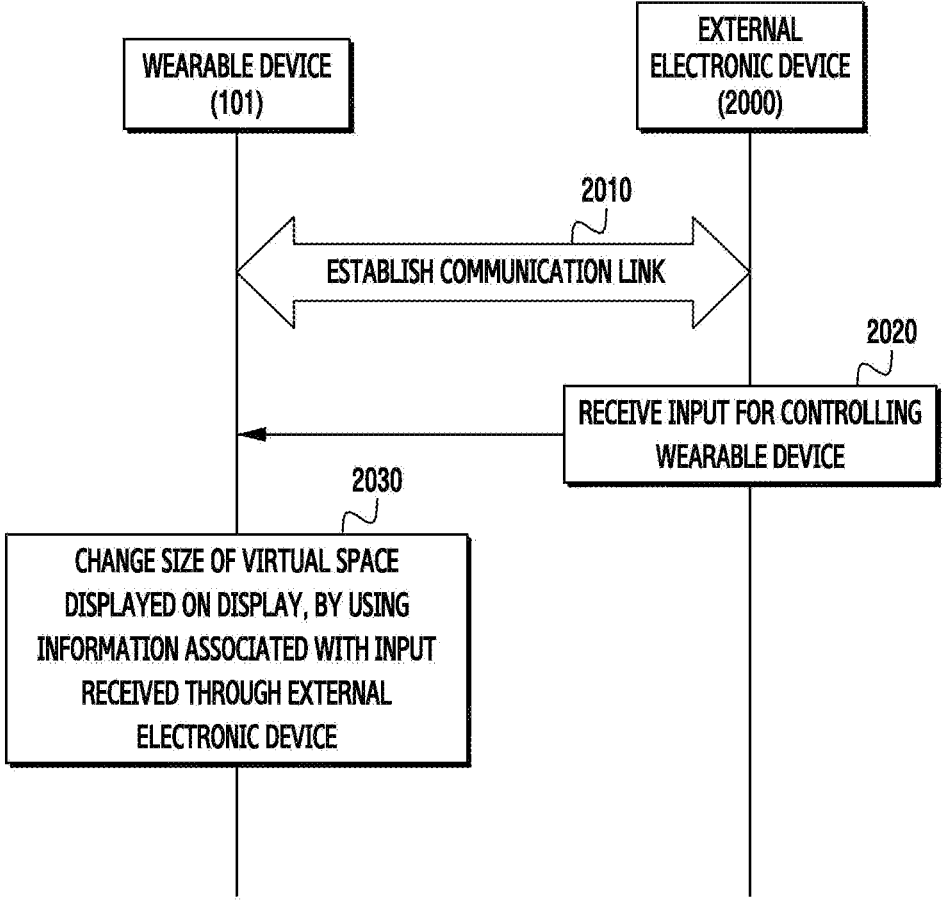
FIG. 20 illustrates an exemplary signal flowchart between a wearable device and an external electronic device.

FIG. 20 illustrates an example signal flowchart between a wearable device 101 and an external electronic device 2000. An operation of the wearable device described with reference to FIG. 20 may be performed by the wearable device 101 of FIGS. 1 to 2 and/or the processor 210 of FIG. 2. The operation of the wearable device 101 described with reference to FIG. 20 may be associated with the operation of the wearable device 101 described with reference to FIG. 19. The external electronic device 2000 of FIG. 20 may include the watch 1910 and/or the ring 1915 of FIG. 19.

Referring to FIG. 20, in operation 2010, a communication link between the wearable device 101 and the external electronic device 2000 is established. The communication link may be established by a process defined by a wireless communication protocol, such as pairing. A logical connection, which is capable of transmitting a notification message (or a signal) associated with a user input detected by the external electronic device 2000, between the external electronic device 2000 and the wearable device 101 may be established through the communication link.

Referring to FIG. 20, in operation 2020, the external electronic device 2000 receives an input for controlling the wearable device. The input may be detected by a circuit and/or sensor included in the external electronic device 2000, such as the bezel ring 1912 of the watch 1910 and/or a touch sensor of the ring 1915. The external electronic device 2000 receiving the input may transmit a signal associated with the input to the wearable device 101.

Referring to FIG. 20, in operation 2030, the wearable device 101 that receives a signal associated with the input of the operation 2020 from the external electronic device 2000 changes a size of a virtual space displayed on a display (e.g., the display 230 of FIG. 2), by using information associated with the input received through the external electronic device. For example, as described above with reference to FIG. 19, the wearable device 101 reduces and/or expands a size of an area in which a virtual space is displayed. While the input is continuously received through the external electronic device 2000, the wearable device 101 may change the size of the virtual space based on the operation 2030.

Figure 21:
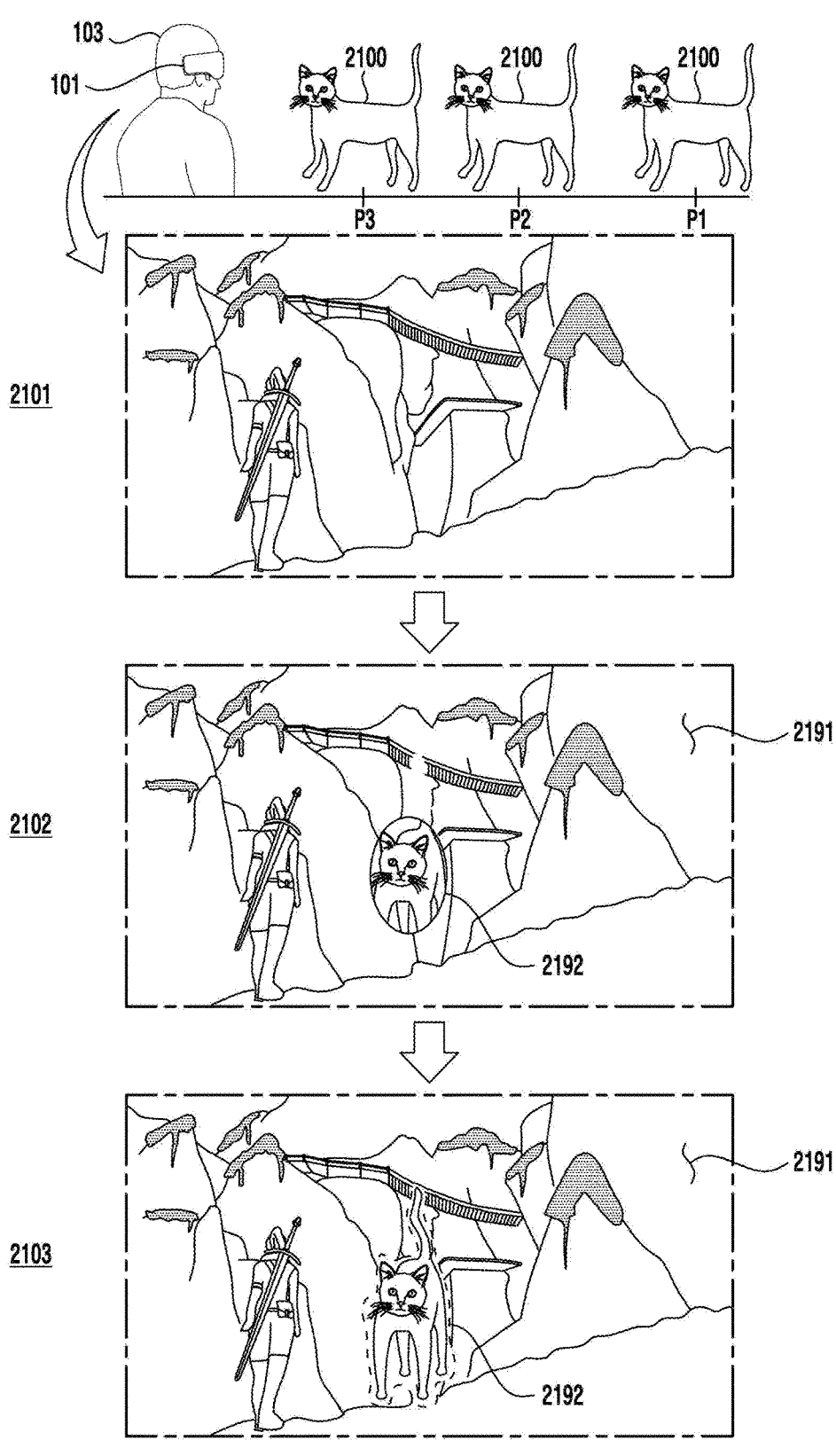
FIG. 21 illustrates an exemplary operation of a wearable device that detects an external object moved toward the wearable device.

FIG. 21 illustrates an example operation of a wearable device 101 that detects an external object 2100 moved toward the wearable device. An operation of the wearable device 101 described with reference to FIG. 21 may be performed by the wearable device 101 of FIGS. 1 and 2 and/or the processor 210 of FIG. 2.

Referring to FIG. 21, a state 2101 in which the wearable device 101 provides a virtual space to a user 103 wearing the wearable device 101 is illustrated. In the state 2101, the wearable device 101 may provide a user experience disconnected from an external environment by using a virtual space occupying the entire display. In the state 2101, the wearable device 101 may detect the external object 2100 (e.g. may detect the external object 2100 in an image captured by a camera of the wearable device 101, such as camera 240). In the state 2101 in which the external object 2100 of a point p1 spaced apart from the wearable device 101 by exceeding a designated distance is detected, the wearable device 101 may maintain providing a virtual space through the entire display.

Referring to FIG. 21, a case in which a distance between the wearable device 101 and the external object 2100 is gradually reduced by movement of an external object 2100 (e.g., animal such as a cat) is illustrated (although an analogous case would apply when the wearable device 101, or user thereof, moves towards the external object 2100). In a state 2102 after the state 2101, the wearable device 101 may detect the external object 2100 moved to a position p2 less than a first designated distance. The wearable device 101 that detects the external object 2100 moved to the position p2 less than the first designated distance may display a portion 2192 associated with the external object 2100 in a display. A position of the portion 2192 in the display may be determined by a position relationship between the wearable device 101 and the external object 2100. A size of the portion 2192 may be associated with a distance between the wearable device 101 and the external object 2100, detected by the wearable device 101. A shape and/or size of the portion 2192 may have at least a temporarily designated shape (e.g., a circular shape). For example, the size of the portion 2192 may reflect the size of the external object 2100 at position p2 in an image captured by a camera of the wearable device 101

Referring to FIG. 21, in a state 2103 after the state 2102, the wearable device 101 may detect the external object 2100 moved to a position p3 less than a second designated distance, which is smaller than the first designated distance. In the state 2103 of detecting the external object 2100 approaching less than the second designated distance, the wearable device 101 may display the portion 2192 of an image corresponding to the external object 2100 on the virtual space displayed through the display. The portion 2192 may include a portion matching the external object 2100 in an image obtained by the wearable device 101. The portion 2192 may have an outline shape of a visual object corresponding to the external object 2100, in an image obtained through the camera of the wearable device 101.

Referring to FIG. 21, as the external object 2100 moves toward the wearable device 101, the size of the portion 2192 corresponding to the external object 2100 may gradually increase in the display. The wearable device 101 may display the portion 2192 having transparency on the virtual space, such as alpha blending. For example, as a distance between the external object 2100 and the wearable device 101 is reduced, transparency of the portion 2192 may be gradually reduced. On the contrary, as the distance between the external object 2100 and the wearable device 101 increases, the transparency of the portion 2192 may gradually increase. As the distance between the external object 2100 and the wearable device 101 increases, a size of the portion 2192 displayed on the virtual space may be gradually reduced.

While providing a virtual space to a user, a method for displaying an image obtained through a camera in a portion of the virtual space may be required. As described above, according to an embodiment, a wearable device 101 may comprise a housing, a display 230 disposed on a first surface of the housing, a touch sensor 251, a camera 240 disposed based on a direction of a second surface 260 of the housing that is opposite to the first surface, and a processor. The processor 210 may identify a drag input on the second surface 260 using the touch sensor 251, while providing a virtual space 110 through the display 230. The processor 210 may identify an area for displaying an image within a screen of the display 230 on which the virtual space 110 is displayed, by using a path of a contact point of the drag input, based on identifying the drag input. The processor 210 may display a portion segmented based on the path, in the image obtained through the camera 240 on the area of the screen.

According to an embodiment, the processor 210 may identify the area for displaying the image in the screen, based on the path being identified as a first direction.

According to an embodiment, the processor 210 may refrain from displaying the segmented portion based on identifying a drag input in a second direction opposite to the first direction while displaying the portion in the area.

According to an embodiment, the processor 210 may identify the area corresponding to a reference surface in the screen, based on identifying a visual object corresponding to the reference surface in the image. The processor 210 may display the portion within the area.

According to an embodiment, the processor 210 may identify the area corresponding to the reference surface in the screen, based on the reference surface identified within a reference distance.

According to an embodiment, the processor 210 may change a position of the visual object based on the area and the visual object being at least partially superimposed, while displaying an interaction available visual object in the virtual space 110.

According to an embodiment, the processor 210 may change the position in order not to superimpose the position of the visual object on the area.

According to an embodiment, the processor 210 may adjust transparency of the visual object, based on the area and the visual object being at least partially superimposed, while displaying an interaction available visual object in the virtual space 110.

According to an embodiment, the processor 210 may identify the area using a first direction and a second direction, based on that the path of the contact point is identified from the first direction to the second direction.

As described above, according to an embodiment, a method of a wearable device 101 may include identifying a drag input on a second surface 260 opposite to the first surface using a touch sensor 251, while providing a virtual space 110 through a display 230 disposed on a first surface of a housing. The method may include identifying an area for displaying an image within a screen of the display 230 on which the virtual space 110 is displayed, by using a path of a contact point of the drag input, based on identifying the drag input. The method may include displaying a portion segmented based on the path, in the image obtained through a camera 240 on the area of the screen.

According to an embodiment, the method may include identifying the area for displaying the image in the screen, based on the path being identified as a first direction.

According to an embodiment, the method may include refraining from displaying the segmented portion based on identifying a drag input in a second direction opposite to the first direction while displaying the portion in the area.

According to an embodiment, the method may include identifying the area corresponding to a reference surface in the screen, based on identifying a visual object corresponding to the reference surface in the image. The method may include displaying the portion within the area.

According to an embodiment, the method may include identifying the area corresponding to the reference surface in the screen, based on the reference surface identified within a reference distance.

According to an embodiment, the method may include changing a position of the visual object based on the area and the visual object being at least partially superimposed, while displaying an interaction available visual object in the virtual space 110.

According to an embodiment, the method may include changing the position in order not to superimpose the position of the visual object on the area.

According to an embodiment, the method may include adjusting transparency of the visual object, based on the area and the visual object being at least partially superimposed, while displaying an interaction available visual object in the virtual space 110.

According to an embodiment, the method may include identifying the area using a first direction and a second direction, based on that the path of the contact point is identified from the first direction to the second direction.

As described above, according to an embodiment, a computer readable storage medium storing one or more programs, the one or more programs may cause, when executed by a processor 210 of a wearable device 101, the processor 210 of the wearable device 101 to identify a drag input on a second surface 260 opposite to the first surface using a touch sensor 251, while providing a virtual space 110 through a display 230 disposed on a first surface of a housing. The one or more programs may cause, when executed by the processor 210 of the wearable device 101, the processor 210 of the wearable device 101 to identify an area for displaying an image within a screen of the display 230 on which the virtual space 110 is displayed, by using a path of a contact point of the drag input, based on identifying the drag input. The one or more programs may cause, when executed by the processor 210 of the wearable device 101, the processor 210 of the wearable device 101 to display a portion segmented based on the path, in the image obtained through a camera 240 on the area of the screen.

According to an embodiment, the one or more programs may cause, when executed by the processor 210 of the wearable device 101, the processor 210 of the wearable device 101 to identify the area for displaying the image in the screen, based on the path being identified as a first direction.

According to an embodiment, the one or more programs may cause, when executed by the processor 210 of the wearable device 101, the processor 210 of the wearable device 101 to refrain from displaying the segmented portion based on identifying a drag input in a second direction opposite to the first direction while displaying the portion in the area.

According to an embodiment, the one or more programs may cause, when executed by the processor 210 of the wearable device 101, the processor 210 of the wearable device 101 to identify the area corresponding to a reference surface in the screen, based on identifying a visual object corresponding to the reference surface in the image. The one or more programs may cause, when executed by the processor 210 of the wearable device 101, the processor 210 of the wearable device 101 to display the portion within the area.

According to an embodiment, the one or more programs may cause, when executed by the processor 210 of the wearable device 101, the processor 210 of the wearable device 101 to identify the area corresponding to the reference surface in the screen, based on the reference surface identified within a reference distance.

According to an embodiment, the one or more programs may cause, when executed by the processor 210 of the wearable device 101, the processor 210 of the wearable device 101 to change a position of the visual object based on the area and the visual object being at least partially superimposed, while displaying an interaction available visual object in the virtual space 110.

According to an embodiment, the one or more programs may cause, when executed by the processor 210 of the wearable device 101, the processor 210 of the wearable device 101 to change the position in order not to superimpose the position of the visual object on the area.

According to an embodiment, the one or more programs may cause, when executed by the processor 210 of the wearable device 101, the processor 210 of the wearable device 101 to adjust transparency of the visual object, based on the area and the visual object being at least partially superimposed, while displaying an interaction available visual object in the virtual space 110.

According to an embodiment, the one or more programs may cause, when executed by the processor 210 of the wearable device 101, the processor 210 of the wearable device 101 to identify the area using a first direction and a second direction, based on that the path of the contact point is identified from the first direction to the second direction.

As described above, according to an embodiment, a wearable device may include a housing, a dial on the housing, a display forming at least portion of the housing to be arranged in front of eyes of a user wearing the wearable device, one or more cameras exposed outside through at least portion of the housing to obtain an image with respect to at least portion of environment adjacent to the wearable device, memory storing instructions, and a processor. The instructions may cause, when executed by the processor, the wearable device to display a virtual object superimposed on a virtual space by using the display. The instructions may cause, when executed by the processor, the wearable device to, while the virtual object superimposed on the virtual space is displayed, receive an input to rotate the dial in a first direction. The instructions may cause, when executed by the processor, the wearable device to, while the input is maintained, reduce a first area where the virtual space is displayed. The instructions may cause, when executed by the processor, the wearable device to, while the input is maintained, maintain a size of the virtual object that is superimposed on the virtual space and is displayed inside of the first area reduced while the input is maintained. The instructions may cause, when executed by the processor, the wearable device to, while the input is maintained, expand a second area including the image that is further displayed on the display in response to the input.

For example, the instructions may cause, when executed by the processor, the wearable device to, based on a reduced size of the first area, change the virtual object to an icon having a size smaller than the size of the virtual object that is maintained while the input is maintained.

For example, the instructions may cause, when executed by the processor, the wearable device to, while the virtual object superimposed on the virtual space is displayed, receive another input to rotate the dial in a second direction opposite to the first direction. The instructions may cause, when executed by the processor, the wearable device to, while the other input is maintained, expand the first area where the virtual space is displayed. The instructions may cause, when executed by the processor, the wearable device to, based on the other input that is received while the second area including the image is displayed on the display, reduce the second area.

For example, the instructions may cause, when executed by the processor, the wearable device to, based on the other input received while the virtual object superimposed on the virtual space is displayed, expand the first area centering around a position of the virtual object within the virtual space.

For example, the instructions may cause, when executed by the processor, the wearable device to receive the other input based on the dial that is rotated in the second direction which is a clockwise direction.

For example, the instructions may cause, when executed by the processor, the wearable device to, while the other input is maintained, expand the first area by using at least one of an angle of rotation or a speed of the dial that is rotated in a clockwise direction.

For example, the instructions may cause, when executed by the processor, the wearable device to, based on the other input that is received while the second area including the image is displayed on the display, decrease brightness of the image displayed through the second area.

For example, the instructions may cause, when executed by the processor, the wearable device to display the virtual space that is set as a background of a virtual reality. The instructions may cause, when executed by the processor, the wearable device to display the virtual object, which is provided by an execution of a software application, superimposed on the virtual space.

For example, the instructions may cause, when executed by the processor, the wearable device to, while the input is maintained, increase brightness of the image that is displayed through the second area, from a first brightness to a second brightness greater than the first brightness.

For example, the instructions may cause, when executed by the processor, the wearable device to, in response to another input to click the dial, display, within the display, icons representing each of a plurality of software applications installed in the wearable device.

For example, the instructions may cause, when executed by the processor, the wearable device to, while the input is maintained, reduce the first area centering around a position of the virtual object within the virtual space.

For example, the instructions may cause, when executed by the processor, the wearable device to, while the input is maintained, reduce the first area until a timing at which a size of the first area is reduced to the size of the virtual object.

As described above, according to an embodiment, a method of a wearable device including a housing, a dial on the housing, and one or more cameras exposed outside through at least portion of the housing to obtain an image with respect to at least portion of environment adjacent to the wearable device is provided. The method may comprise, by using a display forming at least portion of the housing to be arranged in front of eyes of a user wearing the wearable device, displaying a virtual object superimposed on a virtual space. The method may comprise, while the virtual object superimposed on the virtual space is displayed, receiving an input to rotate the dial in a first direction. The method may comprise, while the input is maintained, reducing a first area where the virtual space is displayed. The method may comprise maintaining a size of the virtual object that is superimposed on the virtual space and is displayed inside of the first area reduced while the input is maintained. The method may comprise expanding a second area including the image that is further displayed on the display in response to the input.

For example, the method may comprise, based on a reduced size of the first area, changing the virtual object to an icon having a size smaller than the size of the virtual object that is maintained while the input is maintained.

For example, the method may comprise, while the virtual object superimposed on the virtual space is displayed, receiving another input to rotate the dial in a second direction opposite to the first direction. The method may comprise, while the other input is maintained, expanding the first area where the virtual space is displayed. The method may comprise, based on the other input that is received while the second area including the image is displayed on the display, reducing the second area.

For example, the expanding the first area may comprise, based on the other input received while the virtual object superimposed on the virtual space is displayed, expanding the first area centering around a position of the virtual object within the virtual space.

For example, the receiving the other input may comprise receiving the other input based on the dial that is rotated in the second direction which is a clockwise direction.

For example, the expanding the first area may comprise, while the other input is maintained, expanding the first area by using at least one of an angle of rotation or a speed of the dial that is rotated in a clockwise direction.

For example, the reducing the second area may comprise, based on the other input that is received while the second area including the image is displayed on the display, decreasing brightness of the image displayed through the second area.

For example, the displaying may comprise displaying the virtual space that is set as a background of a virtual reality. The displaying may comprise displaying the virtual object, which is provided by an execution of a software application, superimposed on the virtual space.

For example, the expanding the second area may comprise, while the input is maintained, increasing brightness of the image that is displayed through the second area, from a first brightness to a second brightness greater than the first brightness.

For example, the method may comprise, in response to another input to click the dial, displaying, within the display, icons representing each of a plurality of software applications installed in the wearable device.

For example, the reducing the first area may comprise, while the input is maintained, reducing the first area centering around a position of the virtual object within the virtual space.

For example, the reducing the first area may comprise, while the input is maintained, reducing the first area until a timing at which a size of the first area is reduced to the size of the virtual object.

As described above, according to an embodiment, a non-transitory computer readable storage medium for storing instructions is provided. The instructions may cause, when executed by a processor of a wearable device including a housing, a dial on the housing, one or more cameras exposed outside through at least portion of the housing to obtain an image with respect to at least portion of environment adjacent to the wearable device, the wearable device to, by using a display forming at least portion of the housing to be arranged in front of eyes of a user wearing the wearable device, display a virtual object superimposed on a virtual space. The instructions may cause, when executed by the processor, the wearable device to, while the virtual object superimposed on the virtual space is displayed, receive an input to rotate the dial in a first direction. The instructions may cause, when executed by the processor, the wearable device to, while the input is maintained, reduce a first area where the virtual space is displayed. The instructions may cause, when executed by the processor, the wearable device to maintain a size of the virtual object that is superimposed on the virtual space and is displayed inside of the first area reduced while the input is maintained. The instructions may cause, when executed by the processor, the wearable device to expand a second area including the image that is further displayed on the display in response to the input.

It will also be appreciated that the present disclosure includes subject matter in accordance with the following numbered examples:

According to a first example, there is provided a wearable device comprising a housing comprising a first surface and a second surface; a display disposed on the first surface; one or more cameras configured to obtain an image of an external environment; memory storing instructions; and a processor; wherein the instructions, when executed by the processor, cause the wearable device to: display a virtual space in a first area of a screen of the display; receive a first input; and modify display of the virtual space based on the first input; wherein, to modifying the display of the virtual space based on the first input, the instructions, when executed by the processor, cause the wearable device to one of: identify, based on the first input being of a first type, a second area in the screen on which the virtual space is displayed, wherein the second area at least partially overlaps with the first area, and display, in the second area, a first portion of the image while maintaining display of the virtual space in a remaining part of the first area; or based on detecting that the first input is of a second type and is maintained, reduce the first area where the virtual space is displayed in the screen, and expand a third area in the screen where a second portion of the image is displayed.

According to a second example, there is provided the wearable device of the first example, wherein the first type is one of: a drag input, received on the second surface of the housing; a gesture, detected by a camera among the one or more cameras; or a signal received from an external electronic device; wherein the one of the drag input, the gesture and the signal indicates a path of the first input of the first type.

According to a third example, there is provided the wearable device of the second example, wherein a size and/or a position of the second area in the screen is identified based on one or more of: the path, one or more directions included in the path, a length of the path, a duration of the first input, a number of external objects used to provide the first input, or the length of the path relative to a dimension of the wearable device.

According to a fourth example, there is provided the wearable device of the first example, the wearable device further comprising a dial disposed on the housing; wherein the second type is a rotation of the dial in a first direction; and wherein the change in the size of the first area is a reduction and the change in the size of the second area is an expansion.

According to a fifth example, there is provided the wearable device of the fourth example, wherein the instructions, when executed by the processor, cause the wearable device to: maintain a size of a virtual object that is superimposed on the virtual space while the size of the first area is changed.

According to a sixth example, there is provided the wearable device of the fifth example, wherein the instructions, when executed by the processor, cause the wearable device to: based on a reduced size of the first area, change the virtual object to an icon having a size smaller than the size of the virtual object that is maintained while the first input of the second type is maintained.

According to a seventh example, there is provided the wearable device of the fifth or sixth example, wherein the instructions, when executed by the processor, cause the wearable device to: while the virtual object super-imposed on the virtual space is displayed, receive a second input to rotate the dial in a second direction opposite to the first direction; while the second input is maintained, expand the first area where the virtual space is displayed; and based on the second input that is received while the third area including the second portion of the image is displayed on the display, reduce the third area.

According to an eighth example, there is provided the wearable device of the seventh example, wherein the instructions, when executed by the processor, cause the wearable device to: based on the second input received while the virtual object superimposed on the virtual space is displayed, expand the first area centering around a position of the virtual object within the virtual space.

According to a ninth example, there is provided the wearable device of the seventh or eighth example, wherein the second direction is a clockwise direction; and/or while the second input is maintained, expand the first area by using at least one of an angle of rotation or a speed of the dial that is rotated in a clockwise direction.

According to a tenth example, there is provided the wearable device of any of the seventh to ninth examples, wherein the instructions, when executed by the processor, cause the wearable device to: based on the second input that is received while the third area including the second portion of the image is displayed on the display, decrease brightness of the second por-tion of the image displayed through the third area.

According to an eleventh example, there is provided the wearable device of any of the fifth to tenth examples, wherein the instructions, when executed by the proces-sor, cause the wearable device to: display the virtual space that is set as a background of a virtual reality; and display the virtual object, which is provided by an execution of a software application, superimposed on the virtual space.

According to a twelfth example, there is provided the wearable device of any of the fifth to eleventh examples, wherein the instructions, when executed by the processor, cause the wearable device to: while the first input of the second type is maintained, increase brightness of the second portion of the image that is displayed through the third area, from a first brightness to a second brightness greater than the first brightness.

According to a thirteenth example, there is provided the wearable device of any of the fifth to twelfth examples, wherein the instructions, when executed by the proces-sor, cause the wearable device to: while the first input of the second type is maintained: reduce the first area centering around a position of the virtual object within the virtual space, and/or reduce the first area until a size of the first area is reduced to the size of the virtual object.

According to a fourteenth example, there is provided the wearable device of any of the fifth to thirteenth examples, wherein the instructions, when executed by the processor, cause the wearable device to: in response a further input to click the dial, display, within the screen, a plurality of icons each representing a software application installed in the wearable device.

According to a fifteenth example, there is provided a method of a wearable device including a housing comprising a first surface and a second surface, one or more cameras configured to obtain an image of an external environment, and a display disposed on the first surface of the housing, the method comprising: displaying a virtual space in a first area of a screen of the display; receiving a first input; and modifying display of the virtual space based on the first input; wherein modifying the displaying of the virtual space based on the first input comprises one of: identifying, based on the first input being of a first type, a second area in the screen on which the virtual space is dis-played, wherein the second area at least partially over-laps with the first area, and displaying, in the second area, a portion of the image while maintaining display of the virtual space in a remaining part of the first area; or based on detecting that the first input is of a second type and is maintained: changing a size of the first area where the virtual space is displayed in the screen, and changing a size of a third area in the screen where the image is displayed, wherein the change in the size of the third area is inversely related to the change in the size of the first area.

According to a sixteenth example, there is provided the method of the fifteenth example, wherein the first type is one of: a drag input, received on the second surface of the housing; a gesture, detected by a camera among the one or more cameras; or a signal received from an external electronic device; wherein the one of the drag input, the gesture and the signal indicates a path of the first input of the first type.

According to a seventeenth example, there is provided the method of the fifteenth example, wherein the wearable device further comprises a dial disposed on the hous-ing; wherein the second type is a rotation of the dial in a first direction; and wherein the change in the size of the first area is a reduction and the change in the size of the second area is an expansion.

According to an eighteenth example, there is provided the method of the seventeenth example, further compris-ing: maintaining a size of a virtual object that is superimposed on the virtual space while the size of the first area is changed.

The electronic device according to various embodiments is one of various types of electronic devices, for example a portable communication device (e.g., a smartphone), a com-puter device, a portable multimedia device, a portable medi-cal device, a camera, a wearable device, or a home appli-ance. The electronic device is not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B,", "A, B and/or C", "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software including one or more instructions that are stored in a storage medium (e.g., the memory 220) that is readable by a machine (e.g., the wearable device 101). For example, a processor (e.g., the processor 210) of the machine (e.g., the wearable device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A wearable device, comprising:
one or more cameras;
at least one display;
memory storing instructions, comprising one or more storage mediums; and
at least one processor comprising processing circuitry,
wherein the instructions, when executed by the at least one processor individually or collectively, cause the wearable device to:
obtain a real space image using the one or more cameras;
display a virtual environment on the at least one display;
while displaying the virtual environment, identify an external object included in the real space image;
based on identifying the external object, determine a first area in the virtual environment for displaying a portion of the real space image corresponding to the identified external object;
concurrently display the virtual environment and the portion of the real space image corresponding to the external object, wherein the portion of the real space image is displayed at the determined first area with a first transparency;
track movement of the external object from the real space image;
based on the tracked movement of the external object, determine a second area for displaying a portion of the real space image corresponding to the moved external object in the virtual environment; and
based on the determined second area, concurrently display the virtual environment and the portion of the real space image corresponding to the moved external object, wherein the portion of the real space image is displayed at the determined second area with the first transparency.

2. The wearable device of claim 1, wherein the external object is positioned within a reference distance from the wearable device.

3. The wearable device of claim 1, wherein the instructions, when executed by the at least one processor individually or collectively, cause the wearable device to:
display, within the first area, the portion of the real space image corresponding to the external object; and
display, within a remaining area with respect to the first area, the virtual environment.

4. The wearable device of claim 1, wherein the one or more cameras comprise one or more first cameras further comprising:

one or more second cameras;

wherein the instructions, when executed by the at least one processor individually or collectively, cause the wearable device to:

identify a gaze direction using the one or more second cameras; and based on the gaze direction directed to the displayed portion of the real space image, change a transparency of the portion of the real space image from the first transparency to a second transparency.

5. The wearable device of claim 1, wherein the instructions, when executed by the at least one processor individually or collectively, cause the wearable device to:

display, within the first area, the portion of the real space image, which corresponds to the at least a portion of the external object, by segmenting the real space image, wherein the first transparency used to display the portion of the real space image is changed to a second transparency in accordance with a user input with respect to the portion of the real space image.

6. The wearable device of claim 1, wherein the instructions, when executed by the at least one processor individually or collectively, cause the wearable device to:

change a transparency of the virtual environment displayed within the first area, from a third transparency to a fourth transparency, to concurrently display the virtual environment and the portion of the real space image.

7. The wearable device of claim 1, wherein the instructions, when executed by the at least one processor individually or collectively, cause the wearable device to:

change a transparency of the virtual environment displayed within the second area, from a third transparency to a fourth transparency, to concurrently display the virtual environment and the portion of the moved external object.

8. The wearable device of claim 1, wherein the instructions, when executed by the at least one processor individually or collectively, cause the wearable device to:

while displaying the virtual environment, identify the external object included in the real space image by identifying a visual object included in the real space image, wherein the visual object corresponds to a predetermined object or an object designated by a user.

9. The wearable device of claim 1, wherein the instructions, when executed by the at least one processor individually or collectively, cause the wearable device to:

determine the first area for displaying the portion of the real space image by determining a shape or a size of the external object depicted in the real space image.

10. A method of a wearable device, wherein the wearable device comprises one or more cameras, and at least one display, comprising:

obtaining a real space image using the one or more cameras;

displaying a virtual environment on the at least one display;

while displaying the virtual environment, identifying an external object included in the real space image;

based on identifying the external object, determining a first area in the virtual environment for displaying a portion of the real space image corresponding to the identified external object;

concurrently displaying the virtual environment and the portion of the real space image corresponding to the external object, wherein the portion of the real space image is displayed at the determined first area with a first transparency;

tracking movement of the external object from the real space image;

based on the tracked movement of the external object, determining a second area for displaying a portion of the real space image corresponding to the moved external object in the virtual environment; and based on the determined second area, concurrently displaying the virtual environment and the portion of the real space image corresponding to the moved external object, wherein the portion of the real space image is displayed at the determined second area with the first transparency.

11. The method of claim 10, wherein the external object is positioned within a reference distance from the wearable device.

12. The method of claim 10, wherein the displaying the virtual environment and the at least portion of the external object comprises:

displaying, within the first area, the portion of the real space image corresponding to the external object; and displaying, within a remaining area with respect to the first area, the virtual environment, wherein the first transparency used to display the portion of the real space image is changed to a second transparency in accordance with a user input with respect to the portion of the real space image.

13. The method of claim 10, wherein the displaying the virtual environment and the portion of the real space image comprises:

displaying, within the second area, the portion of the real space image corresponding to the moved external object; and displaying, within a remaining area with respect to the second area, the virtual environment.

14. The method of claim 10, wherein the displaying the virtual environment and the portion of the real space image comprises:

displaying, within the first area, the portion of the real space image, which correspond to the at least a portion of the external object, by segmenting the real space image.

15. A non-transitory computer readable storage medium storing instructions, wherein the instructions, when executed by a wearable device comprising one or more cameras, and at least one display, cause the wearable device to:

obtain a real space image using the one or more cameras;

display a virtual environment on the at least one display;

while displaying the virtual environment on the at least one display, detect a portion of the real space image corresponding to an external object; and in response to the detection, gradually increase a transparency of a portion of the virtual environment displayed on the at least one display such that the portion of the real space image corresponding to the external object gradually appears within the portion of the virtual environment.

16. The non-transitory computer readable storage medium of claim 15, wherein a transparency of the virtual environment displayed on the at least one display is changed, while the portion of the real space image corresponding to the external object is displayed based on the detection being along a direction from the portion of the virtual environment to another portion of the virtual environment.

17. The non-transitory computer readable storage medium of claim 15, wherein the instructions, when executed by the wearable device, cause the wearable device to:

increase the transparency of the portion of the virtual environment for displaying the portion of the real space image including a visual object corresponding to the external object.

18. The non-transitory computer readable storage medium of claim 17, wherein the instructions, when executed by the wearable device, cause the wearable device to:

based on identifying movement of the external object using another real space image obtained using the one or more cameras after the portion of the real space image appears, increase a transparency of another portion of the virtual environment for displaying another portion of the other real space image including a visual object corresponding to the external object.

19. The non-transitory computer readable storage medium of claim 15, wherein the wearable device further comprises:

a housing where the one or more cameras and the at least one display are positioned; and a dial on the housing, wherein the instructions, when executed by the wearable device, cause the wearable device to:

display the virtual environment on the at least one display based on receiving an input for rotating the dial along a first direction.

20. The non-transitory computer readable storage medium of claim 19, wherein the instructions, when executed by the wearable device, cause the wearable device to:

while receiving the input for rotating the dial, gradually increase a display area of the virtual environment on the at least one display.

* * * * *